United States Patent
Qu et al.

(10) Patent No.: US 12,516,132 B2
(45) Date of Patent: Jan. 6, 2026

(54) ANTI-PD-L1 NANOBODY AND FC FUSION PROTEIN AND APPLICATION THEREOF

(71) Applicant: QURE BIOTECHNOLOGY (SHANGHAI) CO., LTD., Shanghai (CN)

(72) Inventors: Xiangdong Qu, Shanghai (CN); Qin Pan, Shanghai (CN); Houcong Jin, Shanghai (CN); Yejie Du, Shanghai (CN); Han Zheng, Shanghai (CN)

(73) Assignee: QURE BIOTECHNOLOGY (SHANGHAI) CO., LTD., Shanghai (CN)

( * ) Notice: Subject to any disclaimer, the term of this patent is extended or adjusted under 35 U.S.C. 154(b) by 1045 days.

(21) Appl. No.: 17/597,130

(22) PCT Filed: Jun. 24, 2020

(86) PCT No.: PCT/CN2020/098051
§ 371 (c)(1),
(2) Date: Dec. 27, 2021

(87) PCT Pub. No.: WO2020/259566
PCT Pub. Date: Dec. 30, 2020

(65) Prior Publication Data
US 2022/0242974 A1 Aug. 4, 2022

(30) Foreign Application Priority Data

Jun. 27, 2019 (CN) .......................... 201910567277.5
Jun. 22, 2020 (CN) .......................... 202010574992.4

(51) Int. Cl.
*C07K 16/46* (2006.01)
*A61P 35/00* (2006.01)
*A61P 37/02* (2006.01)
*C07K 16/28* (2006.01)
*C07K 19/00* (2006.01)

(52) U.S. Cl.
CPC .............. *C07K 16/46* (2013.01); *A61P 35/00* (2018.01); *A61P 37/02* (2018.01); *C07K 16/2827* (2013.01); *C07K 19/00* (2013.01)

(58) Field of Classification Search
None
See application file for complete search history.

(56) References Cited

U.S. PATENT DOCUMENTS 11,225,522 B2 * 1/2022 Xu .......................... C07K 16/28

FOREIGN PATENT DOCUMENTS

| CN | 109265548 A | 1/2019 |
| EP | 3470429 A1 | 4/2019 |
| WO | 2017/020802 A1 | 2/2017 |
| WO | 2019/032663 A1 | 2/2019 |

OTHER PUBLICATIONS

Yu, Hui et al. "PD-L1 Expression in Lung Cancer." Journal of thoracic oncology : official publication of the International Association for the Study of Lung Cancer vol. 11,7 (2016): 964-75. doi:10.1016/j.jtho.2016.04.014 (Year: 2016).*
Jubel, Jil M et al. "The Role of PD-1 in Acute and Chronic Infection." Frontiers in immunology vol. 11 487. Mar. 24, 2020, doi: 10.3389/fimmu.2020.00487 (Year: 2020).*
Tuttle, Jay, et al. "A phase 2 trial of peresolimab for adults with rheumatoid arthritis." New England Journal of Medicine 388.20 (2023): 1853-1862 (Year: 2023).*
Synapse , "What are PD-1 agonists and how do they work?", PatSnap, Jun. 2024 (Year: 2024).*
Kipriyanov, Sergey M., and Fabrice Le Gall. "Generation and production of engineered antibodies." Molecular biotechnology 26.1 (2004): 39-60. (Year: 2004).*
Vincke, Cecile, et al. "General strategy to humanize a camelid single-domain antibody and identification of a universal humanized nanobody scaffold." Journal of Biological Chemistry 284.5 (2009): 3273-3284.(Year: 2009).*
Ghahroudi, M et al. "Selection and identification of single domain antibody fragments from camel heavy-chain antibodies." FEBS letters vol. 414,3 (1997): 521-6. doi:10.1016/s0014-5793(97)01062-4 (Year: 1997).*

* cited by examiner

*Primary Examiner* — Michael Szperka
*Assistant Examiner* — Lia E Taylor
(74) *Attorney, Agent, or Firm* — NKL Law; Bin Lu; Allen Xue

(57) ABSTRACT

Provided are an anti-PD-L1 nanobody and an Fc fusion protein thereof, and an application thereof. The anti-PD-L1 nanobody and the Fc fusion protein thereof have strong specificity, high affinity, and weak immunogenicity to humans. In addition, same have high stability and a significant anti-tumor effect.

12 Claims, 20 Drawing Sheets

Specification includes a Sequence Listing.

Anti-CLDN18.2 antibody

Anti-PD-L1 antibody

DC(donor 1) + T cell(donor 2)

ANTI-PD-L1 NANOBODY AND FC FUSION PROTEIN AND APPLICATION THEREOF

INCORPORATION OF SEQUENCE LISTING

This application contains a sequence listing submitted in Computer Readable Form (CRF). The CFR file containing the sequence listing entitled "PBA4085215_ST25.txt", which was created on Jun. 16, 2025, and is 92,307 bytes in size. The information in the sequence listing is incorporated herein by reference in its entirety.

TECHNICAL FIELD

The present invention relates to an anti-PD-L1 nanobody. The present invention also relates to an anti-PD-L1 Nanobody Fc fusion protein. The present invention also relates to the application of the anti-PD-L1 Nanobody. The present invention also relates to the application of the anti-PD-L1 Nanobody Fc fusion protein. The present invention belongs to the field of biomedicine.

BACKGROUND

In classical immune surveillance theory, the immune system can recognize tumor antigens and eliminate them. If the immune system can completely eliminate tumor cells, then immune clearance can be carried out stably. If tumor cells evade the clearance of the immune system through mutation, the immune system will rebalance. During this process, the immunogenicity of tumor cells gradually decreased. The ability of tumor cells to proliferate is weakened under the pressure of immune system, which makes it more difficult to detect tumor cells.

Activation of oncogene causes tumor cells to alter themselves and tumor microenvironment, which breaks the balance between immune system and tumor cells. When the immune system and tumor cells enter the escape stage, the malignant degree of tumor cells will increase, and the loss of MHC molecules in tumor cells will prevent them from being recognized and eliminated by immune cells. Tumor microenvironment can also inhibit the immune system by releasing immunosuppressive factors, such as IL-10 and TGF-β. Immunosuppressive proteins (such as programmed death ligand-1, PD-L1) are also highly expressed on the surface of tumor cells. When effector T cells combine with tumor cells, PD-L1 interacts with PD-1 and induces apoptosis of T cells, which is one of the main reasons for tumor tolerance to immune system. Then tumors grow rapidly and metastasize. If the host immune system is artificially activated and redirected to tumor cells, the tumor tissue can be cleared theoretically, and the theory of immunotherapy has been widely proved in clinical treatment.

Immunotherapy can be divided into two categories: specific therapy and non-specific therapy. Specific therapies in the category include the following treatment strategies: Tumor vaccines activate antigens against patients by injecting tumor-activated immune cells. Tumor vaccines include inactivated tumor cell vaccine, tumor antigen vaccine, tumor DNA vaccine, dendritic cell (DC) vaccine and bacterial vaccine. Specific ACT immunotherapy mainly includes three treatment methods:

Tumor infiltrating lymphocytes (TIL): Lymphocytes isolated from tumor tissues and cultured in vitro. TIL can secrete IL-2 with specific anti-tumor ability.

T cell receptor (TCR) therapy: T cells recognize tumor antigen through its single chain antibody fragment (scFv), and the single chain antibody fragment TCR is cloned into normal T cells through viral vector. Therefore, normal T cells become specific tumor killing T cells.

CAR-T: T cells are genetically modified to obtain T cells with tumor-specific receptors. Different from conventional T cell recognition mechanism, CAR-T cell recognition of tumor antigen is not limited by MHC molecule. Therefore, CAR-T cells can overcome the immune escape mechanism of tumor by increasing costimulatory signal molecules, and enhance the killing ability of T cells to tumor cells.

In nonspecific ACT immunotherapy, there are two main therapeutic methods: lymphokine activated killer (LAK) cell therapy and cytokine induced killer (CIK) cell therapy.

LAK cell therapy: On the one hand, LAK cells stimulate immune cells in peripheral blood lymphocytes by IL-2, including NK cells and T cells. On the other hand, LAK cells enhance the recognition ability of target cells by overexpressing FAS ligands, and kill tumor cells by releasing perforin and granzyme.

CIK cell therapy: CIK cells are derived from peripheral blood lymphocytes (PBL) of patients or healthy people, and expanded in ex vivo by the stimulation of anti-CD3 antibody, IFN-γ and IL-2. CIK cells play an anti-tumor role mainly through FasL and perforin.

Immune checkpoint is a protective molecule in human immune system, which prevents inflammatory injury caused by excessive activation of T cells in normal body. Tumor cells can use this characteristic to over-express immune checkpoint molecules, inhibit the immune response of the body, escape the monitoring and killing of the human immune system, and thus promote the growth of tumor cells. Immune checkpoint inhibitor therapy can inhibit the activity of immune checkpoint in tumor microenvironment, reactivate the immune response of T cells to tumor, and achieve anti-tumor effect. The complete activation of a T cell is regulated by a "double signal" system: the first signal comes from the specific binding of its own TCR (T cell receptor) to MHC of antigen, that is, the T cell recognizes antigen; The second signal comes from a co-stimulatory molecule, which is involved in the interaction between the co-stimulatory molecule expressed by antigen presenting cells (APC) and the corresponding receptor or ligand (e.g. CD28) on the surface of the T cell. For example, CD28-B7 is a positive costimulatory signal, while CTLA4-B7 pathway and PD-1/PD-L1 pathway are the main negative costimulatory molecules. After tumor cells invade, this inhibition pathway is favored by tumor cells to inhibit T cell activation, thereby evading the clearance of immune system.

PD-1 (CD279) was first reported in 1992. Human PD-1 encoding gene PDCD1 was located at 2q37.3, with a total length of 2097 bp, which was composed of 6 exons. The translation product was PD-1 precursor protein composed of 288 amino acids, and the mature protein was obtained by cutting the signal peptide composed of the first 20 amino acids. PD-1 comprises an extracellular immunoglobulin variable region IgV domain, a hydrophobic transmembrane domain and an intracellular domain. The N-terminal ITIM motif of the intracellular tail domain contains two phosphorylation sites, while the C-terminal is an ITSM motif. PD-1 is a membrane protein belonging to CD28 immunoglobulin superfamily, which is mainly expressed on the surface of activated T cells, and has low abundance expression in CD4-CD8-T cells of thymus, activated NK cells and monocytes. PD-1 has two ligands, PD-L1 (CD274, B7-H1) and PD-L2 (CD273, B7-DC) of B7 protein family. The amino acid sequences of PD-L1 and PD-L2 are 40% identical. The main difference between them lies in the different expression patterns. PD-L1 is constitutively low expressed in APCs, non-hematopoietic cells (such as vascular endothelial cells and islet cells) and immunological privileged sites (such as placenta, testis and eyes). Inflammatory cytokines such as type I and type II interferon, TNF-α and VEGF can all induce PD-L1 expression. PD-L2 is expressed only in activated macrophages and dendritic cells. After PD-1 binds to PD-L1 on activated T cells, the ITSM motif of PD-1 undergoes tyrosine phosphorylation, which leads to dephosphorylation of downstream protein kinases Syk and PI3K, and inhibits the activation of downstream AKT and ERK pathways, and finally inhibits the transcription and translation of genes and cytokines needed for T cell activation, thus playing a negative role in regulating T cell activity.

In tumor cells, tumor cells and tumor microenvironment negatively regulate T cell activity and inhibit immune response by up-regulating PD-L1 expression and binding with PD-1 on the surface of tumor-specific CD8+ T cells. Tumor cells can up-regulate PD-L1 expression through the following four ways: 1. Amplification of PD-L1 encoding gene (9p24.1); 2. The activation of EGFR, MAPK, PI3K-Akt signaling pathway and HIF-1 transcription factors can up-regulate the expression of PD-L1 at transcription level; 3. Induction of EBV (EBV positive gastric cancer and nasopharyngeal carcinoma show high expression of PD-L1); 4.Epigenetic regulation. In tumor microenvironment, the stimulation of inflammatory factors such as interferon-γ can also induce the expression of PD-L1 and PD-L2. Inflammatory factors can induce other cells in tumor microenvironment, including macrophages, dendritic cells and stromal cells to express PD-L1 and PD-L2, while tumor infiltrating T cells that can recognize tumor antigens can secrete interferon-γ, and then induce up-regulation of PD-L1 expression. This process is called "adaptive immune resistance", and tumor cells can protect themselves through this mechanism. There are more and more evidences show that tumors use PD-1-dependent immunosuppression to escape from immunity. High expression of PD-L1 and PD-L2 has been found in various solid tumors and hematological malignancies. In addition, the expression of PD-Ls has a strong correlation with the poor prognosis of tumor cells, which proves that it includes esophageal cancer, gastric cancer, renal cancer, ovarian cancer, bladder cancer, pancreatic cancer and melanoma.

At present, the therapeutic monoclonal antibodies of PD-1 approved by FDA are Nivolumab (Opdivo, September 2014), Pembrolizumab (Keytruda, December 2014) and Cemiplimab (Libtayo, September 2018), and the therapeutic monoclonal antibodies of PD-L1 are Atezolizumab (Tecentriq, September 2014), avelumab (Bavencio, May 2016) and Duravulumab (Imfinzi, May 2017). The approved indications are shown in the following table.

| Target | Name | Antibody type | Approved indications | Company |
|---|---|---|---|---|
| PD-1 | Nivolumab | Humanized antibody IgG4 | Melanoma, squamous non-small cell lung cancer, non-small cell lung cancer, Hodgkin's lymphoma, hepatocellular carcinoma | BMS |
| | Pembrolizumab | Humanized antibody IgG4 | Advanced melanoma, advanced non-small cell lung cancer, urothelial carcinoma, head and neck squamous cell carcinoma | Merck |
| | Cemiplimab | Humanized antibody IgG4 | Skin squamous cell carcinoma | Sanofi |
| PD-L1 | Atezolizumab | Humanized antibody IgG1 | Renal cell carcinoma, breast cancer, | Roche |
| | Avelumab | Whole human antibody IgG1 | Merck cell carcinoma, non-small cell lung cancer | Merck, Pfizer |
| | Duravulumab | Humanized antibody IgG1 | Head and neck squamous cell carcinoma, advanced non-small cell lung cancer | AstraZeneca |

In addition, PD-1 monoclonal antibodies such as Pidilizumab, AMP-224, AMP-514 and PDR001, and PD-L1 monoclonal antibodies such as BMS-936559 and CK-301 are under development and clinical trials.

However, the affinity of existing monoclonal antibodies has not reached the ideal state, and because of their large size, they have strong immunogenicity.

SUMMARY OF THE INVENTION

The purpose of the present invention is to provide an anti-PD-L1 nanobody and its Fc fusion protein and application to solve the above-mentioned problems.

The present invention provides an anti-PD-L1 nanobody, comprising at least one VHH fragment, which comprises three amino acid fragments of CDR1, CDR2 and CDR3, and CDR1, CDR2 and CDR3 are respectively selected from the following sequences:
1) CDR1 shown in SEQ ID No: 44 to SEQ ID No: 60;
2) CDR2 shown in SEQ ID No: 61 to SEQ ID No: 82;
3) CDR3 shown in SEQ ID No: 83 to SEQ ID No: 99.

Further, the anti-PD-L1 nanobody of the present invention is characterized in that its sequence is as shown in any of SEQ ID No: 1 to SEQ ID No:41.

The present invention also provides an Fc fusion protein of the anti-PD-L1 nanobody, comprising the anti-PD-L1 nanobody of claim 1 or 2 and an Fc segment, and the sequence of the Fc segment is as shown in SEQ ID No: 42.

Furthermore, the anti-PD-L1 nanobody of the present invention is characterized in that in its sequence, except for CDR1, CDR2 and CDR3, 80% of the amino acid sequence is identical to the sequence shown in any of SEQ ID No: 1 to SEQ ID No: 41.

The present invention also provides an application of the anti-PD-L1 nanobody in preparing a reagent for blocking the binding of PD-L1 and PD-1.

The invention also provides a use of the Fc fusion protein of the anti-PD-L1 nanobody in preparing a reagent for blocking the binding of PD-L1 and PD-1.

Further, the anti-PD-L1 nanobody of the invention is characterized in that the dosage is 20 ug/ml to 0.000128 ug/ml.

Further, the anti-PD-L1 nanobody of the invention is humanized and has a sequence as shown in any of SEQ ID No: 100 to SEQ ID No:105.

The invention also provides an Fc fusion protein of humanized anti-PD-L1 nanobody, comprising the anti-PD- L1 nanobody and an Fc segment of claim 8, and the sequence of the Fc segment is as shown in SEQ ID No:42.

Use of any one of the above-mentioned nanobody or its Fc fusion protein in the preparation of a medicine for treatment of cancer, infection or immunomodulatory diseases.

Use of any one of the above-mentioned nanobodies in the preparation of drugs for inhibiting tumor growth.

Use of any one of the above-mentioned nanobodies or its Fc fusion protein, wherein cancer or tumor is selected from the following tissues or sites: colorectal, breast, ovary, pancreas, stomach, esophagus, prostate, kidney, cervix, bone marrow cancer, lymphoma, leukemia, thyroid, endometrium, uterus, bladder, neuroendocrine, head and neck, liver, nasopharynx, testis, small cell lung cancer, non-small cell lung cancer, melanoma, basal cell skin cancer, squamous cell skin cancer, dermatofibrosarcoma protuberant, Merkel cell carcinoma, glioblastoma, glioma, sarcoma, mesothelioma, or myelodysplastic syndrome.

BENEFICIAL EFFECTS OF THE INVENTION

The nanobody and the Fc fusion protein of the present invention have strong specificity, high affinity, low immunogenicity to human and remarkable anti-tumor effects.

DETAILED DESCRIPTION

Figure 1A:
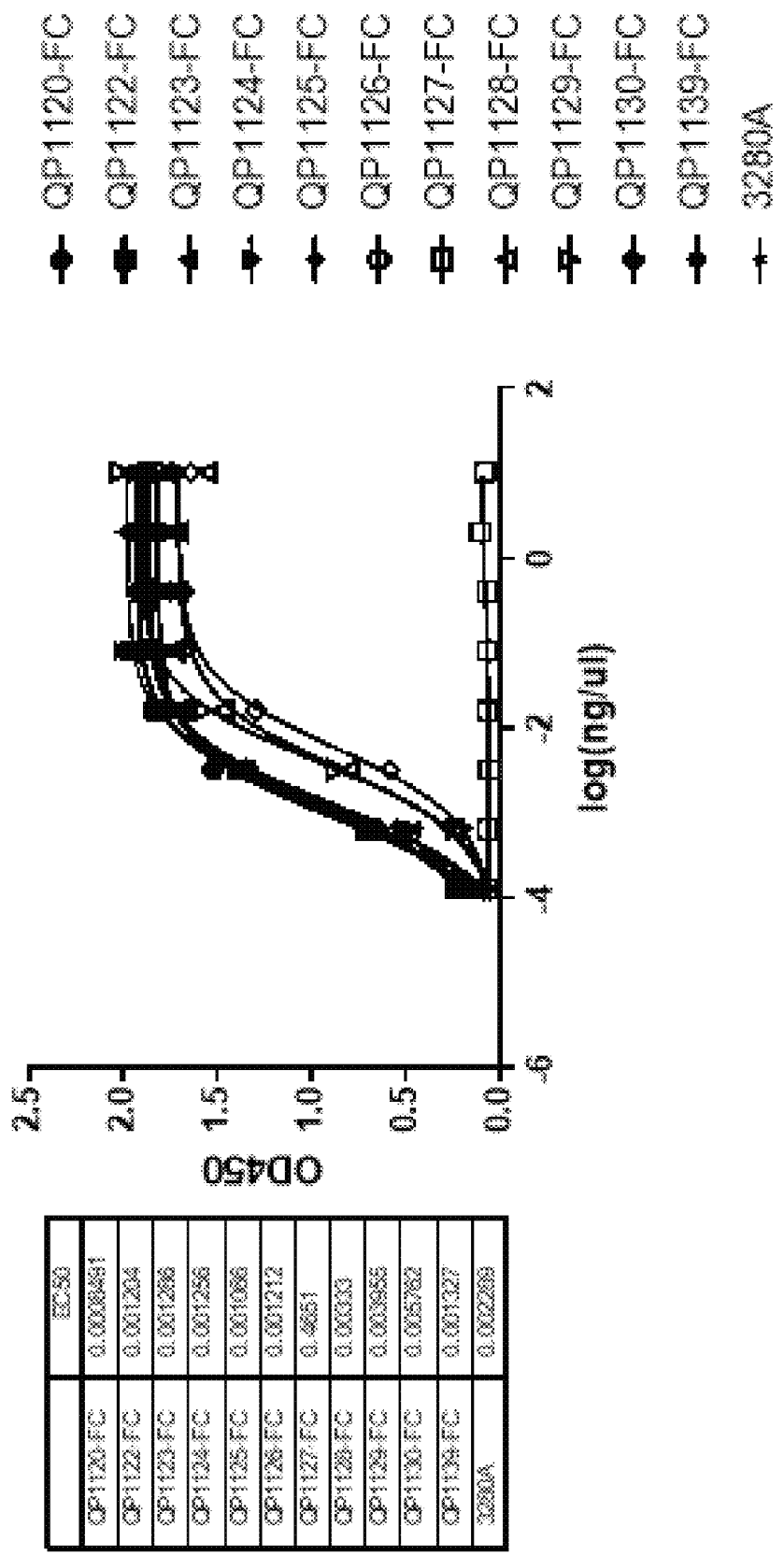
FIG. 1A shows the binding curve of human Fc fusion protein of PD-L1 nanobody numbers QP1120, QP1122, QP1123, QP1124, QP1125, QP1126, QP1127, QP1128, QP1129, QP1130 and QP1139 to PD-L1 protein.

The technical scheme of the present invention is described in further detail below.

Example 1 Preparation Method of PD-L1 Nanobody Fc Fusion Protein

1. Screening of Nanobodies Against PD-L1
1.1 Library Construction
   a) The PD-L1-his fusion protein for immunizing camel was purified by nickel column, and the sequence was shown in SEQ ID NO:43. One Xinjiang Bactrian camel was selected for subcutaneous multi-point injection immunization, and 50 mL of peripheral blood was collected after four immunizations to separate PBMC.
   b) Total RNA was extracted with TRIzol reagent. After the purity of RNA was identified by electrophoresis, 8 ug RNA was transcribed by SuperScript® III First-Strand Synthesis System for RT-PCR, and the target nucleic acid fragment was obtained by recovery and purification using DNA product purification kit after two rounds of nested PCR.
   c) The phage vector pComb3XSS and the target fragment were respectively digested with sfiI at 50° C. overnight, and then the gel was tapped to recover the target fragment. The molar ratio of ligation is Vector:VHH=1:3.
   d) After electrotransformation into TG1 Escherichia coli, 1 mL SOC medium was immediately added for resuscitation, and then resuscitated at 37° C., 180 rpm for 45 min. Then centrifuged, 5 mL SOC was added for resuspension, and 10 µL was taken to measure the library capacity, the rest were spread on 8 pieces of 200 mm plate. On the second day, there were 104 clones after $10^{-5}$ dilution, so the library capacity was $5.04 \times 10^9$ ($104*5*100*10^5$). 48 clones were randomly selected from the titer plate for identification. The results showed that the insertion rate was 100% and the size was correct.
1.2 Nanobody Panning for PD-L1
   a) After 3 rounds of panning, the obtained phage clones bound to PD-L1 were plated in a 96-well plate, and 150 ul 2×TY-Amp-0.1% sucrose medium was added, and cultured at 37° C. for 3 hours.
   b) 30 ul of 2×TY-Amp-5 mM IPTG (the final concentration of IPTG was 1 mM) was added to each well to induce the expression of soluble antibody fragments, and cultured overnight at 30° C.
   c) ELISA plate was coated with PD-L1-his protein 2 ng/ul, 50 ul/well, overnight at 4° C.
   d) The plate was washed once with 1×PBS, and 200 ul of 2% Milk-PBS was added to block the ELISA plate, and incubated at 37° C. for 1 h.
   e) The overnight cultured bacteria solution was centrifuged at 4000 g for 10 mins, and the supernatant was transferred to a new 96-well plate.
   f) The plate was washed twice with 1×PBST, and 25 ul of 2% Milk-PBS blocking solution was added, and then 25 ul of culture supernatant was added, mixed well. Incubated at 25° C. for 1 h.
   g) The plate was washed 3 times with 1×PBST, and 100 µl of anti-Fab-HRP antibody (1:5000 in 2% Milk-PBS) was added, and incubated at 25° C. for 1 h.
   h) The plate was washed 4 times with 1×PBST, and 100 ul/well of TMB was added, then developed in dark at room temperature for 10 min. 2M $H_2SO_4$ 50 ul/well was added to stop the reaction, and the value was obtained at 450 nm on the machine.
   i) A Sample well with a value more than 2 times higher than the value of the control well was considered as a positive clone. The bacteria liquid of the positive well was expanded and the plasmid was extracted for sequencing. The sequences with the same CDR1, 2, and 3 were regarded as the same clone, thus 41 unique nanobody sequence were obtained, and the sequences were shown in SEQ ID NO: 1-41.

In order to facilitate screening, 41 clones were transformed into PD-L1-FC fusion protein with human IgG1 Fc at C terminal. The reconstructed plasmid was expressed in HEK293 cells and purified by protein A affinity chromatography. Besides QP1121-FC, a total of 40 candidate PD-L1-FC fusion proteins were obtained, and the sequences consisted of the C terminal of the nanobody shown in SEQ ID NO:1-41 connected with the Fc segment of SEQ ID NO:42. The number of Fc fusion protein of the corresponding nanobody is formed by adding Fc suffix after the corresponding nanobody.

2. Binding Curve of PD-L1 Nanobody Fc Fusion Protein to PD-L1 Protein
   a) The plate was coated with PDL1-mFc fusion protein, 1 ug/ml, 100 ul/well, overnight at 4° C.
   b) Washing the plate with 1×PBS for 3 times, 3% BSA was added to block, 250 ul/well, and incubated at room temperature for 1 hour.
   c) Washing the plate with 1×PBST for 3 times and with 1×PBS for 3 times, antibody to be tested with 5-fold gradient dilution (10 ug/ml to 0.000128 ug/ml) was added, and incubated at room temperature for 1 hour.
   d) Washing the plate with 1×PBST for 3 times and with 1×PBS for 3 times, HRP-anti-hFc (1:2500) was added with 50 ul/well, and incubated at room temperature for 1 hour.
   e) Washing the plate with 1×PBST for 3 times and with 1×PBS for 3 times, TMB was added with 100 ul/well, then developed in dark at room temperature for 10 min. 2M $H_2SO_4$ was added with 50 ul/well to stop the reaction, and the value was read at 450 nm on the machine.

The results are shown in FIGS. 1A to 1D, and Tables 1 to 4.

TABLE 1

EC50 values of each antibody corresponding to the experimental results in FIG. 1A

| | EC50 |
|---|---|
| QP1120-FC | 0.0008491 |
| QP1122-FC | 0.001204 |
| QP1123-FC | 0.001286 |
| QP1124-FC | 0.001256 |
| QP1125-FC | 0.001066 |
| QP1126-FC | 0.001212 |
| QP1127-FC | 0.4651 |
| QP1128-FC | 0.00333 |
| QP1129-FC | 0.003955 |
| QP1130-FC | 0.005762 |
| QP1139-FC | 0.001327 |
| 3280A | 0.002289 |

TABLE 2

Figure 1B:
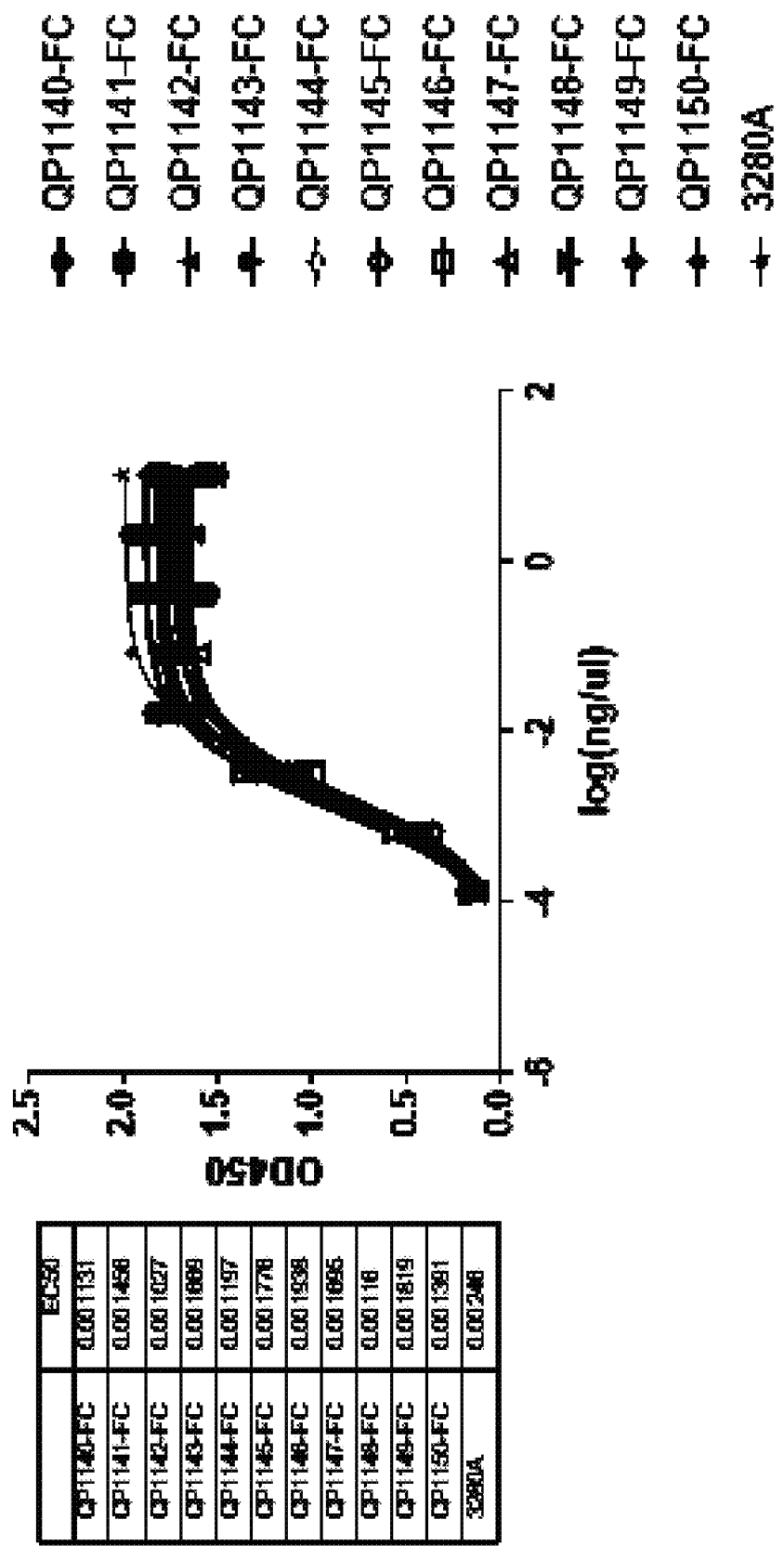
FIG. 1B shows the binding curve of human Fc fusion protein of PD-L1 nanobody numbers QP1140, QP1141, QP1142, QP1143, QP1144, QP1145, QP1146, QP1147, QP1148, QP1149, and QP1150 to PD-L1 protein.

EC50 values of each antibody corresponding
to the experimental results in FIG. 1B

|  | EC50 |
| --- | --- |
| QP1140-FC | 0.001131 |
| QP1141-FC | 0.001456 |
| QP1142-FC | 0.001027 |
| QP1143-FC | 0.001669 |
| QP1144-FC | 0.001197 |
| QP1145-FC | 0.001776 |
| QP1146-FC | 0.001938 |
| QP1147-FC | 0.001695 |
| QP1148-FC | 0.00116 |
| QP1149-FC | 0.001819 |
| QP1150-FC | 0.001391 |
| 3280A | 0.00246 |

TABLE 3

Figure 1C:
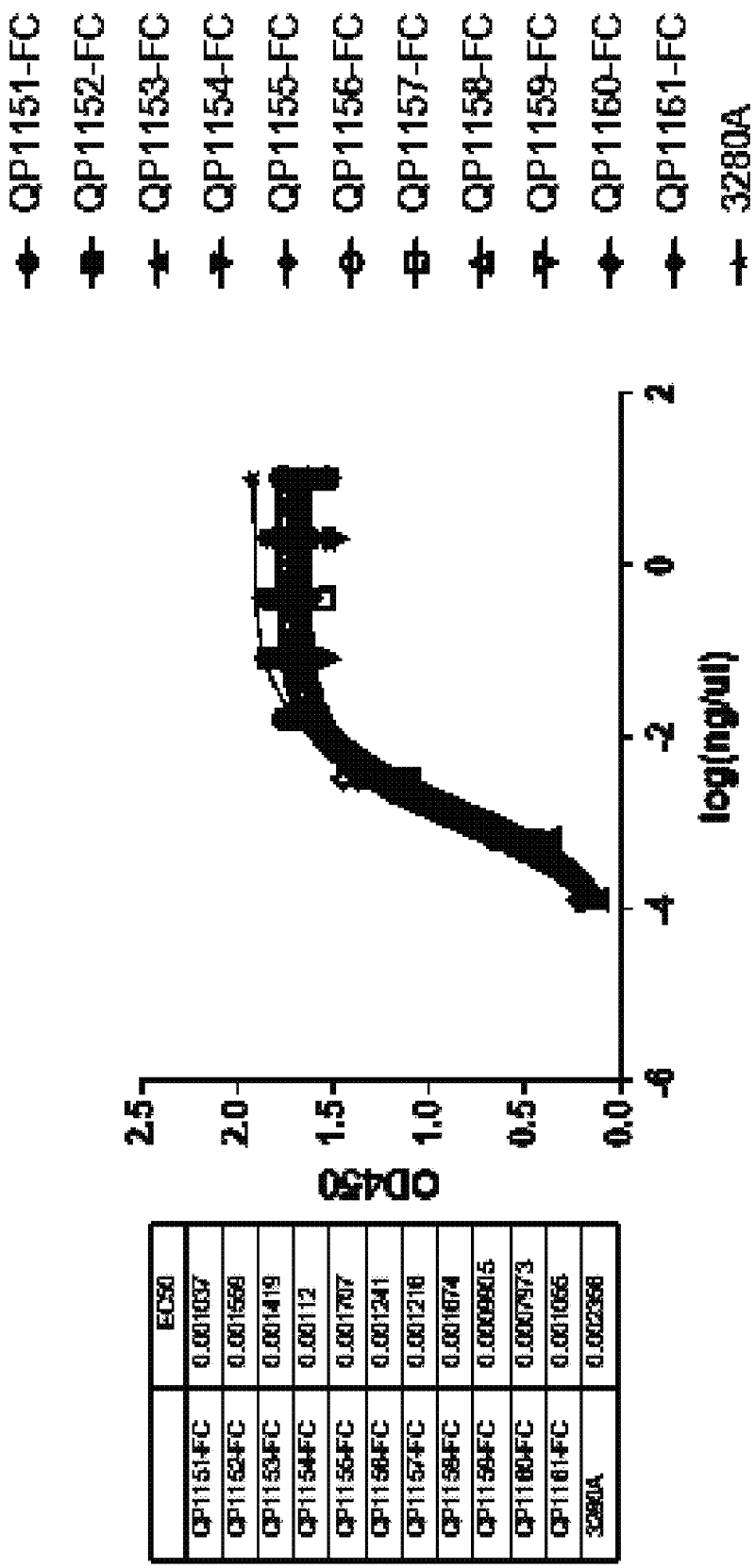
FIG. 1C shows the binding curve of human Fc fusion protein of PD-L1 nanobody numbers QP1151, QP1152, QP1153, QP1154, QP1155, QP1156, QP1157, QP1158, QP1159, QP1160, and QP1161 to PD-L1 protein.

EC50 values of each antibody corresponding
to the experimental results in FIG. 1C

|  | EC50 |
| --- | --- |
| QP1151-FC | 0.001037 |
| QP1152-FC | 0.001559 |
| QP1153-FC | 0.001419 |
| QP1154-FC | 0.00112 |
| QP1155-FC | 0.001707 |
| QP1156-FC | 0.001241 |
| QP1157-FC | 0.001216 |
| QP1158-FC | 0.001674 |
| QP1159-FC | 0.0009905 |
| QP1160-FC | 0.0007973 |
| QP1161-FC | 0.001055 |
| 3280A | 0.002356 |

TABLE 4

Figure 1D:
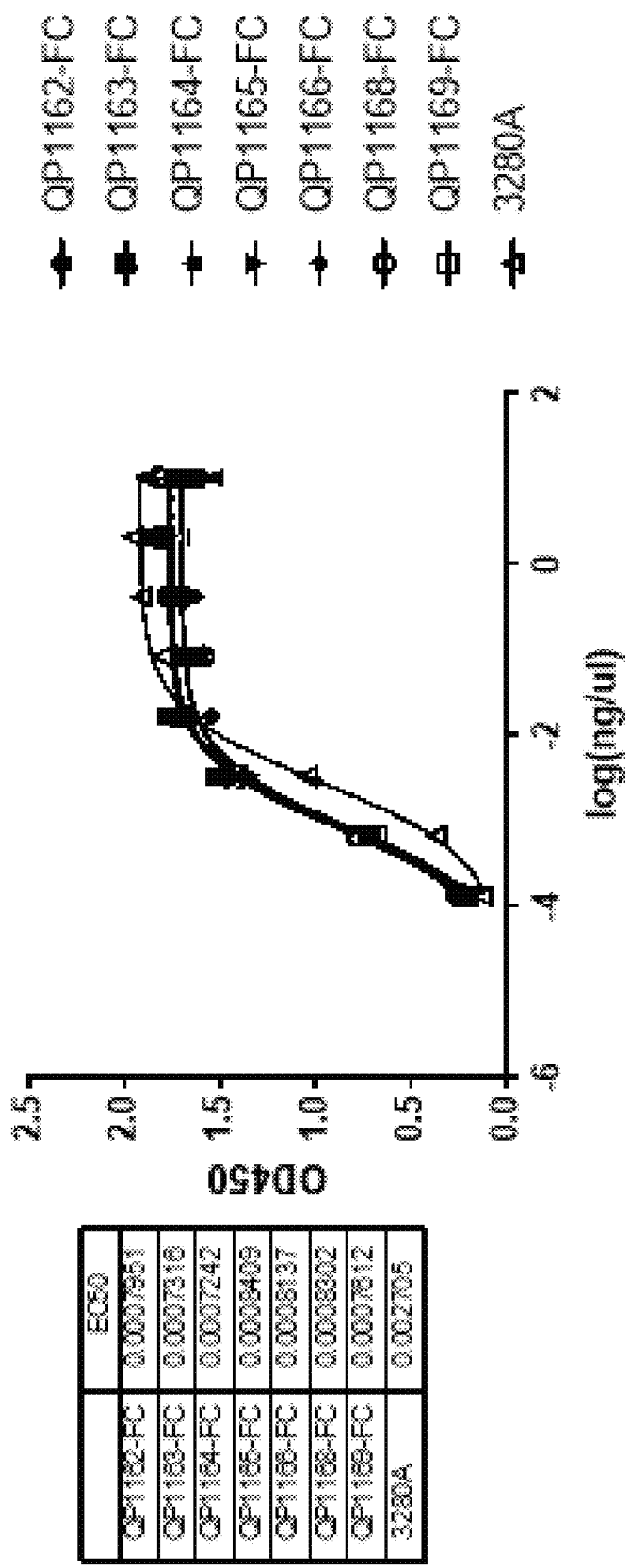
FIG. 1D shows the binding curve of human Fc fusion protein of PD-L1 nanobody numbers QP1162, QP1163, QP1164, QP1165, QP1166, QP1168 and QP1169 to PD-L1 protein.

EC50 values of each antibody corresponding
to the experimental results in FIG. 1D

|  | EC50 |
| --- | --- |
| QP1162-FC | 0.0007951 |
| QP1163-FC | 0.0007316 |
| QP1164-FC | 0.0007242 |
| QP1165-FC | 0.0008409 |
| QP1166-FC | 0.0008137 |
| QP1168-FC | 0.0008302 |
| QP1169-FC | 0.0007612 |
| 3280A | 0.002705 |

3. Binding Curve of PD-L1 Nanobody Human Fc Fusion Protein to Biotinylated Mouse PD-L1 Protein
a) Mouse PDL1 was expressed by HEK293. Biotinylated protein mPDL1-Biotin was obtained using Biotinlytion kit of Thermo.
b) The plate was coated with Strepavidin, 4 μg/ml, 50 ul/well, overnight at 4° C.
c) Washing the plate with 1×PBS for 3 times, 3% BSA was added to block, 250 ul/well, and incubated at room temperature for 1 hour.
d) Washing the plate with 1×PBST for 3 times and with 1×PBS for 3 times, mPDL1-Biotin was added, 1 ug/ml, 50 ul/well, incubated at room temperature for 1 h.
e) Washing the plate with 1×PBST for 3 times and with 1×PBS for 3 times, antibody to be tested with 5-fold gradient dilution (10 ug/ml to 0.000128 ug/ml) was added, and incubated at room temperature for 1 hour.
f) Washing the plate with 1×PBST for 3 times and with 1×PBS for 3 times, HRP-anti-hFc (1:2500) was added with 50 ul/well, and incubated at room temperature for 1 hour.
g) Washing the plate with 1×PBST for 3 times and with 1×PBS for 3 times, TMB was added with 100 ul/well, then developed in dark at room temperature for 10 min. 2M $H_2SO_4$ was added with 50 ul/well to stop the reaction, and the value was read at 450 nm on the machine.

The results are shown in FIGS. 2A to 2D.

Figure 2A:
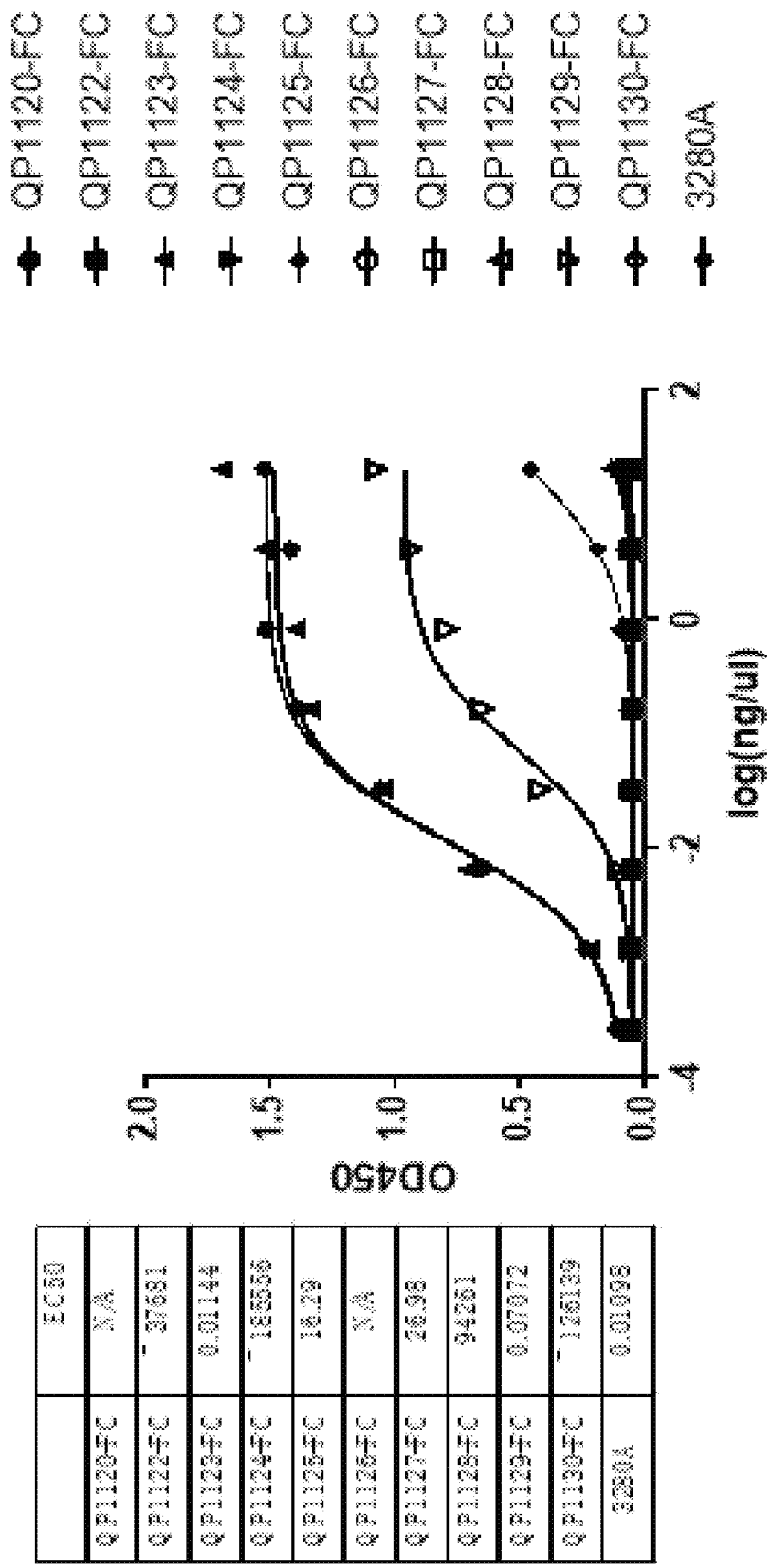
FIG. 2A shows the binding curve of human Fc fusion protein of PD-L1 nanobody numbers QP1120, QP1122, QP1123, QP1124, QP1125, QP1126, QP1127, QP1128, QP1129 and QP1130 to biotinylated mouse PD-L1 protein.

Table 5 shows EC50 values for each antibody corresponding to the experimental results in FIG. 2A

|  | EC50 |
| --- | --- |
| QP1120-FC | N/A |
| QP1122-FC | ~37681 |
| QP1123-FC | 0.01144 |
| QP1124-FC | ~185556 |
| QP1125-FC | 16.29 |
| QP1126-FC | N/A |
| QP1127-FC | 26.98 |
| OP1128-FC | 94261 |
| QP1129-FC | 0.07072 |
| QP1130-FC | ~126139 |
| 3280A | 0.01098 |

Figure 2B:
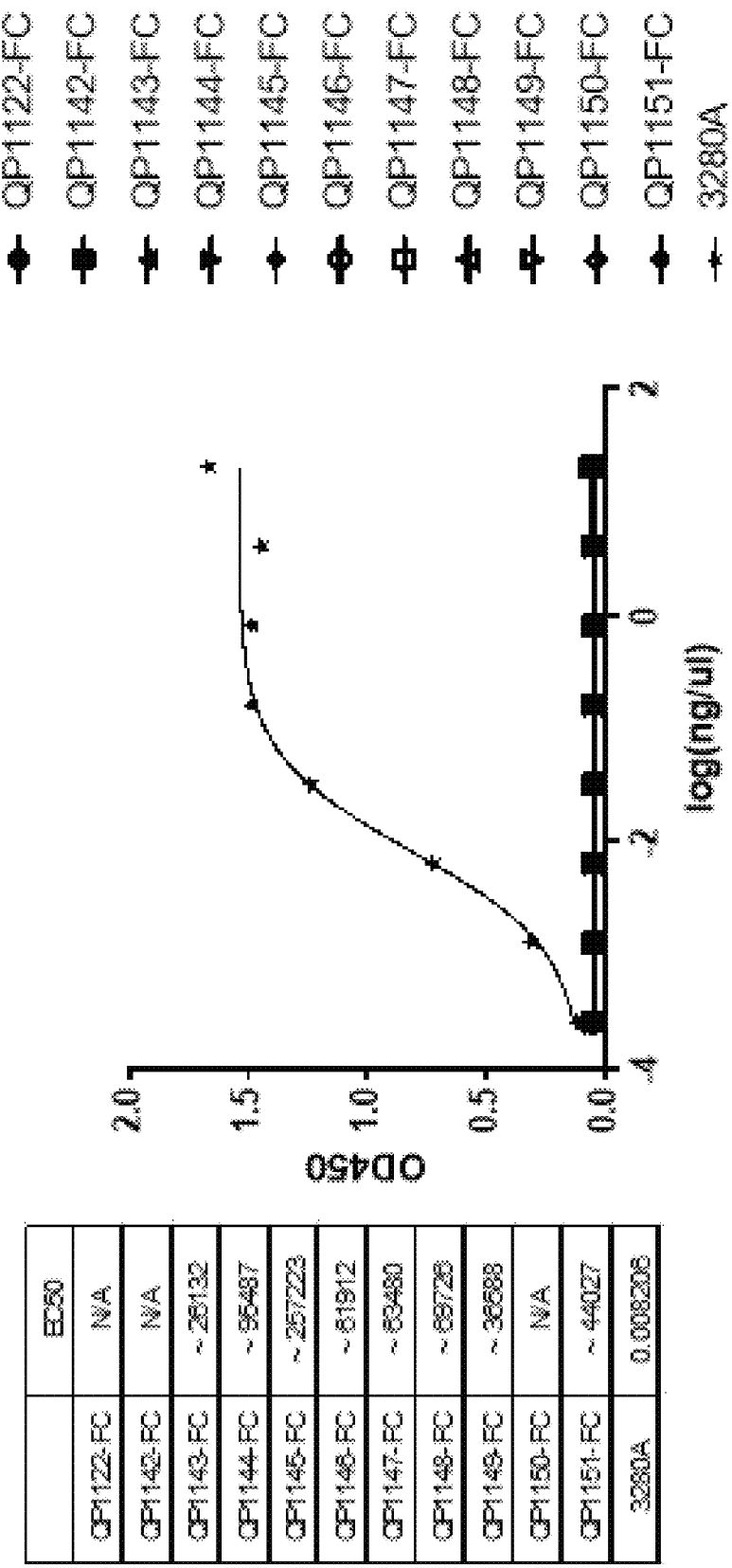
FIG. 2B shows the binding curve of human Fc fusion protein of PD-L1 nanobody numbers QP1122, QP1142, QP1143, QP1144, QP1145, QP1146, QP1147, QP1148, QP1149, QP1150 and QP1151 to biotinylated mouse PD-L1 protein.

Table 6 shows the EC50 values of each antibody corresponding to the experimental results in FIG. 2B

|  | EC50 |
| --- | --- |
| QP1122-FC | N/A |
| QP1142-FC | N/A |
| QP1143-FC | ~26132 |
| QP1144-FC | ~95487 |
| QP1145-FC | ~257223 |
| QP11A6-FC | ~61912 |
| QP1147-FC | ~63480 |
| QP1148-FC | ~69726 |
| QP1149-FC | ~36588 |
| OP1150-FC | N/A |
| OP1151-FC | ~44027 |
| 3280A | 0.008206 |

Figure 2C:
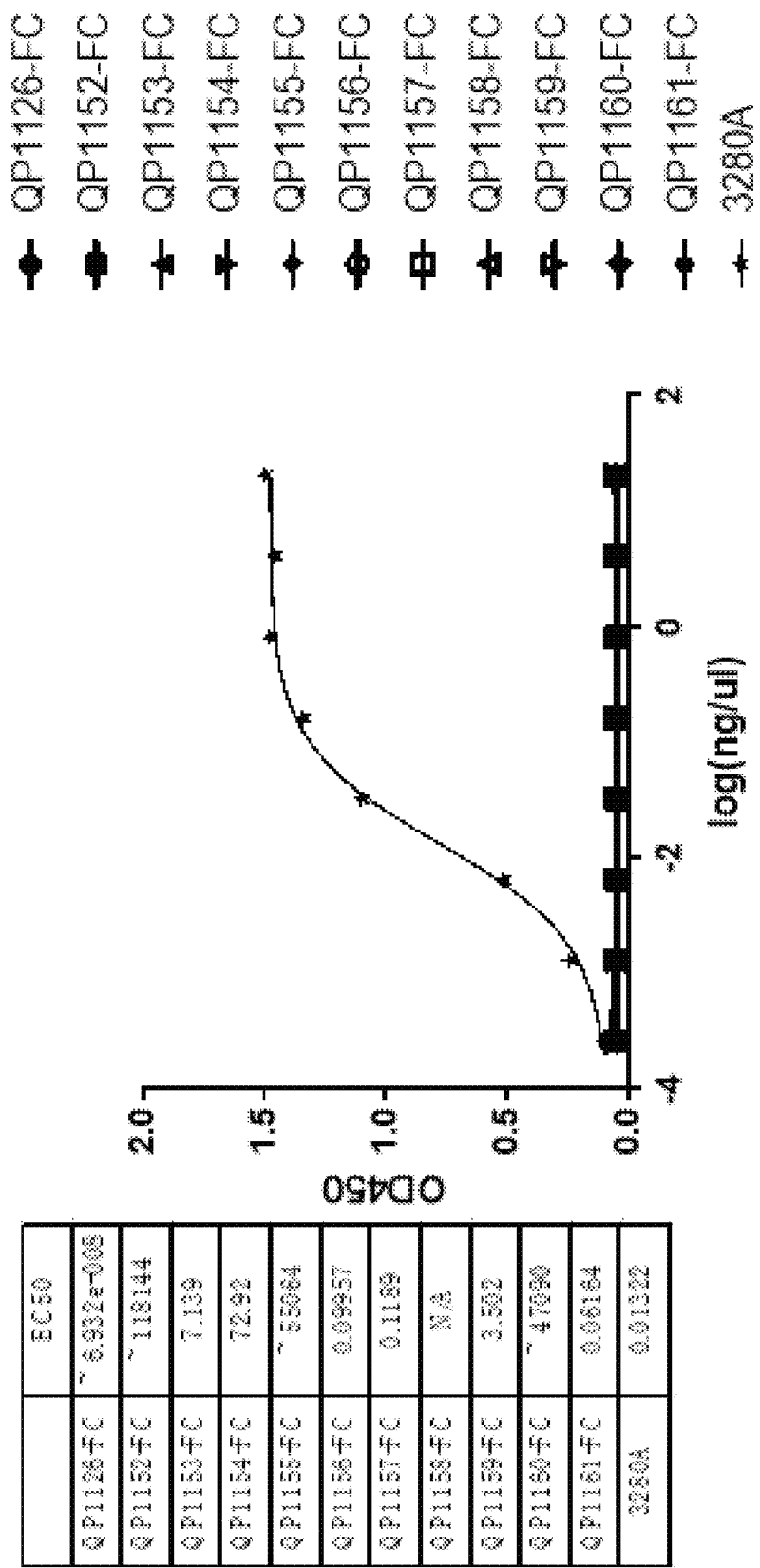
FIG. 2C shows the binding curve of human Fc fusion protein of PD-L1 nanobody numbers QP1126, QP1152, QP1153, QP1154, QP1155, QP1156, QP1157, QP1158, QP1159, QP1160 and QP1161 to biotinylated mouse PD-L1 protein.

Table 7 shows the EC50 values of each antibody corresponding to the experimental results in FIG. 2C

|  | EC50 |
| --- | --- |
| QP1126-FC | ~6.932e−008 |
| QP1152-FC | ~118144 |
| QP1153-FC | 7.139 |
| QP1154-FC | 72.92 |
| QP1155-FC | ~55064 |
| QP1156-FC | 0.09957 |
| QP1157-FC | 0.1189 |
| QP1158-FC | N/A |
| QP1159-FC | 3.502 |
| QP1160-FC | ~47090 |
| QP1161-FC | 0.06164 |
| 3280A | 0.01322 |

Figure 2D:
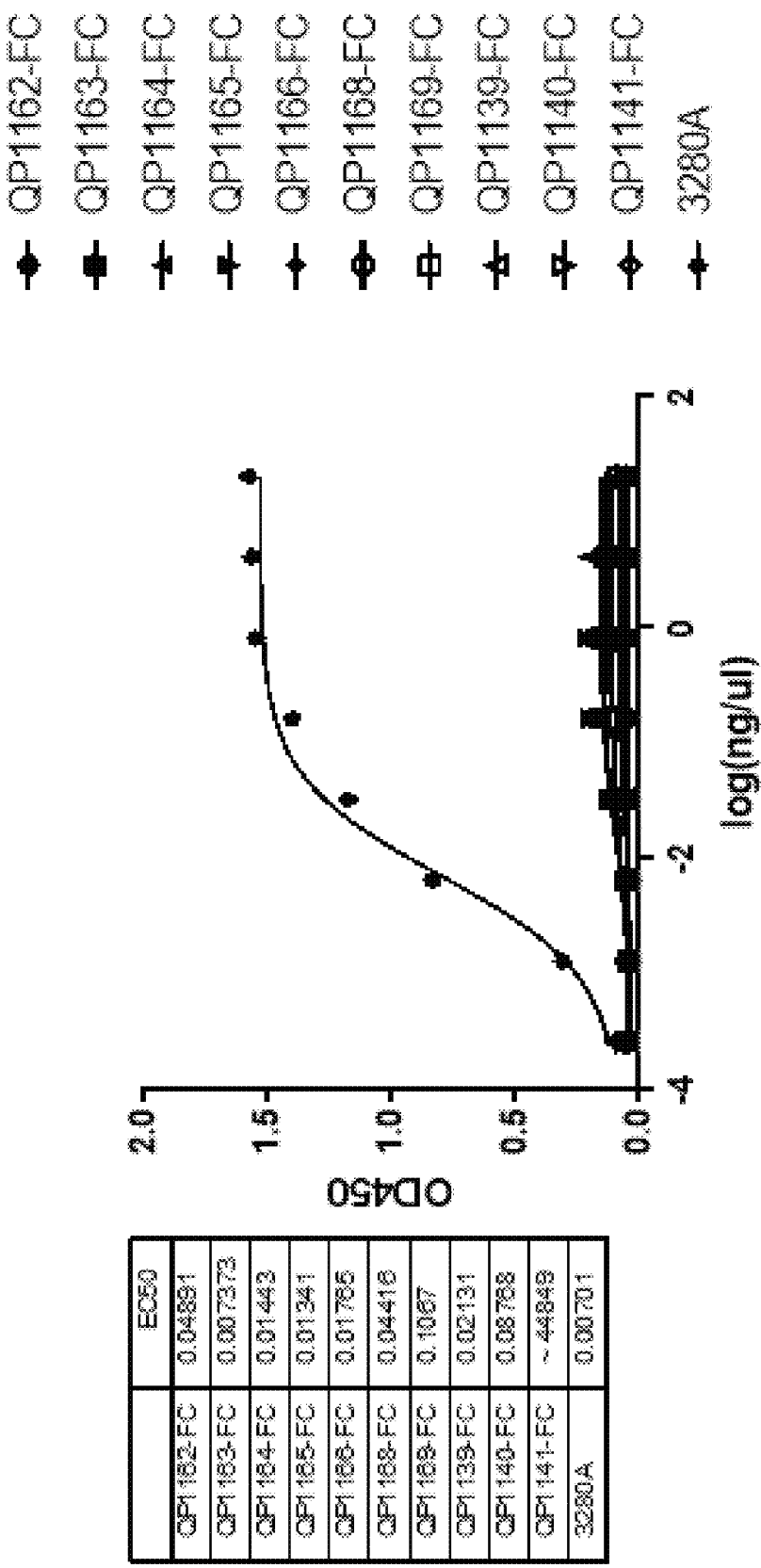
FIG. 2D shows the binding curve of human Fc fusion protein of PD-L1 nanobody numbers QP1162, QP1163, QP1164, QP1165, QP1166, QP1168, QP1169, QP1139, QP1140, and QP1141 to biotinylated mouse PD-L1 protein.

Table 8 shows the EC50 values of each antibody corresponding to the experimental results in FIG. 2D

|  | EC50 |
| --- | --- |
| QP1162-FC | 0.04891 |
| QP1163-FC | 0.007373 |

-continued

| | EC50 |
|---|---|
| QP1164-FC | 0.01443 |
| QR1165-FC | 0.01341 |
| QP1166-FC | 0.01765 |
| QP1168-FC | 0.04416 |
| QP1169-FC | 0.1067 |
| QP1139-FC | 0.02131 |
| QP1140-FC | 0.08768 |
| QP1141-FC | ~44849 |
| 3280A | 0.00701 |

4. The Curve of PD-L1 Nanobody Human Fc Fusion Protein Blocking PD-1/PD-L1 Interaction, Detected by Competitive ELISA
  a) The plate was coated with PDL1-hFc fusion protein, 1 ug/ml, 100 ul/well, overnight at 4° C.
  b) Washing the plate with 1×PBS for 3 times, 3% BSA was added to block, 250 ul/well, and incubated at room temperature for 1 hour.
  c) Washing the plate with 1×PBST for 3 times and with 1×PBS for 3 times, PDL1-mFc was added, 2 ug/ml, 50 ul/well, and antibody to be tested with 5-fold gradient dilution (20 ug/ml to 0.000256 ug/ml) was added at the same time, incubated at room temperature for 1 hour.
  d) Washing the plate with 1×PBST for 3 times and with 1×PBS for 3 times, HRP-anti-mFc (1:2500) was added with 50 ul/well, and incubated at room temperature for 1 hour.
  e) Washing the plate with 1×PBST for 3 times and with 1×PBS for 3 times, TMB was added with 100 ul/well, then developed in dark at room temperature for 10 min. 2M $H_2SO_4$ was added with 50 ul/well to stop the reaction, and the value was read at 450 nm on the machine.

Figure 3A:
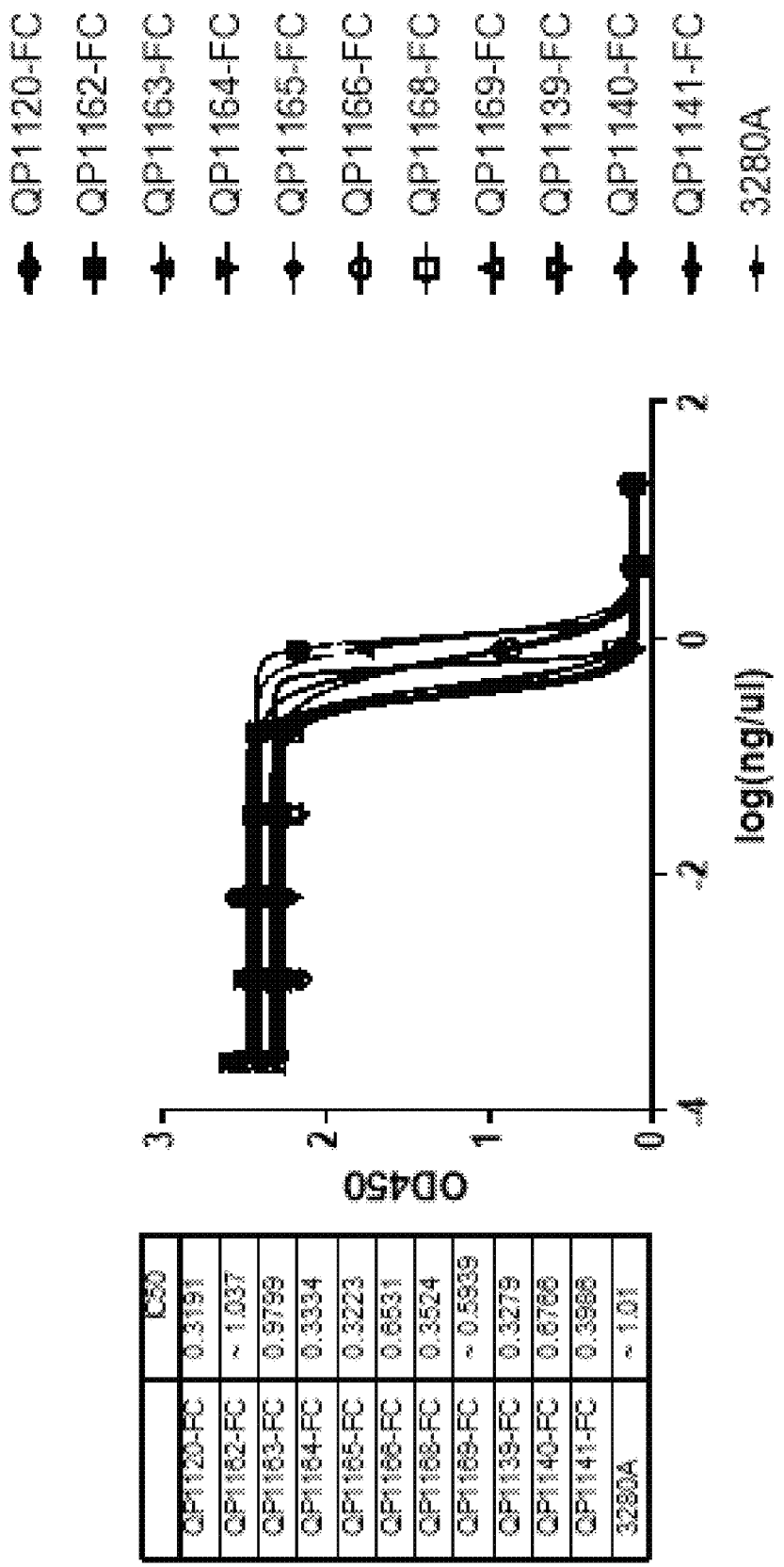
FIG. 3A shows the PD-1/PD-L1 interaction blocking curve of PD-L1 nanobody numbers QP1120, QP1162, QP1163, QP1164, QP1165, QP1166, QP1168, QP1169, QP1139, QP1140 and QP1141.
Figure 3B:
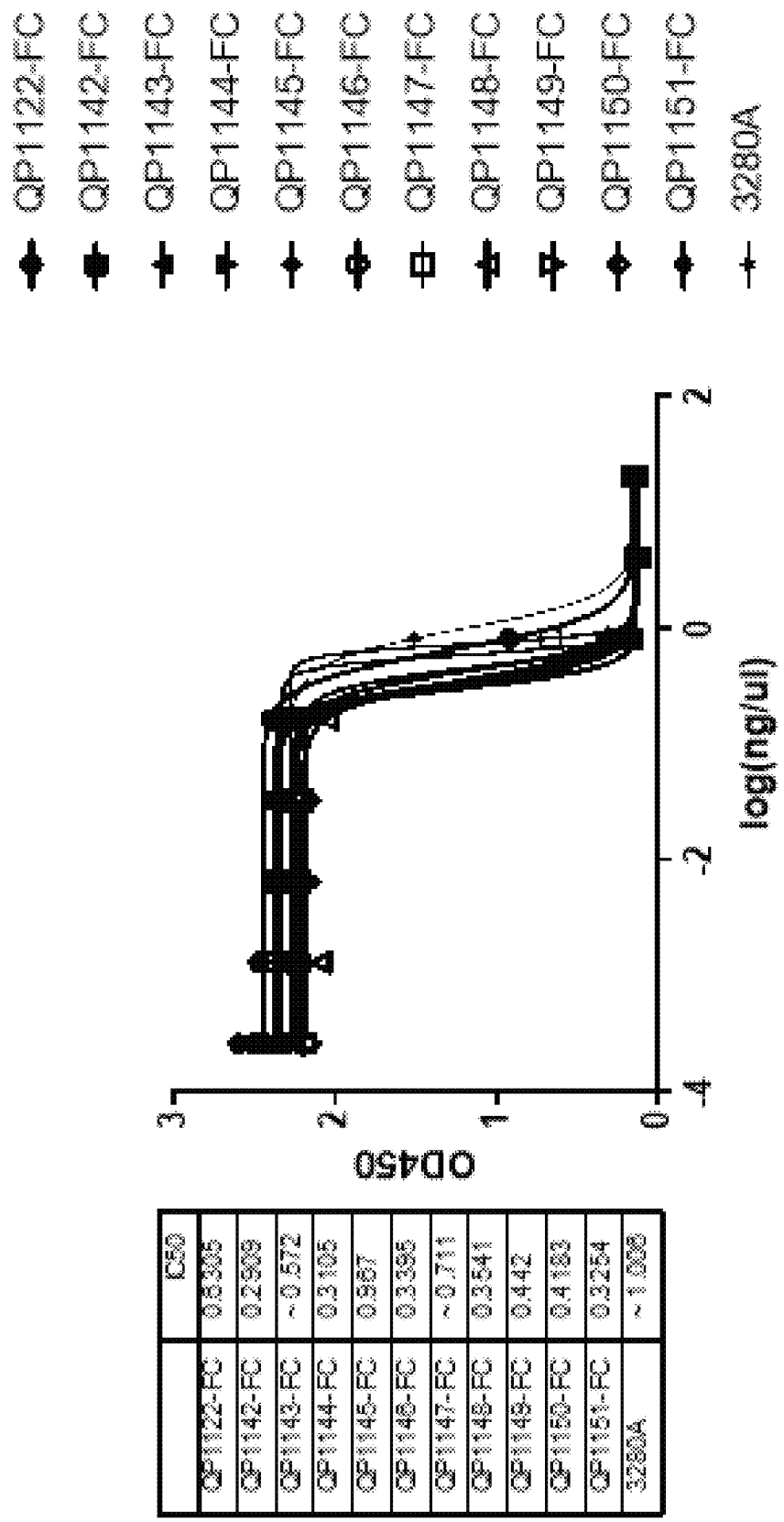
FIG. 3B shows the PD-1/PD-L1 interaction blocking curve of human Fc fusion protein of PD-L1 nanobody numbers QP1122, QP1142, QP1143, QP1144, QP1146, QP1147, QP1148, QP1149, QP1150 and QP1151.
Figure 3C:
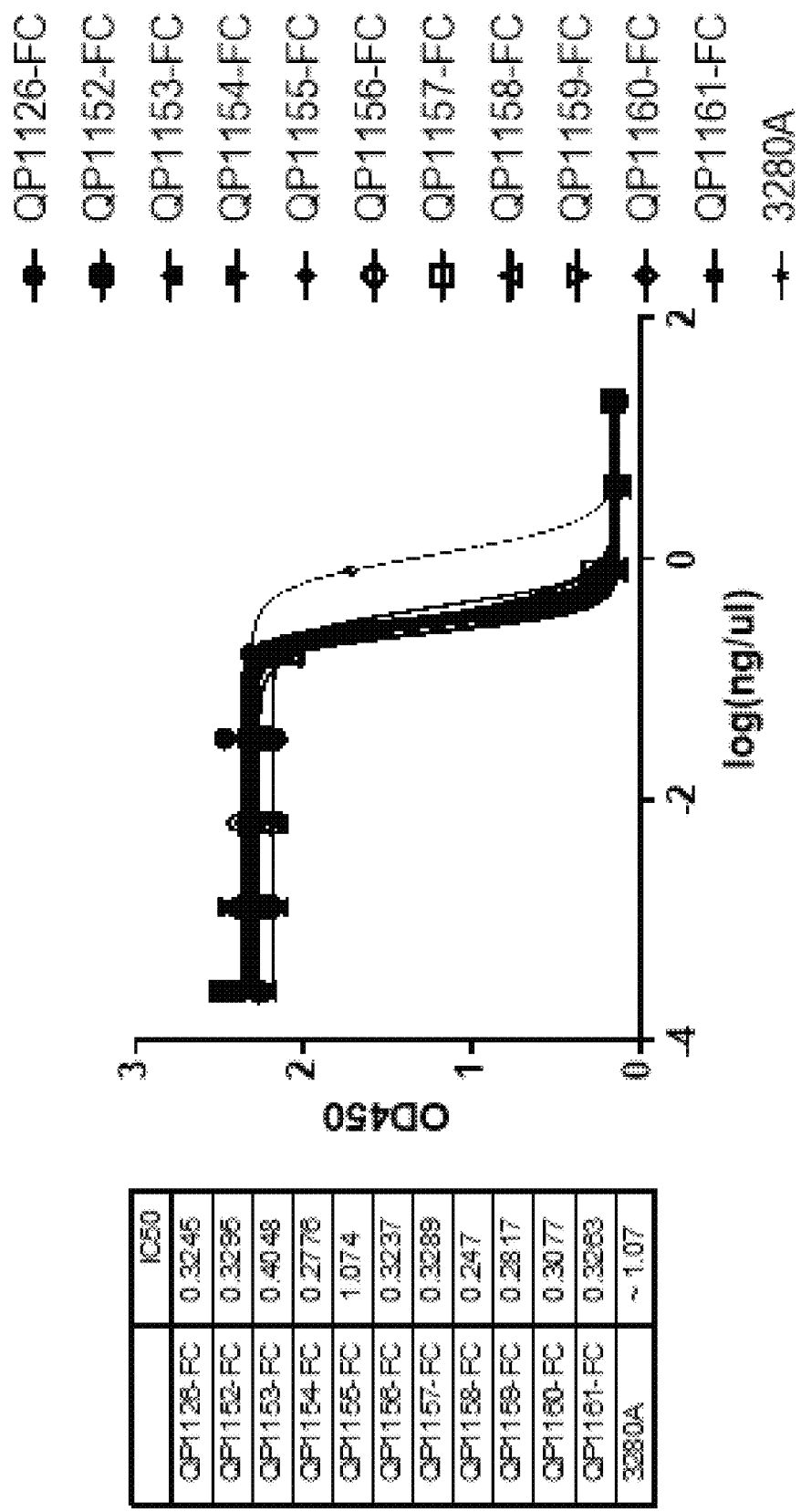
FIG. 3C shows the PD-1/PD-L1 interaction blocking curve of human Fc fusion protein of PD-L1 nanobody numbers QP1126, QP1152, QP1153, QP1154, QP1155, QP1156, QP1157, QP1158, QP1159, QP1160, QP1161.

The results are shown in FIGS. 3A to 3C.

Table 9 shows the IC50 values of each antibody corresponding to the experimental results in FIG. 3A

| | IC50 |
|---|---|
| QP1120-FC | 0.3191 |
| QP1162-FC | ~1.037 |
| QP1163-FC | 0.9799 |
| QP1184-FC | 0.3334 |
| QP1165-FC | 0.3223 |
| QP1166-FC | 0.6531 |
| QP1168-FC | 0.3524 |
| QP1169-FC | ~0.5939 |
| QP1139-FC | 0.3279 |
| QP1140-FC | 0.6766 |
| QP1141-FC | 0.3986 |
| 3280A | ~1.01 |

Table 10 shows the IC50 values of each antibody corresponding to the experimental results in FIG. 3B

| | IC50 |
|---|---|
| QP1122-FC | 0.6305 |
| QP1142-FC | 0.2909 |
| QP1143-FC | ~0.572 |
| QP1144-FC | 0.3105 |
| QP1145-FC | 0.967 |
| QP1146-FC | 0.3395 |
| QP1147-FC | ~0.711 |
| QP1148-FC | 0.3541 |
| QP1149-FC | 0.442 |

| | IC50 |
|---|---|
| QP1150-FC | 0.4183 |
| QP1151-FC | 0.3254 |
| 3280A | ~1.006 |

Table 11 shows the IC50 values of each antibody corresponding to the experimental results in FIG. 3C

| | IC50 |
|---|---|
| QP1126-FC | 0.3245 |
| QP1152-FC | 0.3295 |
| QP1153-FC | 0.4048 |
| QP1154-FC | 0.2776 |
| QP1155-EC | 1.074 |
| QP1156-FC | 0.3237 |
| QP1157-FC | 0.3289 |
| QP1158-FC | 0.247 |
| QP1159-FC | 0.2817 |
| QP1160-FC | 0.3077 |
| QP1161-FC | 0.3263 |
| 3280A | ~1.07 |

5. The Curve of PD-L1 Nanobody Human Fc Fusion Protein Blocking PD-1/PD-L1 Interaction, Detected by Competitive ELISA and Biotin
  a) Biotinylated protein PDL1-Biotin was obtained using Biotinlytion kit of Thermo.
  b) The plate was coated with PDL1-hFc fusion protein, 1 ug/ml, 100 ul/well, overnight at 4° C.
  c) Washing the plate with 1×PBS for 3 times, 3% BSA was added to block, 250 ul/well, and incubated at room temperature for 1 hour.
  d) Washing the plate with 1×PBST for 3 times and with 1×PBS for 3 times, PDL1-Biotin was added, 2 ug/ml, 50 ul/well, and an equal volume of antibody to be tested with 3-fold gradient dilution (100 nM to 0.0457 nM, corresponding mass concentration is 15 ug/ml to 0.00686 ug/ml) was added at the same time, then incubated at room temperature for 1 hour.
  e) Washing the plate with 1×PBST for 3 times and with 1×PBS for 3 times, HRP-Strepavidin (1:5000) was added with 50 ul/well, and incubated at room temperature for 1 hour.
  f) Washing the plate with 1×PBST for 6 times and with 1×PBS for 3 times, TMB was added with 100 ul/well, then developed in dark at room temperature for 10 min. 2M $H_2SO_4$ was added with 50 ul/well to stop the reaction, and the value was read at 450 nm on the machine.

The results are shown in FIGS. 4A to 4G.

Figure 4A:
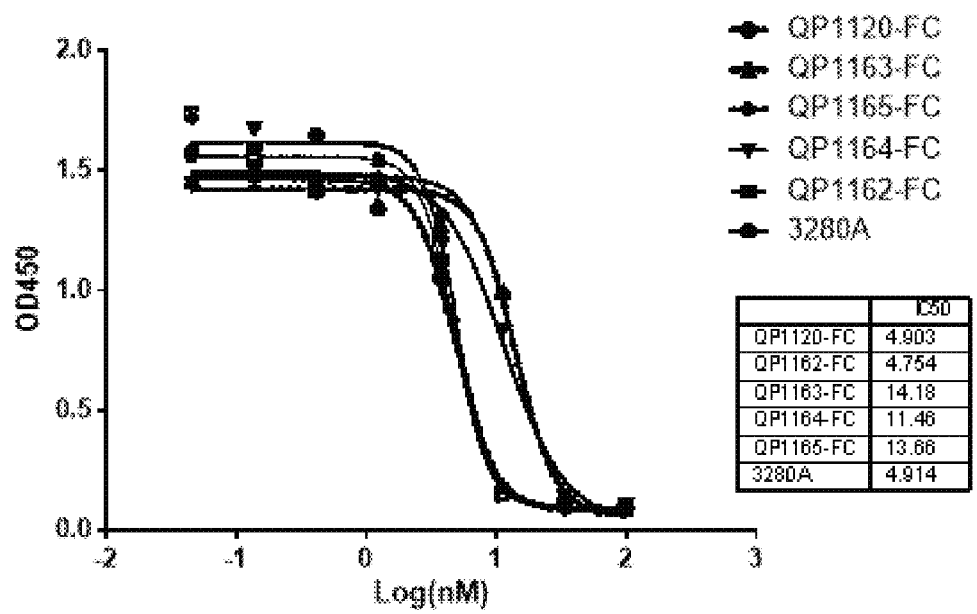
FIG. 4A shows the PD-1/PD-L1 interaction blocking curve of human Fc fusion protein of PD-L1 nanobody numbers QP1120, QP1162, QP1163, QP1164 and QP1165.

Table 12 shows the IC50 values of each antibody corresponding to the experimental results in FIG. 4A

| | IC50 |
|---|---|
| QP1120-FC | 4.903 |
| QP1162-FC | 4.754 |
| QP1163-FC | 14.18 |
| QP1164-FC | 11.46 |
| QP1165-FC | 13.66 |
| 3280A | 4.914 |

Figure 4B:
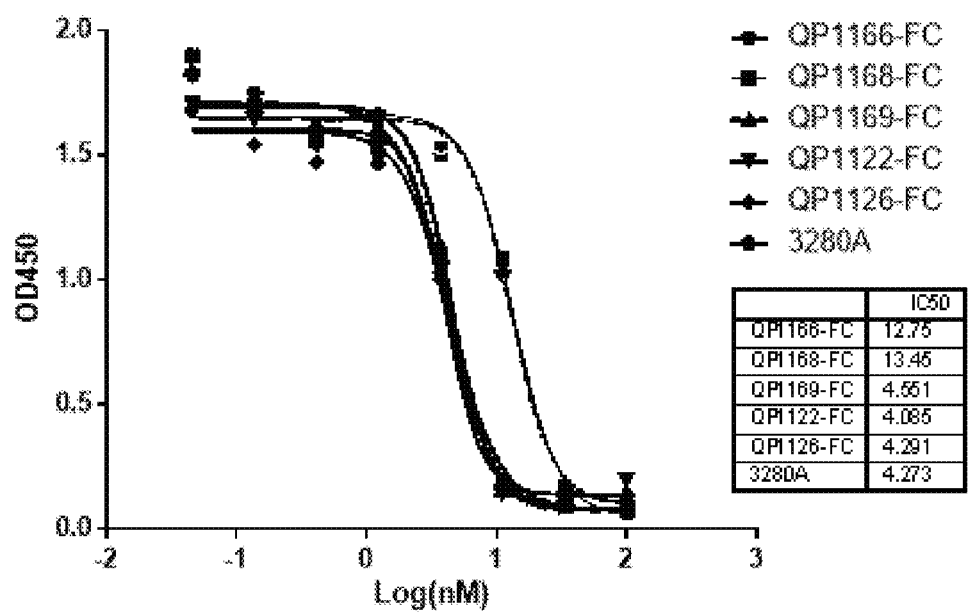
FIG. 4B shows the PD-1/PD-L1 interaction blocking curve of human Fc fusion protein of PD-L1 nanobody numbers QP1166, QP1168, QP1169, QP1122 and QP1126.

Table 13 shows the IC50 values of each antibody corresponding to the experimental results in FIG. 4B

|  | IC50 |
|---|---|
| QP1166-FC | 12.75 |
| QP1168-FC | 13.45 |
| QP1169-FC | 4.551 |
| QP1122-FC | 4.085 |
| QP1126-FC | 4.291 |
| 3280A | 4.273 |

Figure 4C:
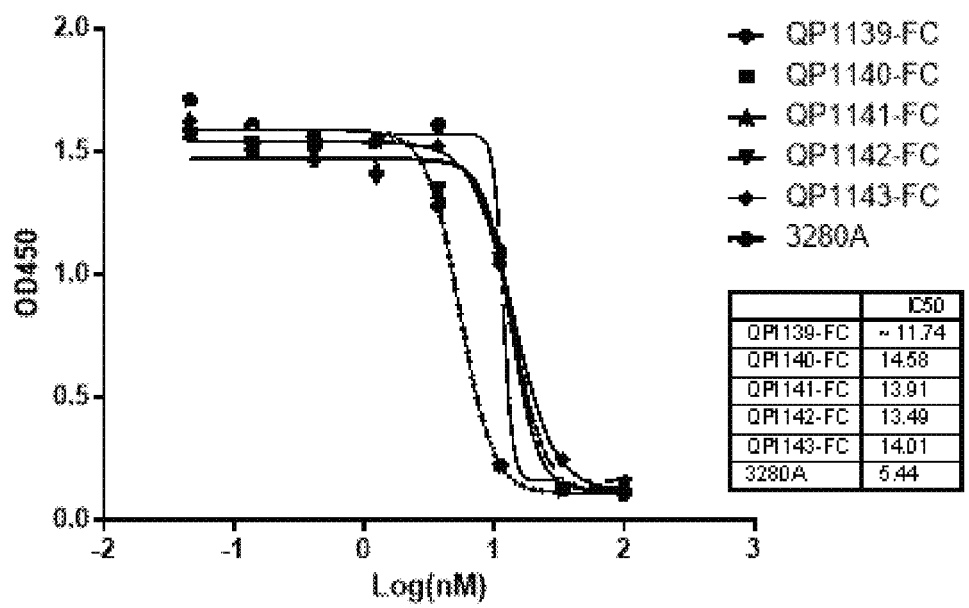
FIG. 4C shows the PD-1/PD-L1 interaction blocking curve of human Fc fusion protein of PD-L1 nanobody numbers QP1139, QP1140, QP1141, QP1142 and QP1143.

Table 14 shows the IC50 values of each antibody corresponding to the experimental results in FIG. 4C

|  | IC50 |
|---|---|
| QP1139-FC | ~11.74 |
| QP1140-FC | 14.58 |
| QP1141-FC | 13.91 |
| QP1142-FC | 13.49 |
| QP1143-FC | 14.01 |
| 3280A | 5.44 |

Figure 4D:
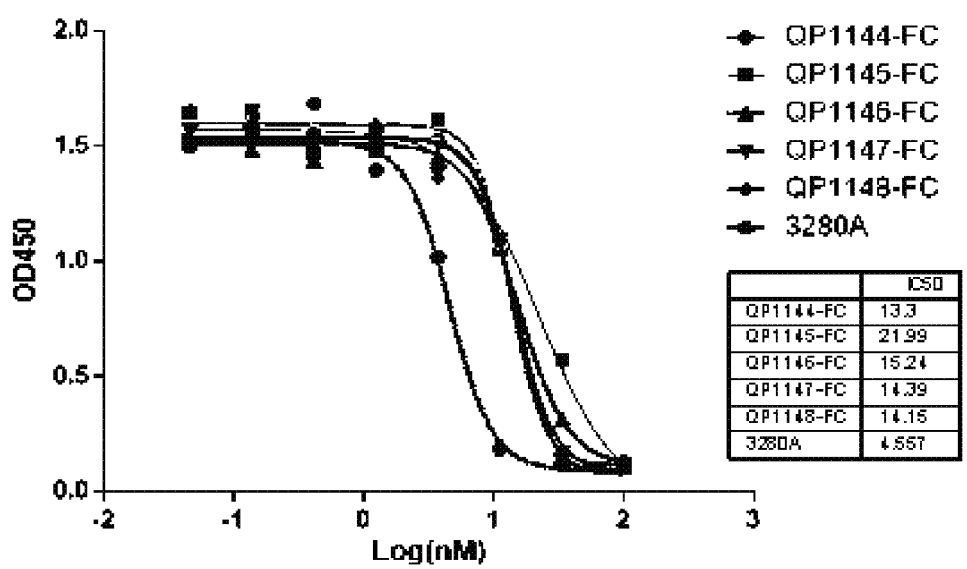
FIG. 4D shows the PD-1/PD-L1 interaction blocking curve of human Fc fusion protein of PD-L1 nanobody numbers QP1144, QP1145, QP1146, QP1147 and QP1148.

Table 15 shows the IC50 values of each antibody corresponding to the experimental results in FIG. 4D

|  | IC50 |
|---|---|
| QP1144-FC | 13.3 |
| QP1145-FC | 21.99 |
| QP1146-FC | 15.24 |
| QP1147-FC | 14.39 |
| QP1148-FC | 14.15 |
| 3280A | 4.557 |

Figure 4E:
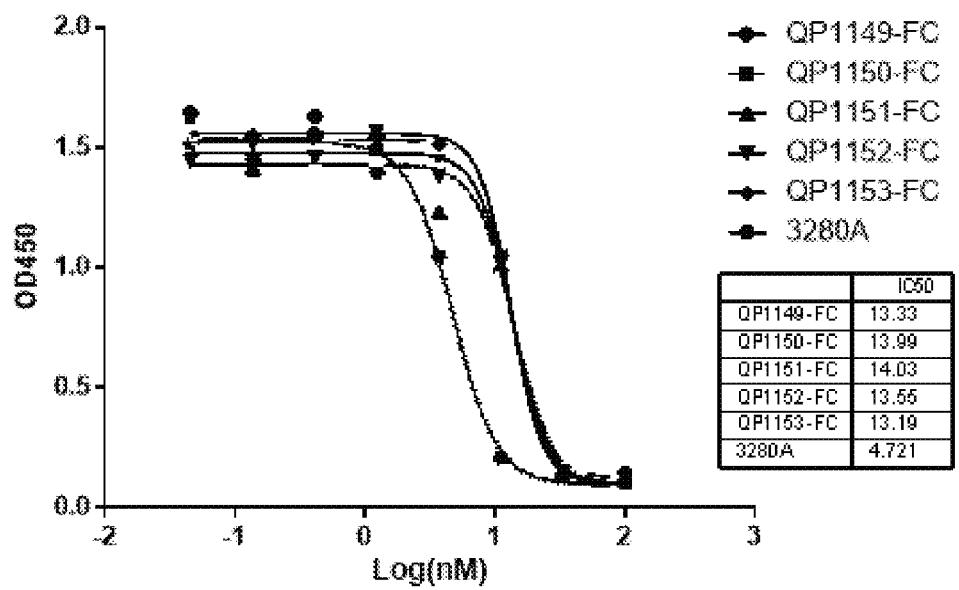
FIG. 4E shows the PD-1/PD-L1 interaction blocking curve of human Fc fusion protein of PD-L1 nanobody numbers QP1149, QP1150, QP1151, QP1152 and QP1153.

Table 16 shows the IC50 values of each antibody corresponding to the experimental results in FIG. 4E

|  | IC50 |
|---|---|
| QP1149-FC | 13.33 |
| QP1150-FC | 13.99 |
| QP1151-FC | 14.03 |
| QP1152-FC | 13.55 |
| QP1153-FC | 13.19 |
| 3280A | 4.721 |

Figure 4F:
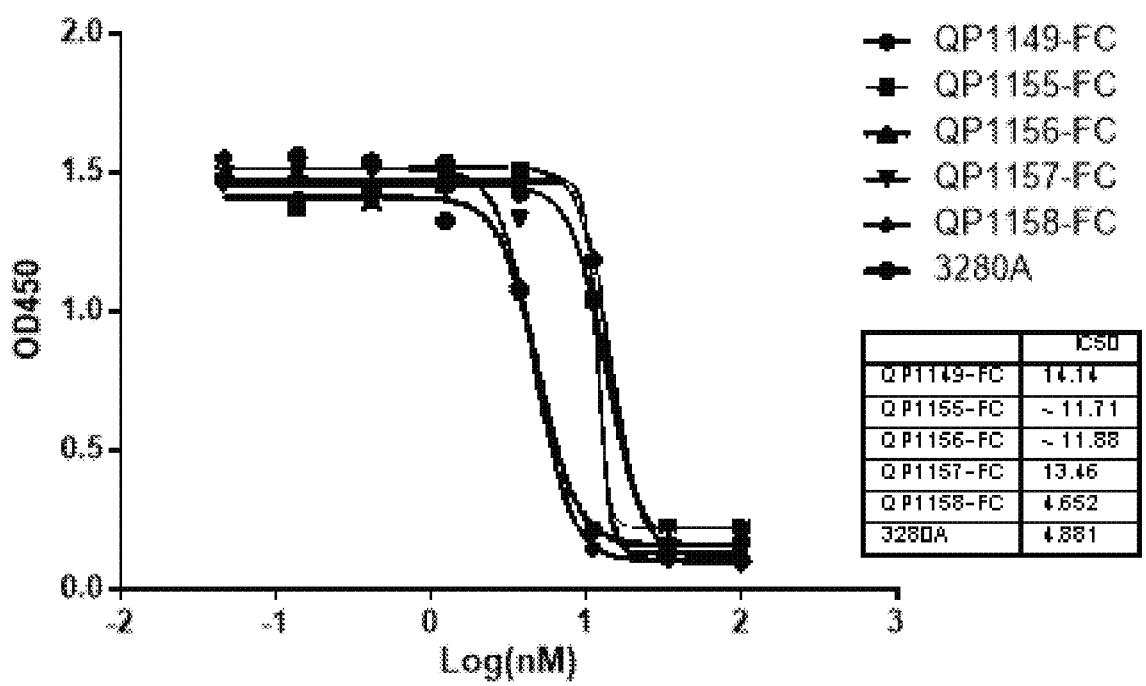
FIG. 4F shows the PD-1/PD-L1 interaction blocking curve of human Fc fusion protein of PD-L1 nanobody numbers QP1149, QP1155, QP1156, QP1157 and QP1158.

Table 17 shows the IC50 values of each antibody corresponding to the experimental results in FIG. 4F

|  | IC50 |
|---|---|
| QP1149-FC | 14.14 |
| QP1155-FC | ~11.71 |
| QP1156-FC | ~11.88 |
| QP1157-FC | 13.46 |
| QP1158-FC | 4.652 |
| 3280A | 4.881 |

Figure 4G:
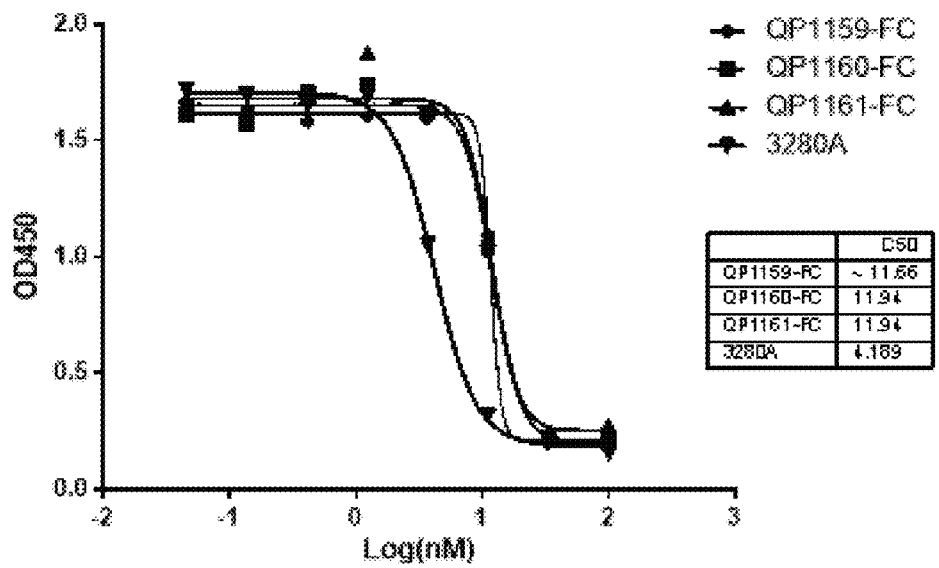
FIG. 4G shows PD-1/PD-L1 interaction blocking curve of human Fc fusion protein of PD-L1 nanobody numbers QP1159, QP1160 and QP1161.

Table 18 shows the IC50 values of each antibody corresponding to the experimental results in FIG. 4G

|  | IC50 |
|---|---|
| QP1159-FC | ~11.66 |
| QP1160-FC | 11.94 |
| QP1161-FC | 11.94 |
| 3280A | 4.189 |

6. Binding Curve of PD-L1 Nanobody Human Fc Fusion Protein to Human Non-Small Cell Lung Cancer Cell Line HCC827 a) There is naturally high expression of PD-L1 in human non-small cell lung cancer cell HCC827. HCC827 cells in logarithmic growth were prepared (confluence 80%). The cells were planted in a costar 96-well plate with $1E^5$ cells/well after adjusting the concentration. Washing the plate once with 1×PBS, 3% BSA was added, 250 ul/well, and incubated at 37° C. for 1 h.

b) Antibody to be tested with 4-fold gradient dilution (33.33 nM to 0.008 nM, corresponding mass concentration is 5 ug/ml to 0.001 ug/ml) was added, 50 ul/well, incubated on ice for 1 h.

c) Washing the plate twice with 1×PBS, PE-anti hFc (1:200) was added, 50 ul/well, incubated on ice for 1 h.

d) Washing the plate with 1×PBS for 3 times, and the value was read on the machine.

Figure 5A:
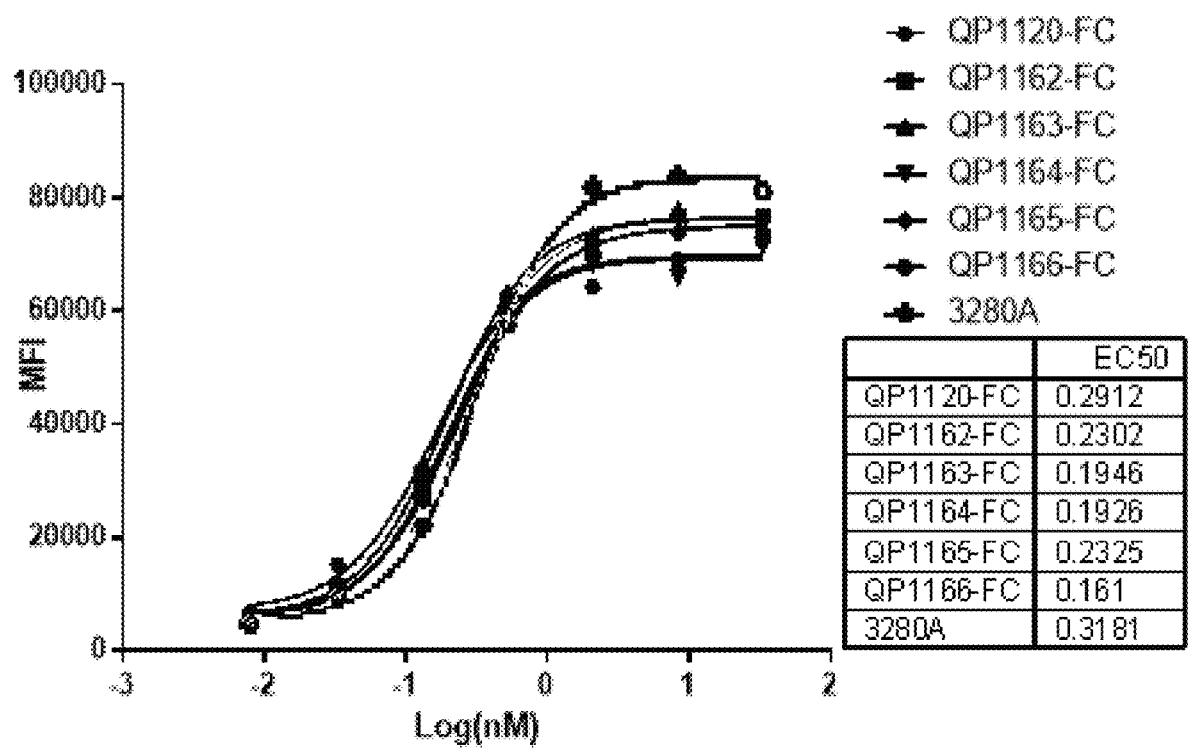
FIG. 5A shows the binding curve of human Fc fusion protein of PD-L1 nanobody numbers QP1120, QP1162, QP1163, QP1164, QP1165 and QP1166 to human non-small cell lung cancer cell HCC827.
Figure 5B:
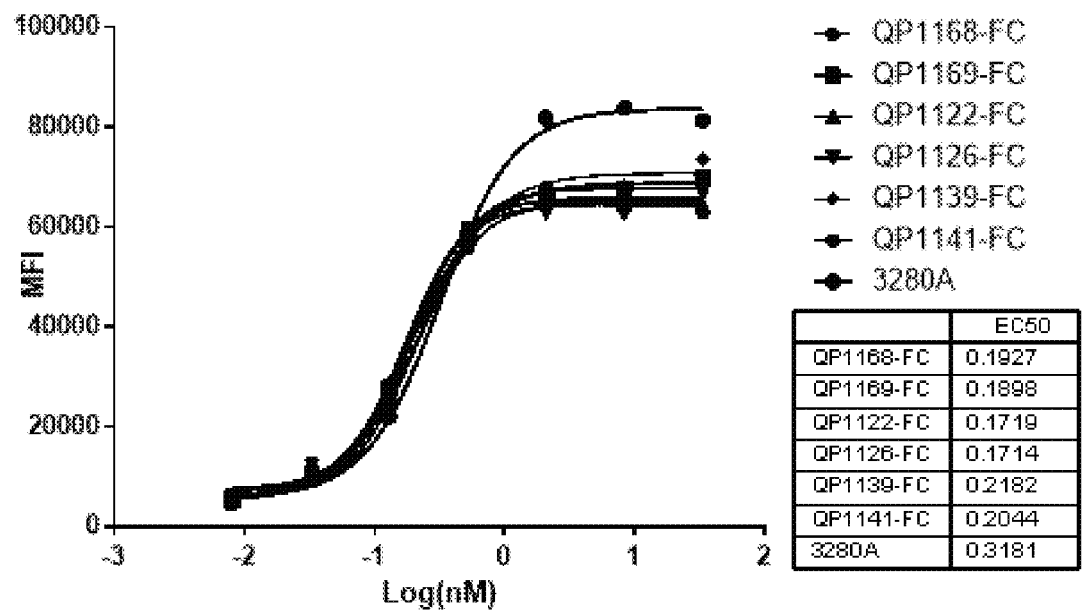
FIG. 5B shows the binding curve of human Fc fusion protein of PD-L1 nanobody numbers QP1168, QP1169, QP1122, QP1126, QP1139 and QP1141 to human non-small cell lung cancer cell HCC827.
Figure 5C:
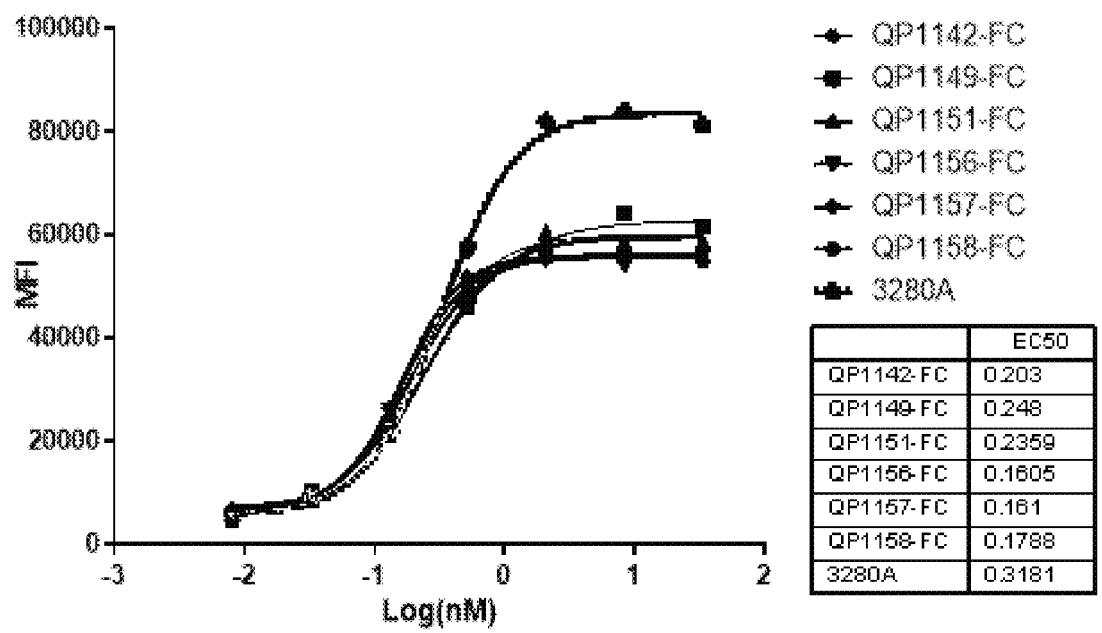
FIG. 5C shows the binding curve of human Fc fusion protein of PD-L1 nanobody numbers QP1142, QP1149, QP1151, QP1156, QP1157 and QP1158 to human non-small cell lung cancer cell HCC827.

The results are shown in FIGS. 5A to 5C.

Table 19 shows the EC50 values of each antibody corresponding to the experimental results in FIG. 5A

|  | EC50 |
|---|---|
| QP1120-FC | 0.2912 |
| QP1162-FC | 0.2302 |
| QP1163-FC | 0.1946 |
| QP1164-FC | 0.1926 |
| QP1165-FC | 0.2325 |
| QP1166-FC | 0.161 |
| 3280A | 0.3181 |

Table 20 shows the EC50 values of each antibody corresponding to the experimental results in FIG. 5B

|  | EC50 |
|---|---|
| QP1168-FC | 0.1927 |
| QP1169-FC | 0.1898 |
| QP1122-FC | 0.1719 |
| QP1126-FC | 0.1714 |
| QP1139-FC | 0.2182 |
| QP1141-FC | 0.2044 |
| 3280A | 0.3181 |

Table 20 shows the EC50 values of each antibody corresponding to the experimental results in FIG. 5C

|  | EC50 |
|---|---|
| QP1142-FC | 0.203 |
| QP1149-FC | 0.248 |
| QP1151-FC | 0.2359 |
| QP1156-FC | 0.1605 |
| QP1157-FC | 0.161 |
| QP1158-FC | 0.1788 |
| 3280A | 0.3181 |

Example 2 Humanization of Anti-PD-L1 Nanobody

By comparing IMGT human antibody heavy light chain variable region germline gene database and MOE software, the heavy and light chain variable region germline genes with high homology with QP1162 (SEQ ID No:35) and QP1166 (SEQ ID No:39) were selected as templates, and the CDRs of camel antibody were transplanted into the corresponding human templates to form the variable region sequences in the order of FR1-CDR1-FR2-CDR2-FR3-CDR3-FR4. Then some important amino acid residues were selected for reversion mutation combination. The amino acid residues were identified and annotated by Kabat numbering system.

Primers were designed for PCR to construct the VH gene fragment of each humanized antibody, and then homologously recombined with the expression vector pQD with signal peptide and constant region gene (FC) fragment to construct the full-length expression vector VH-FC-pQD.

Using online software DNAWorks (v3.2. 2) (http://helixweb.nih.gov/dnaworks/), multiple primers were designed to synthesize VH/VK gene fragments: 5 '−30 bp signal peptide+VH+30 bp FC-3'. According to the instructions of TaKaRa Primer STAR GXL DNA polymerase, the VH/VK gene fragments were amplified by two-step PCR with the primers designed above. Construction and digestion of expression vector pQD with signal peptide and constant region gene (FC) fragments. The expression vector pQD with signal peptide and constant region gene (FC) fragments was designed and constructed by using restriction enzymes such as BsmBI, which have different recognition sequences and digestion sites. Vector was digested by BsmBI, and the gel was cut and recycled for later use. The expression vector VH-FC-pQD was constructed by recombination. VH containing the recombinant gene fragment and BsmBI digestion recovery expression vector pQD (with signal peptide and constant region gene (FC) fragment) were added into DH5H competent cells at a ratio of 3:1, respectively, ice bath at 0° C. for 30 min, heat shock at 42° C. for 90 seconds, adding 5 times volume of LB medium, incubating at 37° C. for 45 min, coating LB-Amp plate, culturing overnight at 37° C. Monoclones were picked out and sent for sequencing to obtain each target clone.

The sequences and protein expression numbers of variable regions of light and heavy chains of each clone humanized design are as follows. In this table, the antibody fused the constant region of human IgG1-FC at its C terminal:

TABLE 21

QP1162 and QP1166 Humanized Design

| | Protein number | Plasmid number | Sequence number |
|---|---|---|---|
| QP1162 Humanized Design | QP320 | QD320 | SEQ ID No: 100 |
| | QP321 | QD321 | SEQ ID No: 101 |
| | QP322 | QD322 | SEQ ID No: 102 |
| QP1166 Humanized Design | QP323 | QD323 | SEQ ID No: 103 |
| | QP324 | QD324 | SEQ ID No: 104 |
| | QP325 | QD325 | SEQ ID No: 105 |

At the same time, the humanized pre-chimeric antibody and control antibody were designed and cloned as shown in the following table:

TABLE 22

Humanized pre-chimeric antibodies and control antibodies

| | Protein number | Plasmid number | Sequence number |
|---|---|---|---|
| QP1162 | QP1162 | QD1162 | SEQ ID No: 35 |
| QP1166 | QP1166 | QD1166 | SEQ ID No: 39 |
| 3280A | QP11801181 | QD1180 | SEQ ID No: 106 |
| | | QD1181 | SEQ ID No: 107 |

2. Expression of Humanized Protein of Anti-PD-L1 Nanobody

The cell density of 293E was maintained at 0.2-3×10⁶/ml, the culture medium (GIBCO Freestyle 293 expression medium) was used in the maintenance stage, and the cells to be transfected were centrifuged and changed medium one day before transfection, and the cell density was adjusted to 0.5-0.8×10⁶/ml. On the day of transfection, the density of 293E cells was 1-1.5×10⁶/ml. The plasmid and transfection reagent PEI were prepared. The amount of plasmid needed to be transfected was 100 μg/100 ml cells, and the mass ratio of PEI to plasmid was 2:1. The plasmid and PEI were mixed evenly and left standing for 15 min, but not more than 20 min. The mixture of plasmid and PEI was slowly added into 293E cells, and cultured in a shaking table at 8% CO2, 120 rpm and 37° C. On the fifth day of transfection, the supernatant was collected by centrifuging at 4700 rpm for 20 min in a horizontal centrifuge.

3. Purification of Humanized Protein of Anti-PD-L1 Nanobody

Protein A affinity chromatography purification

The equilibrium solution was used to pass through the column, at least 3CV, with an actual volume of 20 ml, ensuring that the pH and conductivity of the solution flowing out of the final instrument were consistent with those of the equilibrium solution, and the flow rate was 1 ml/min. After centrifugation, the supernatant of culture solution was used to pass through the column, and 40 ml of sample was loaded at a flow rate of 0.33 ml/min. The equilibrium solution was used to pass through the column, at least 3CV, with an actual volume of 20 ml, ensuring that the pH and conductivity of the solution flowing out of the final instrument were consistent with those of the equilibrium solution, and the flow rate was 0.33 ml/min. The elution was used to pass through the column, and the elution peak (PAC-EP) was collected when UV280 was up to 15 mAU and stopped when UV280 was down to 15 mAU at a flow rate of 1 ml/min. After sample collection, PAC-EP was adjusted to neutral with pH adjusting solution.

4. Activity Identification of Humanized Anti-PD-L1 Nanobody (Binding-ELISA)

Figure 6:
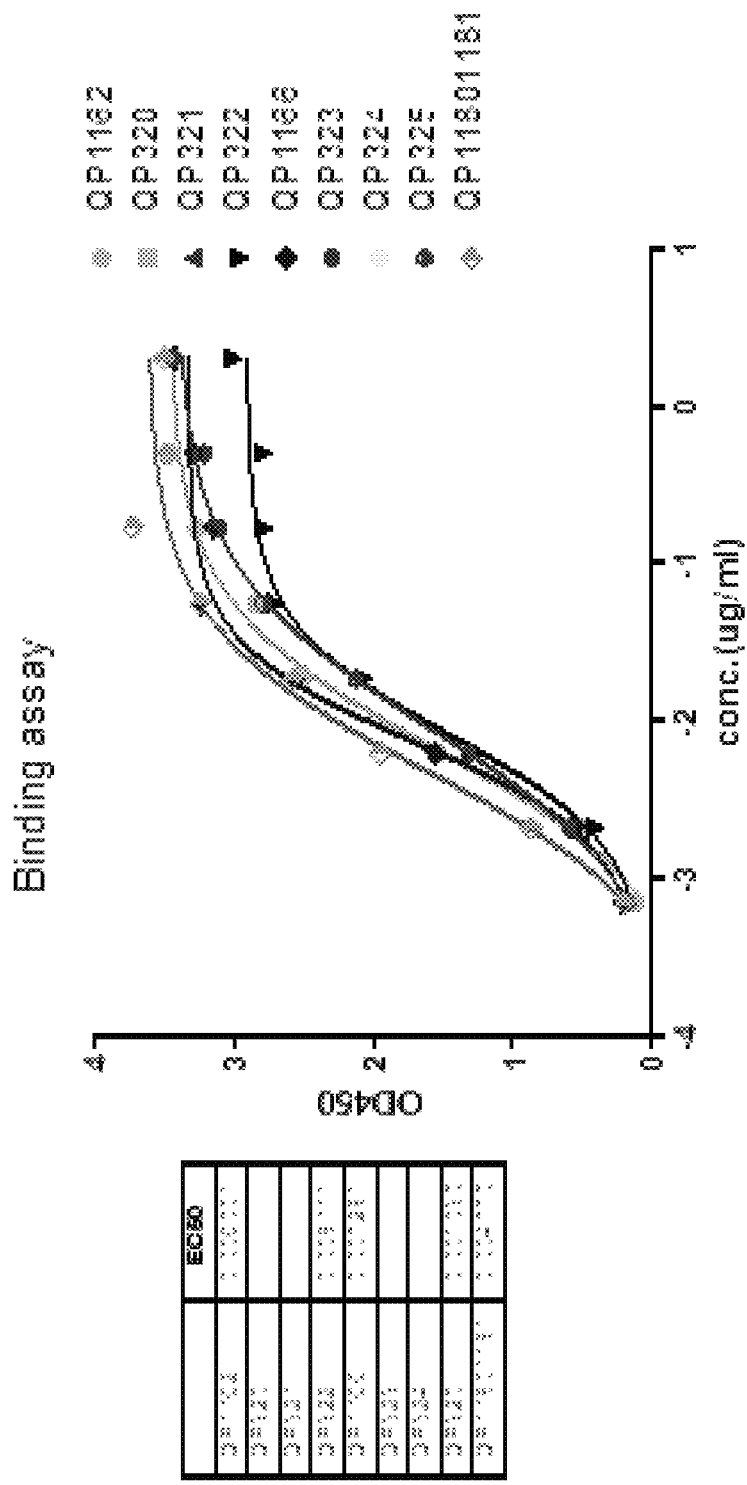
FIG. 6 shows the binding curve of human Fc fusion protein of humanized PD-L1 nanobody numbers QP1162, QP320, QP321, QP322, QP1166, QP323, QP324, QP325 to biotinylated human PDL1 protein.

Coated with antibody QP1162/QP320/QP321/QP322/QP1166/QP323/QP324/QP325 at 0.75 ug/ml, QP11801181 at 1.5 ug/ml, 50 ul/well, overnight at 4° C. Washed with PBS for 3 times. Blocking: 3% BSA 250 ul/well, RT 1 h. After incubation, 2 ug/ml biotin-PDL1-FC was diluted to different concentrations at 1:4, and incubated at room temperature for 1 h. Washed with PBST for 3 times and with PBS for 3 times. Incubation of secondary antibody: HRP-strepavidin (1:5000) 50 ul/well, washed with PBST for 6 times, and with PBS for 3 times. Development: TMB 100 ul/well, developed for 10 min. Terminated with 2M H₂SO₄ 50 ul/well. The results are shown in FIG. 6 and Table 23.

TABLE 23

Results of Humanized Anti-PD-L1 Nanobody Activity Identification (Binding-ELISA)

| conc. (ug/ml) | QP1162 QP1162 | 1162-V1 QP320 | 1162-V2 QP321 | 1162-V3 QP322 | QP1166 QP1166 | 1166-V1 QP323 | 1166-V2 QP324 | 1166-V3 QP325 | QP11801181 |
|---|---|---|---|---|---|---|---|---|---|
| 2.0000 | 3.4366 | 0.2297 | 0.2251 | 3.0042 | 3.4143 | 2.8564 | 0.4130 | 3.4216 | 3.4911 |
| 0.5000 | 3.4482 | 0.1419 | 0.1378 | 2.7861 | 3.2805 | 1.8773 | 0.2012 | 3.2090 | 3.4778 |
| 0.1667 | 3.2597 | 0.0957 | 0.0836 | 2.7811 | 3.1343 | 0.7893 | 0.1285 | 3.1059 | 3.7196 |
| 0.0556 | 2.8355 | 0.0843 | 0.0756 | 2.7008 | 3.2327 | 0.3141 | 0.0882 | 2.7828 | 3.2350 |
| 0.0185 | 2.5016 | 0.0792 | 0.0960 | 2.0715 | 2.5660 | 0.1810 | 0.1070 | 2.1246 | 2.5747 |
| 0.0062 | 1.5396 | 0.1076 | 0.1201 | 1.2735 | 1.5464 | 0.1663 | 0.1502 | 1.3189 | 1.9496 |
| 0.0021 | 0.5232 | 0.1140 | 0.1561 | 0.4107 | 0.5605 | 0.2577 | 0.1414 | 0.5978 | 0.8702 |
| 0.0007 | 0.1214 | 0.1248 | 0.1562 | 0.1756 | 0.2169 | 0.1810 | 0.1917 | 0.1817 | 0.1986 |

5. Activity Identification of Humanized Anti-PD-L1 Nanobody (Blocking-ELISA)

Figure 7:
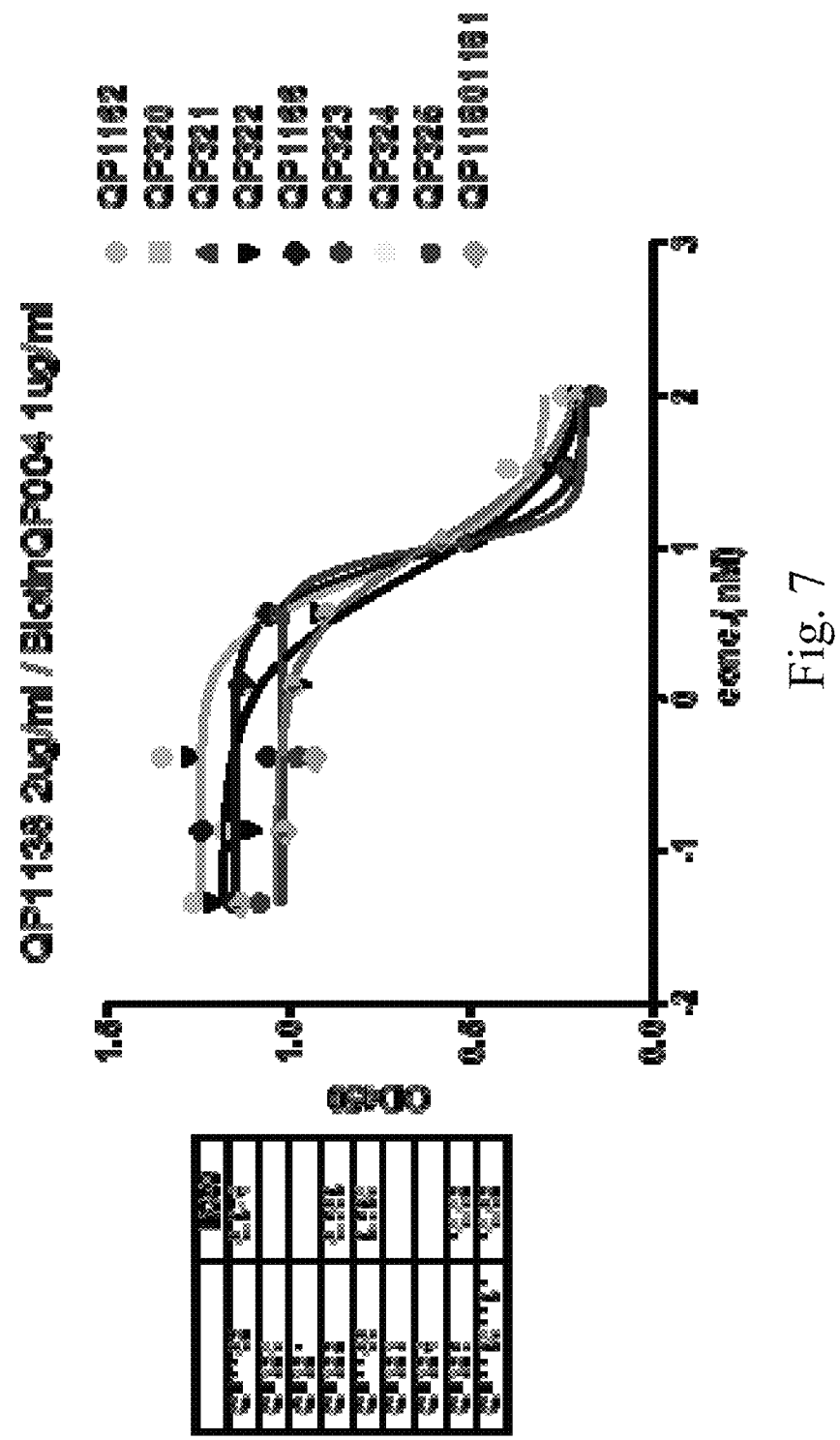
FIG. 7 shows a human Fc fusion protein of humanized PD-L1 nanobody numbers QP1162, QP320, QP321, QP322, QP1166, QP323, QP324 and QP325Blocking curve of PD-1/PD-L1 interaction.

Coated with protein QP1138 (PD1-FC) at 2 ug/ml 50 ul/well, overnight at 4° C. Washed with PBS for 3 times. Blocking: 3% BSA 250 ul/well, incubated at room temperature for 1 h. 2 ug/ml of biotin-PDL1-FC and different concentrations of QP1120 15 ug/ml were prepared respectively, QP11801181 30 µg/ml was diluted at 1:3, mixed in equal volume, and incubated at room temperature for 1 h. Washed with PBST for 3 times and with PBS for 3 times. Incubation of secondary antibody: HRP-strepavidin (1:5000) 50 ul/well, washed with PBST for 6 times, and with PBS for 3 times. Development: TMB 100 ul/well, developed for 10 min. Terminated with 2M $H_2SO_4$ 50 ul/well. The results are shown in FIG. 7 and Table 24.

TABLE 24

Activity identification of humanized anti-PD-L1 nanobody (Blocking-ELISA)

| conc. (nM) | QP1162 QP1162 | 1162-V1 QP320 | 1162-V2 QP321 | 1162-V3 QP322 | QP1166 QP1166 | 1166-V1 QP323 | 1166-V2 QP324 | 1166-V3 QP325 | QP11801181 |
|---|---|---|---|---|---|---|---|---|---|
| 100.0000 | 0.2492 | 0.7935 | 0.9767 | 0.2027 | 0.1670 | 3.6381 | 0.6612 | 0.1562 | 0.2121 |
| 33.3333 | 0.4006 | 1.0171 | 1.0720 | 0.2796 | 0.2387 | 2.1103 | 0.7366 | 0.2385 | 0.3223 |
| 11.1111 | 0.5239 | 1.1210 | 0.9966 | 0.4836 | 0.5084 | 1.5971 | 0.7528 | 0.5127 | 0.5794 |
| 3.7037 | 1.0674 | 1.1120 | 1.0148 | 0.9140 | 1.0593 | 1.2184 | 0.8954 | 1.0284 | 0.8983 |
| 1.2346 | 1.1310 | 1.0771 | 1.0973 | 0.9691 | 1.1316 | 1.0810 | 0.8786 | 0.9946 | 0.9870 |
| 0.4115 | 1.3501 | 1.4679 | 1.4396 | 1.2684 | 1.0611 | 1.1048 | 0.9015 | 0.9752 | 0.9298 |
| 0.1372 | 1.1797 | 1.2951 | 1.1408 | 1.1057 | 1.2426 | 1.1464 | 1.0615 | 1.0203 | 1.0141 |
| 0.0457 | 1.2640 | 1.2146 | 1.3702 | 1.2082 | 1.1562 | 1.3434 | 1.2887 | 1.0817 | 1.1329 |

7. Identification of Affinity of Humanized Anti-PD-L1 Nanobody by SPR

Affinity Detected by Surface Plasmon Resonance (SPR)

Biacore T200 (GE) was used to determine the affinity of the molecules with human PD-L1 and cynoPD-L1 proteins The antigen information is as follows:

TABLE 25

| | Protein numbers | |
|---|---|---|
| Protein number | Protein description | Catalog number |
| QPP09.1 | PD-L1 Protein, Human, Recombinant (His Tag) | SinoBiologic, 10084-H08H |
| QPP10.1 | PD-L1 Protein, Cynomolgus, Recombinant (His Tag) | SinoBiologic, 90251-C08H |

TABLE 26

SPR affinity results

| Kinetics model | Channel | Capture 1 Solution | Analyte 1 Solution | Kinetics chi³ (RU²) | ka (1/Ms) | kd (1/s) | KD (M) | Rmax (RU) | tc |
|---|---|---|---|---|---|---|---|---|---|
| 1:1 binding | 1 | QP1122 | QPP09.1 | 5.32E+00 | 1.19E+07 | 3.89E−02 | 3.26E−09 | 107.3 | 6.00E+07 |
| 1:1 binding | 1 | | QPP10.1 | 1.17E+00 | 4.64E+06 | 3.04E−02 | 6.55E−09 | 123.5 | 5.71E+07 |

TABLE 26-continued

SPR affinity results

| Kinetics model | Channel | Capture 1 Solution | Analyte 1 Solution | Kinetics chi$^3$ (RU$^2$) | ka (1/Ms) | kd (1/s) | KD (M) | Rmax (RU) | tc |
|---|---|---|---|---|---|---|---|---|---|
| 1:1 binding | 2 | QP1126 | QPP09.1 | 3.99E+00 | 1.83E+09 | 5.69E+00 | 3.10E−09 | 46.5 | 1.66E+07 |
| 1:1 binding | 2 | | QPP10.1 | 8.59E−01 | 9.44E+08 | 7.43E+00 | 7.87E−09 | 49.5 | 1.52E+07 |
| 1:1 binding | 3 | QP1162 | QPP09.1 | 7.35E−01 | 1.37E+06 | 3.79E−03 | 2.77E−09 | 119.5 | 1.19E+08 |
| 1:1 binding | 3 | | QPP10.1 | 4.81E−01 | 7.15E+05 | 4.01E−03 | 5.60E−09 | 130.2 | 1.64E+08 |
| 1:1 binding | 4 | QP322 | QPP09.1 | 1.40E+00 | 1.31E+06 | 3.11E−03 | 2.37E−09 | 110.4 | 1.15E+08 |
| 1:1 binding | 4 | | QPP10.1 | 3.91E−01 | 6.57E+05 | 3.54E−03 | 5.39E−09 | 123.1 | 1.41E+08 |
| 1:1 binding | 5 | QP1166 | QPP09.1 | 6.52E−01 | 9.68E+05 | 2.55E−03 | 2.63E−09 | 107 | 1.29E+08 |
| 1:1 binding | 5 | | QPP10.1 | 1.68E−01 | 4.75E+05 | 2.66E−03 | 5.60E−09 | 122.4 | 2.11E+08 |
| 1:1 binding | 6 | QP325 | QPP09.1 | 3.19E−01 | 3.75E+05 | 4.00E−03 | 1.07E−08 | 115.2 | 1.27E+08 |
| 1:1 binding | 6 | | QPP10.1 | 3.51E−02 | 2.12E+05 | 4.16E−03 | 1.96E−08 | 127.3 | 1.25E+09 |
| 1:1 binding | 7 | QP1180 1181 | QPP09.1 | 1.23E−01 | 2.56E+05 | 2.19E−04 | 8.57E−10 | 44.5 | 1.31E+08 |
| 1:1 binding | 7 | | QPP10.1 | 1.80E−01 | 3.91E+08 | 3.75E+00 | 9.60E−09 | 11.7 | 1.04E+06 |

Example 3 Activity Identification of Humanized Anti-PD-L1 Nanobody

Figure 8:
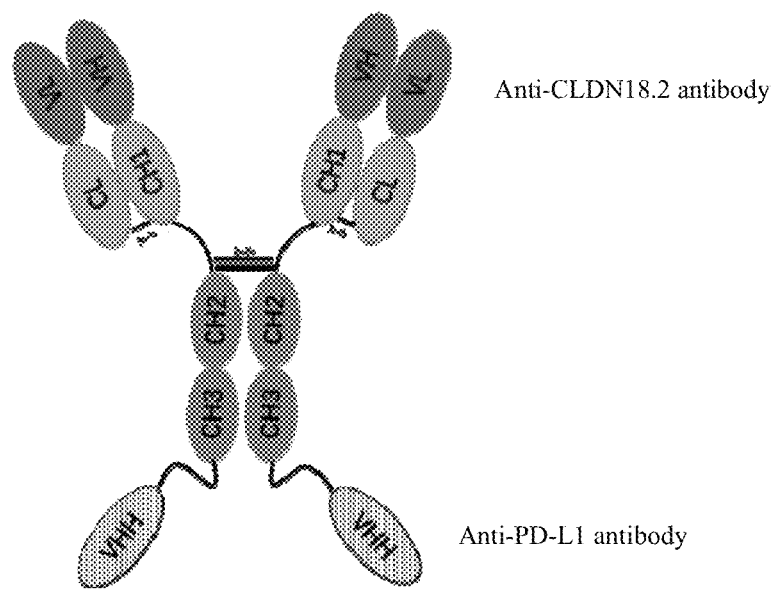
FIG. 8 shows a schematic structural diagram of anti-CLDN18.2/anti-PD-L1 bispecific antibody molecule.

The anti-CLDN18.2/anti-PD-L1 bispecific antibody molecule QP3711461 was constructed and designed as shown in FIG. 8.

| Protein number | Plasmid number | Sequence number | Description |
|---|---|---|---|
| QP3711461 | QD1461 | SEQ ID No: 108 | pQD-antiCLDN18.2 (QD1461) VL-CL |
| | QD371 | SEQ ID No: 109 | pQD-antiCLDN18.2 (QD1463) VH-CH1-FC-antiPDL1 (QD322) |

1. Identification of PD-L1 Function In Vitro (Mixed Lymphocyte Reaction (MLR))

Preparation of DC (donor1) cells: PBMCs were resuscitated, and monocytes were isolated with EasySep™ Human Monocyte Isolation Kit (Stemcell 19359), rhGM-CSF (1000U/ml) and rhIL4 (500 U/ml) were added, and the cells were cultured at 37° C. for 6 days to induce to iDC. The half medium was changed every 2-3 days, and rhGM-CSF (1000 U/ml) and rhIL4 (500 U/ml) were supplemented at the same time. Cells were collected and centrifuged at 300×g for 5 min, then re-suspended in the medium with rhGM-CSF (1000 U/ml) and rhIL4 (500 U/ml), and LPS (1 μg/ml) was added. Cells were cultured at 37° C. for 1 day to induce to mature DC. The cells were collected and counted for later use.

Preparation of T (donor2) cells: PBMCs were resuscitated and CD4+ T cells were isolated with EasySep™ Human CD4+ T Cell Isolation Kit (Stemcell 17952).

Preparation of antibody: 6 concentrations of antibodies (initial concentration of 10 ug/ml) were diluted by 1:5 gradient in medium. DC cells and T cells were mixed at a ratio of 1:10, and different concentrations of antibodies were added, then mixed cultivation. The expression of IL-2 in the culture supernatant was detected on the second day, and the expression of IFNg in the culture supernatant was detected on the fifth day.

Figure 9:
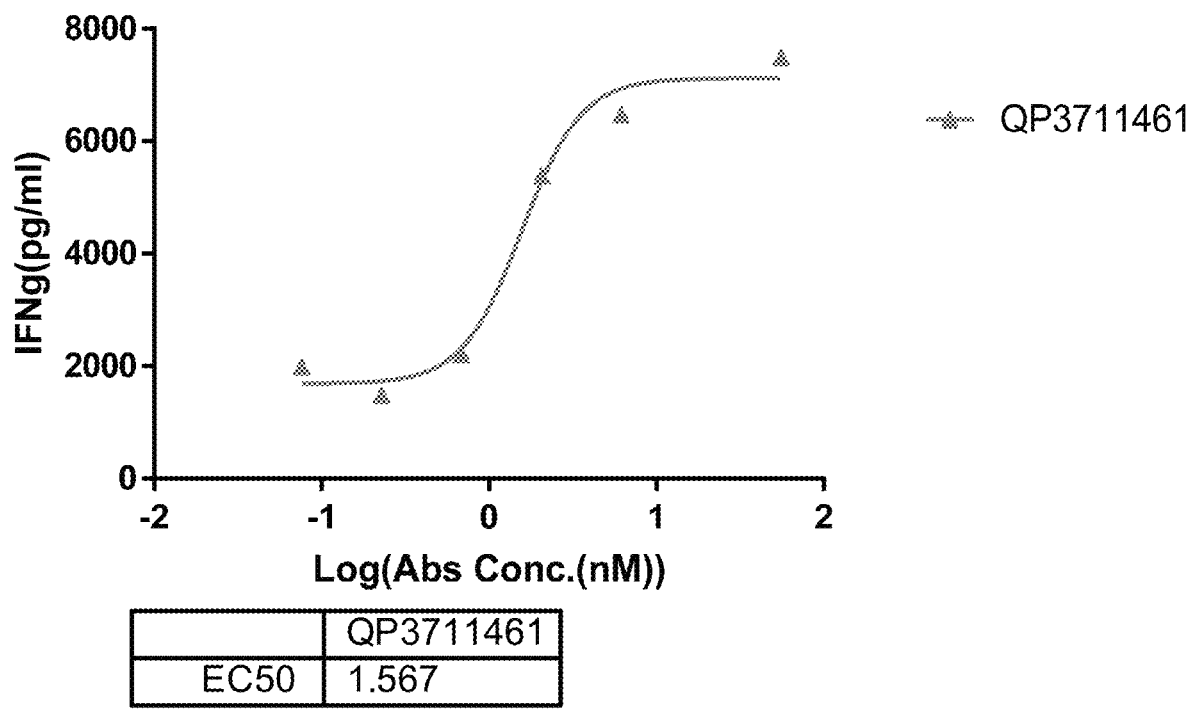
FIG. 9 shows the identification of the PD-L1 functional activity of the anti-CLDN18.2/anti-PD-L1 bispecific antibody (the concentration-dependent result of the QP3711461 to the cytokine IFNγ production after T cell activation in the mixed lymphocyte reaction MLR).
Figure 10:
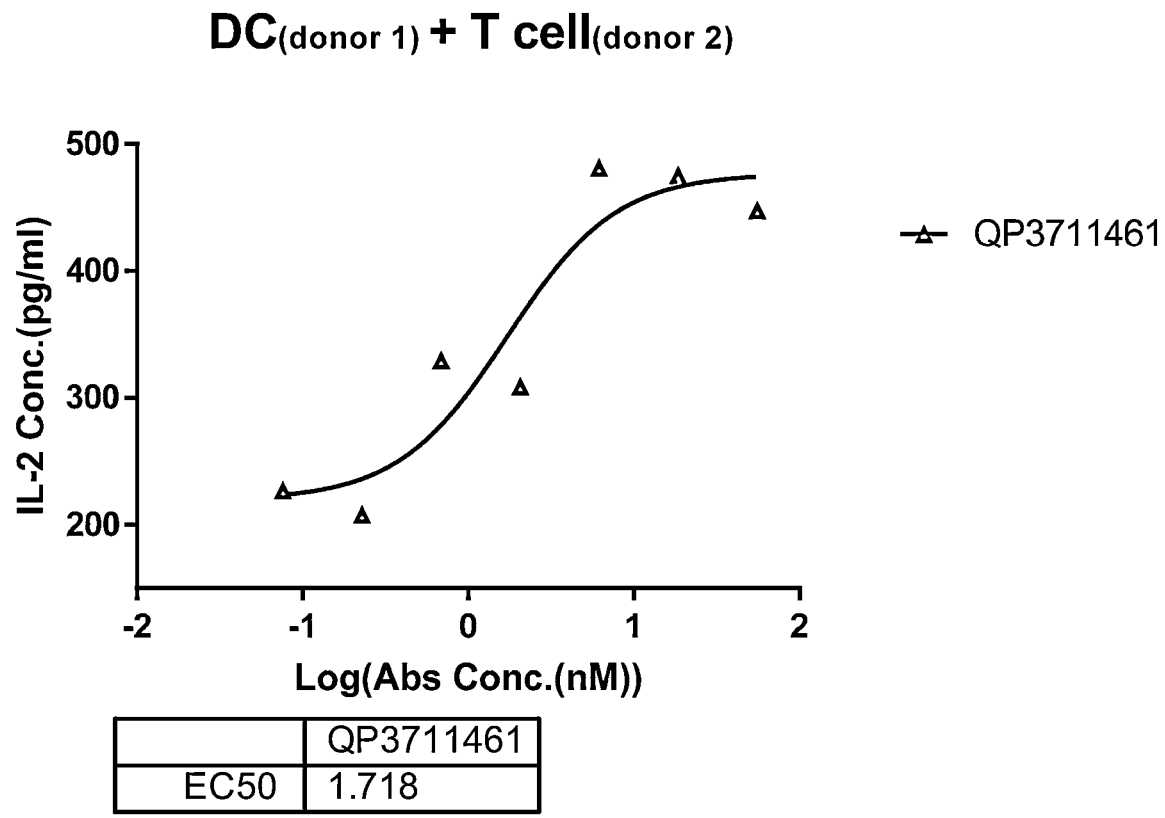
FIG. 10 shows the identification of the PD-L1 functional activity of the anti-CLDN18.2/anti-PD-L1 bispecific antibody (the concentration-dependent result of the QP3711461 to the cytokine IL-2 production after T cell activation in the mixed lymphocyte reaction MLR).

In mixed lymphocyte reaction test, QP3711461 showed obvious antibody concentration dependence on the concentration of IFN γ and IL-2 produced by activated T cells. The biological function of PD-L1 antibody in QP3711461 was proved. As shown in FIGS. 9 and 10.

2. Identification of PD-L1 Function In Vivo

Mouse colon cancer cell line MC38-hPDL1 was used in subcutaneous model of transgenic mouse C57BL/6-hPDL1, to evaluate the efficacy of anti-PD-L1 nanobody in vivo.

Experiment Methods: MC38-hPDL1 cells (which were knocked out mouse PDL1 and expressed human PDL1) of mouse colon cancer cell in logarithmic growth phase were inoculated subcutaneously in the right flank of C57BL/6-hPDL1 mice after the culture medium was removed and washed twice with PBS, inoculation volume: 5×10$^5$/100 μL/mouse. After inoculation, the mice were observed and the growth of tumor was monitored. On the 8th day after inoculation, when the average tumor volume reached 92.9 mm$^3$, they were randomly divided into 4 groups with 9 mice in each group according to the tumor volume. The day of grouping was defined as DO, and administration began on DO.

Figure 11:
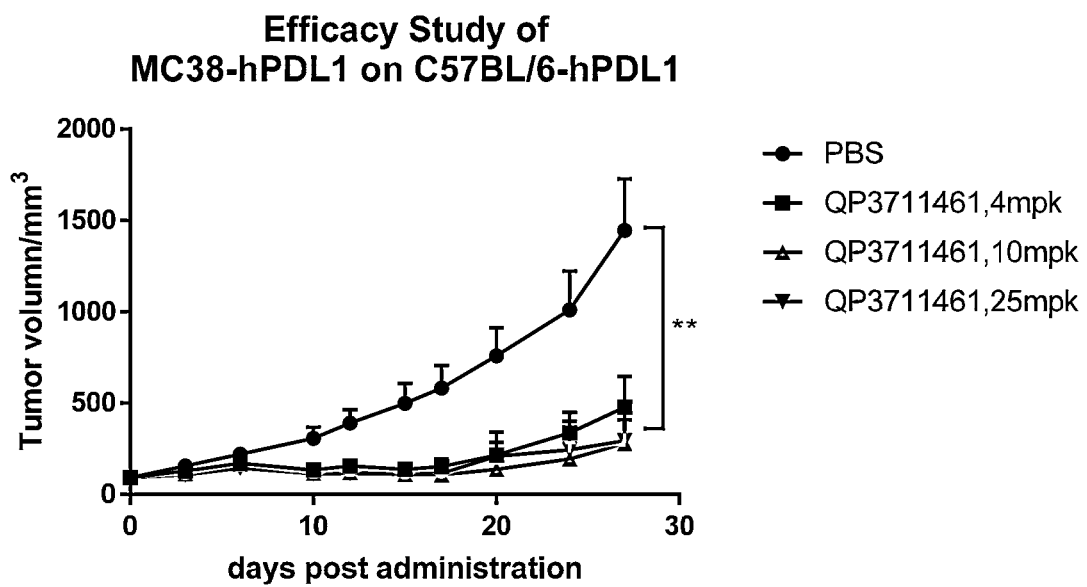
FIG. 11 shows the result of tumor growth curve of anti-CLDN18.2/anti-PD-L1 bispecific antibody in immunotarget humanized transgenic mouse C57BL/6-hPDL1 model MC38-hPDL1.

Experimental results are shown in FIG. 11 and Table 25.

TABLE 25

Tumor volume

| Grouping | Tumor volume on day 27 | Day 27 TGI % | P value (t test) |
|---|---|---|---|
| Vehicle control (PBS) | 1445.20 | — | — |
| QP1461371-4 mpk | 477.00 | 72.00% | 0.0095** |
| QP1461371-10 mpk | 279.97 | 86.14% | 0.0018** |
| QP1461371-25 mpk | 293.96 | 85.14% | 0.0037** |

The anti-CLDN18.2/anti-PD-L1 bispecific antibody QP3711461 was administered at 4mpk, 10mpk, 25mpk, BIW×3, i.p. On the 27th day after administration, the average tumor volume of PBS group (negative control group) reached 1445.20 mm³, the average tumor volume of QP3711461 (4mpk) group was 477.00 mm³, TGI=72. 00%, the average tumor volume of QP3711461 (10mpk) group was 279.97 mm³, TGI=86. 14%, and the average tumor volume of QP3711461 (25mpk) group was 293.96 mm³, TGI=85. 14%. There was significant difference in tumor volume between each administrating group and PBS group (t test, P<0.01).

The experiment showed that the anti-PD-L1 molecule in the anti-CLDN18.2/anti-PD-L1 bispecific antibody of the invention had superior anti-tumor ability in the MC38-hPDL1 model of immune targets humanized transgenic mice.

The anti-PD-L1 nanobody numbers and corresponding sequences provided by the invention are as follows.

```
QP1120
                                                        SEQ ID No: 1
QVQLVESGGSVQSGSLRLSCAASGFTYGTYAMSWFRQAPGKEREGVACIDIYGRTSY

TDPVKGRFTISQDNAKNTLYLQMNSLKPEDTAMYYCAARDFGYCTASWVHEGFSRYWGQ

GTQVTVSS

> QP1121
                                                        SEQ ID No: 2
QVQLVESGGGSVHAGGSLRLSCVRVSMYTYTGTCMAWFRQAPGKEREGVAGLWTG

DGVTYYADSVKGRFTISQDDAKNTLYLQMDSLKPEDTAMYYCASNGMCGQYWALEDEY

KYWGQGTQVTVSS

> QP1122
                                                        SEQ ID No: 3
QVQLVESGGGSVQAGGSLTLSCAVSGNTYSTNVMGWFRQAPGKEREGVAAILAGGR

NTYYADSVKGRFTISQDNAKNTVYLQMNSLKPEDTAMYYCAADTRAAFWNIGPLNSDQY

NIWGQGTQVTVSS

> QP1123
                                                        SEQ ID No: 4
QVQLVESGGGSVQSGGSLRLSCAASGYTVRHYCMGWFRQTPGKEREGVASIDTFGIP

KYADSVKGRFTISQDNAKNTLNLQMDSLKPEDTAMYFCAGRSYTNCRDGPPSASHYSHWG

QGTQVTVSS

> QP1124
                                                        SEQ ID No: 5
QVQLVESGGGLVQPGGSLRLSCTAPGFTSNTCAMGWYRQAAGMQREWVSSISKYGIT

TYANSVKGRFTISKDKAEDTVYLQMNNLKPEDTAMYVCKTFSCRNRGGAYLADAWGQGT

QVTVSS

> QP1125
                                                        SEQ ID No: 6
QVQLVESGGGLVQPGGSLRLSCTAPGFTDKTCAMAWYRQVAGIEREWVSSISTLGTT

NYASSVKGRFTISKDNAKDTVYLQMNNLKPEDTAMYVCKTFSCRNRGGSYLPDTWGQGT

QVTVSS

> QP1126
                                                        SEQ ID No: 7
QVQLVESGGGSVQAGGSLTLSCAVSGNTYSTKYMSWFRQAPGKEREGVAAILAGGR

NTYYADSVKGRFTISQDNAKNTVYLRMNSLKPEDTAMYYCAADTRAALWYIGPLNSDQY

NTWGQGTQVTVSS

> QP1127
                                                        SEQ ID No: 8
QVQLVESGGGSVQSGGSLTLSCAISGYAYATYSMAWFRQAHGKEREGVAAINSDGHT

TYVDSVKGRFTISRDNTNKNSYTLTLTMNNLNPEDTAMYYCAATSQLGFWAQKLWEAIRD

GTWSPSTTDFGFWGRGTQVTVSS

> QP1128
                                                        SEQ ID No: 9
QVQLVESGGGSVQSGGSLRLSCAASGYTASAYYMAWFRQNSRKQREGVAAINRDGD

TKYADSVKGRFTISRDDAKNTLYLQMNSLKPEDTAVYYCAASDWSRLYKIYWLDDNYYV
```

RWGQGTQVTVSS

> QP1129
SEQ ID No: 10
QVQLVESGGGSVQSGGSLRLSCAASGYSSSRYSVGWFRQAPGKEREGVAGQTPRGTT

TYADSVKDRFTISRDNAKNTVYLQMNSLKPEDTAMYYCAAGQALLWASLRQTSYQFWGQ

GTQVTVSS

> QP1130
SEQ ID No: 11
QVQLVESGGGLVQPGGSLRLSCAASGFTFSTSTMMWVRRAPGKGLEWVSGIHNDGG

PIAYADSVKGRFTISRDNAKNTLYLQMTSLKSEDTALYYCARGWYFSGDYVPMTQGTQVT

VSS

> QP1139
SEQ ID No: 12
QVQLVESGGGSVQAGGSLTLSCAVSGNTYGTNAMGWFRQAPGKEREGVAAILGGGR

NTYYADSVKGRFTISQDNAKNTVYLQMNSLKPEDTAMYYCAADTRAAFWNIGPLNSDQY

NIWGQGTQVTVSS

> QP1140
SEQ ID No: 13
QVQLVESGGGSVQAGGSLTLSCVVSGNTYSTKYMGWFRQAPGKEREGVAAILAGGR

NTYYADSVKGRFTISQDNAKNTVYLQMNSLKPEDTAMYYCAADTRAAFWNIGPLNSDQY

NIWGQGTQVTVSS

> QP1141
SEQ ID No: 14
QVQLVESGGGSVQAGGSLTLSCAVSGNTYSTNAMGWFRQAPGKEREGVAAILGGGR

NTYYADSVKGRFTISQDNAKNTVYLQMNSLKPEDTAMYYCAADTRAAFWNIGPLNSDQY

NIWGQGTQVTVSS

> QP1142
SEQ ID No: 15
QVQLVESGGGSVQAGGSLTLSCAVSGNTYSTNIMGWFRQAPGKEREGVAAILAGGRN

TYYADSVKGRFTISQDNAKNTVYLQMNSLKPEDTAMYYCAADTRAAFWNIGPLNSDQYNI

WGQGTQVTVSS

> QP1143
SEQ ID No: 16
QVQLVESGGGSVQAGGSLTLSCAVSGNTYSTKYMGWFRQAPGKEREGVAAILAGGR

DTYYADSVKGRFTISQDNAKNTVYLQMNSLKPEDTAMYYCAADTRAAFWYIGPLNSDQY

NIWGQGTQVTVSS

> QP1144
SEQ ID No: 17
QVQLVESGGGSVQAGGSLTLSCAVSGNTYSTKYMGYFRQAPGKEREGVAAILAGGR

NTNYADSVKGRFTISQDNAKNTVYLQMNSLKPEDTAMYYCAADTRAAFWYIGPLNSDQY

NIWGQGTQVTVSS

> QP1145
SEQ ID No: 18
QVQLVESGGGSVQAGGSLTLSCAVSGNTYSTKYMAWFRQAPGKEREGVAAILAGGR

NTSYADSVKGRFTISQDNAKNTVYLQTNSLKPEDTAMYYCAADTRAAFWYIGPLNSHQYN

IWGQGTQVTVSS

> QP1146
SEQ ID No: 19
QVQLVESGGGSVQAGGSLTLSCAVSGNTYSTNYMGWFRQAPGKEREGVAAILVGGR

NTYYADSVKGRFTISQDNAKNLVYLQMNSLKPEDTAMYYCAADTRAAFWNIGPLNSDQY

NIWGQGTQVTVSS

-continued

> QP1147
SEQ ID No: 20
QVQLVESGGGSVQAGGSLTLSCAVSGNTYSTKYMGWFRQAPGKEREGVAAILAGGR
NTYYADSVKGRFTISQDNAKNTVYLQMNSLKPEDTAMYYCAADTRAAFWYIGPLNSDQY
NIWGQGTQVTVSS

> QP1148
SEQ ID No: 21
QVQLVESGGGSVQAGGSLTLSCAVSGNTYSTNYMGWFRQAPGKEREGVAAILAGGR
NTAYADSVKGRFTISQDNAKNTVYLQMNSLKPEDTAMYYCAADTRAAFWNIGPLNSDQY
NIWGQGTQVTVSS

> QP1149
SEQ ID No: 22
QVQLVESGGGSVQAGGSLTLSCAVSGNTYSTNYMGWFRQAPGKEREGVAAILAGGR
NTYYADSVKGRFTISQDNAKDTVYLQMNSLKPEDTAMYYCAADTRAAFWNIGPLNSDQY
NIWGQGTQVTVSS

> QP1150
SEQ ID No: 23
QVQLVESGGGSVQAGGSLTLSCAVSGNTYSTKYMGWFRQAPGKEREGVAAILAGGR
NTHYADSVKGRFAISQDNAKNTVYLQMNSLKPEDTAMYYCAADTRAAFWNIGPLNSDQY
NIWGQGTQVTVSS

> QP1151
SEQ ID No: 24
QVQLVESGGGSVQAGGSLTLSCAVSGNTYSTNYMGWFRQAPGKEREGVAAILTGGR
NTYYADSVKGRFTISQDNAKNTVYLQMNSLKPEDTAMYYCAADTRAAFWNIGPLNSDQY
NIWGQGTQVTVSS

> QP1152
SEQ ID No: 25
QVQLVESGGGSVQAGGSLTLSCAISGNTYSTKYMGWFRQAPGKEREGVAAILAGGRN
TYYADSVKGRFTISQDNAKNTVYLQMHSLKPEDTAMYYCAADTRAAFWYIGPLNSDQYN
LWGQGTQVTVSS

> QP1153
SEQ ID No: 26
QVQLVESGGGSVQAGGSLTLSCAVSGNTYSTKYMGWFRQAPGKEREGVAAILAGGR
NTDYADSVKGRFTISQDNAKNTVYLQMNSLKPEDTAMYYCAADTRAAFWSIGPLNSDQYN
IWGQGTQVTVSS

> QP1154
SEQ ID No: 27
QVQLVESGGGSVQAGGSLTLSCAVSGNTYSTNYMAWFRQAPGKEREGVAAIRAGGR
NTDYADSVKGRFTISQDNAKNTVYLQMNSLKPEDTAMYYCAADTRAAFWYIGPLNSDQY
NIWGQGTQVTVSS

> QP1155
SEQ ID No: 28
QVQLVESGGGSVQAGGSLTLSCEVSGSTYSTNYMGWFRQAPGKEREGVAAILAGGR
NTDYADSVKGRFTISQDNAKNTVYLQMNSLKPEDTAMYYCAADTRAAFWYIGPLNSDQY
NIWGQGTQVTVSS

> QP1156
SEQ ID No: 29
QVQLVESGGGSVQAGGSLTLSCAVSGNTYSTKYMGWFRQAPGKEREGVAAILAGGR
NTYYADSVKGRFTISQDSAKNTVYLQMNSLKPEDTAMYYCAADTRAAFWYIGPLNSDQYN
SWGQGTQVTVSS

-continued

> QP1157                                                      SEQ ID No: 30
QVQLVESGGGSVQAGGSLTLSCAVSGNTYSTNYMGWFRQAPGKEREGVAAILVGGR

NTYYADPVKGRFTISQDNAKNLVYLQMNSLKPEDTAMYYCAADTRAAFWNIGPLNSDQY

NIWGQGTQVTVSS

> QP1158                                                      SEQ ID No: 31
QVQLVESGGGSVQAGGSLTLSCAVSGNTYSTKYMGWFRQAPGKEREGVAAILAGGR

NTYYADSVKGRFTISQDNAKNTVYLRMNSLKPEDTAMYYCAADTRAALWYIGPLNSDQY

NTWGQGTQVTVSS

> QP1159                                                      SEQ ID No: 32
QVQLVESGGGSVQAGGSLTLSCAVSGNTYSTKYMGWFRQAPGKEREGVAAILAGGR

NTSYADSVKGRFTISQDNAKNTVYLQMNSLKPEDTAMYYCAADTRAAFWYIGPLNSDQYN

IWGQGTQVTVSS

> QP1160                                                      SEQ ID No: 33
QVQLVESGGGSVQAGGSLTLSCAISGNTYSTKYMGWFRQAPGKEREGVAAILAGGRN

TYYADSVKGRFTISQDNAKNTVYLQMNSLKPEDTAMYYCAADARAAFWYIGPLNSDQYNI

WGQGTQVTVSS

> QP1161                                                      SEQ ID No: 34
QVQLVESGGGSVQAGGSLTLSCAVSGNTYSTNYMAWFRQAPGKEREGVAAIRVGGR

NTDYADSVKGRFTISQDNAKNTVYLQMNSLKPEDTAMYYCAADTRAAFWYIGPLNSDQY

NIWGQGTQVTVSS

> QP1162                                                      SEQ ID No: 35
QVQLVESGGGSVQSGGSLRLSCAASGFTYGTYAMSWFRQAPGKEREGVACIDIYGRA

SYTDPVKGRFTISQDNAKNTLYLQMNSLKPEDTAMYYCAARDFGYCTASWVHEGFSRYW

GQGTQVTVSS

> QP1163                                                      SEQ ID No: 36
QVQLVESGGGSVQSGGSLRLSCAASGFTYGTYAMSWFRQAPGKEREGVACIDIYGRT

SYTDPVKGRFTISQDNAKNTLYLQMNSLKPEDTAMYYCAARDFGYCTASWVHAGFSRYW

GQGTQVTVSS

> QP1164                                                      SEQ ID No: 37
QVQLVESGGGSVQSGGSLRLSCAASGFTYGTYAMSWFRQTPGKEREGVACIDIYGRT

SYTDPVKGRFTISQDNAKNTLYLQMNSLKPEDTAMYYCAARDFGYCTASWVHEGFSRYW

GQGTQVTVSS

> QP1165                                                      SEQ ID No: 38
QVQLVESGGGSVQSGGSLRLSCAASGFTYGAYAMSWFRQAPGKEREGVACIDIYGRT

SYTDPVKGRFTISQDNAKNTLYLQMNSLKPEDTAMYYCAARDFGYCTASWVHEGFSRYW

GQGTQVTVSS

> QP1166                                                      SEQ ID No: 39
QVQLVESGGDSVQPGGSLRLSCAASGFTYGTYAMSWFRQAPGKEREGVACIDIYGRT

SYTDPVKGRFTISQDNAKNTLYLQMNSLKPEDTAMYYCAARDFGYCTASWVHEGFSRYW

GQGTQVTVSS

> QP1168

```
                                                 SEQ ID No: 40
QVQLVESGGGSVQSGGSLRLSCAASGFTYETYAMSWFRQAPGKEREGVACIDIYGRT

SYTDPVKGRFTISQDNAKNTLYLQMNSLKPEDTAMYYCAARDFGYCTASWVHEGFSRYW

GQGTQVTVSS

> QP1169
                                                 SEQ ID No: 41
QVQLVESGGGSVQSGGSLRLSCAASGFTYGTYAMSWFRQAPGKEREGVACIDIYGRT

SYTDPVKGRFTISQDNAKNTLYLQMNSLKPGDTAMYYCAARDFGYCTASWVHEGFSRYW

GQGTQVTVSS

>Human IgG1:
                                                 SEQ ID No: 42
EPKSSDKTHTCPPCPAPELLGGPSVFLFPPKPKDTLMISRTPEVTCVVVDVSHEDPEVK

FNWYVDGVEVHNAKTKPREEQYNSTYRVVSVLTVLHQDWLNGKEYKCKVSNKALPAPIE

KTISKAKGQPREPQVYTLPPSRDELTKNQVSLTCLVKGFYPSDIAVEWESNGQPENNYKTTP

PVLDSDGSFFLYSKLTVDKSRWQQGNVFSCSVMHEALHNHYTQKSLSLSPGK

>PD-L1-his
                                                 SEQ ID No: 43
MRIFAVFIFMTYWHLLNAFTVTVPKDLYVVEYGSNMTIECKFPVEKQLDLAALIVYW

EMEDKNIIQFVHGEEDLKVQHSSYRQRARLLKDQLSLGNAALQITDVKLQDAGVYRCMISY

GGADYKRITVKVNAPYNKINQRILVVDPVTSEHELTCQAEGYPKAEVIWTSSDHQVLSGKT

TTTNSKREEKLFNVTSTLRINTTTNEIFYCTFRRLDPEENHTAELVIPELPLAHPPNEREQKLIS

EEDLHHHHHH

> QP1120-CDR1
                                                 SEQ ID No: 44
TYAMS

> QP1121-CDR1
                                                 SEQ ID No: 45
GTCMA

> QP1122-CDR1
                                                 SEQ ID No: 46
TNVMG

> QP1123-CDR1
                                                 SEQ ID No: 47
HYCMG

> QP1124-CDR1
                                                 SEQ ID No: 48
TCAMG

> QP1125-CDR1
                                                 SEQ ID No: 49
TCAMA

> QP1126-CDR1
                                                 SEQ ID No: 50
TKYMS

> QP1127-CDR1
                                                 SEQ ID No: 51
TYSMA

> QP1128-CDR1
                                                 SEQ ID No: 52
AYYMA

> QP1129-CDR1
                                                 SEQ ID No: 53
RYSVG

> QP1130-CDR1
                                                 SEQ ID No: 54
TSTMM
```

-continued

> QP1139-CDR1  
TNAMG  
SEQ ID No: 55

> QP1140-CDR1  
TKYMG  
SEQ ID No: 56

> QP1142-CDR1  
TNIMG  
SEQ ID No: 57

> QP1145-CDR1  
TKYMA  
SEQ ID No: 58

> QP1154-CDR1  
TNYMA  
SEQ ID No: 59

> QP1165-CDR1  
AYAMS  
SEQ ID No: 60

> QP1120-CDR2  
CIDIYGRTSYTDPVKG  
SEQ ID No: 61

> QP1121-CDR2  
GLWTGDGVTYYADSVKG  
SEQ ID No: 62

> QP1122-CDR2  
AILAGGRNTYYADSVKG  
SEQ ID No: 63

> QP1123-CDR2  
SIDTFGIPKYADSVKG  
SEQ ID No: 64

> QP1124-CDR2  
SISKYGITTYANSVKG  
SEQ ID No: 65

> QP1125-CDR2  
SISTLGTTNYASSVKG  
SEQ ID No: 66

> QP1127-CDR2  
AINSDGHTTYVDSVKG  
SEQ ID No: 67

> QP1128-CDR2  
AINRDGDTKYADSVKG  
SEQ ID No: 68

> QP1129-CDR2  
GQTPRGTTTYADSVKD  
SEQ ID No: 69

> QP1130-CDR2  
GIHNDGGPIAYADSVKG  
SEQ ID No: 70

> QP1139-CDR2  
AILGGGRNTYYADSVKG  
SEQ ID No: 71

> QP1143-CDR2  
AILAGGRDTYYADSVKG  
SEQ ID No: 72

> QP1144-CDR2  
AILAGGRNTNYADSVKG  
SEQ ID No: 73

> QP1145-CDR2  
AILAGGRNTSYADSVKG  
SEQ ID No: 74

> QP1146-CDR2

-continued

> QP1148-CDR2  SEQ ID No: 75
AILVGGRNTYYADSVKG

> QP1150-CDR2  SEQ ID No: 76
AILAGGRNTAYADSVKG

> QP1151-CDR2  SEQ ID No: 77
AILAGGRNTHYADSVKG

> QP1153-CDR2  SEQ ID No: 78
AILTGGRNTYYADSVKG

> QP1157-CDR2  SEQ ID No: 79
AILAGGRNTDYADSVKG

> QP1161-CDR2  SEQ ID No: 80
AILVGGRNTYYADPVKG

> QP1162-CDR2  SEQ ID No: 81
AIRVGGRNTDYADSVKG

> QP1120-CDR3  SEQ ID No: 82
CIDIYGRASYTDPVKG

> QP1121-CDR3  SEQ ID No: 83
ARDFGYCTASWVHEGFSRY

> QP1122-CDR3  SEQ ID No: 84
SNGMCGQYWALEDEYKY

> QP1123-CDR3  SEQ ID No: 85
ADTRAAFWNIGPLNSDQYNI

> QP1124-CDR3  SEQ ID No: 86
GRSYTNCRDGPPSASHYSH

> QP1126-CDR3  SEQ ID No: 87
KTFSCRNRGGAYLADA

> QP1127-CDR3  SEQ ID No: 88
ADTRAALWYIGPLNSDQYNT

> QP1128-CDR3  SEQ ID No: 89
ATSQLGFWAQKLWEAIRDGTWSPSTTDFGF

> QP1129-CDR3  SEQ ID No: 90
ASDWSRLYKIYWLDDNYYVR

> QP1130-CDR3  SEQ ID No: 91
AGQALLWASLRQTSYQF

> QP1143-CDR3  SEQ ID No: 92
GWYFSGDYVP

> QP1145-CDR3  SEQ ID No: 93
ADTRAAFWYIGPLNSDQYNI

> QP1152-CDR3  SEQ ID No: 94
ADTRAAFWYIGPLNSHQYNI

SEQ ID No: 95

-continued

ADTRAAFWYIGPLNSDQYNL

> QP1153-CDR3
SEQ ID No: 96
ADTRAAFWSIGPLNSDQYNI

> QP1156-CDR3
SEQ ID No: 97
ADTRAAFWYIGPLNSDQYNS

> QP1160-CDR3
SEQ ID No: 98
ADARAAFWYIGPLNSDQYNI

> QP1163-CDR3
SEQ ID No: 99
ARDFGYCTASWVHAGFSRY

> QP320
SEQ ID No: 100
EVQLLESGGGLVQPGGSLRLSCAASGFTYGTYAMSWVRQAPGKGLEWVSCIDIYGRA

SYTDPVKGRFTISRDNSKNTLYLQMNSLRAEDTAVYYCAARDFGYCTASWVHEGFSRYWG

QGTLVTVSS

> QP321
SEQ ID No: 101
EVQLLESGGGLVQPGGSLRLSCAASGFTYGTYAMSWVRQAPGKGLEWVACIDIYGR

ASYTDPVKGRFTISRDNSKNTLYLQMNSLKAEDTAVYYCAARDFGYCTASWVHEGFSRYW

GQGTLVTVSS

> QP322
SEQ ID No: 102
EVQLLESGGGLVQPGGSLRLSCAASGFTYGTYAMSWFRQAPGKGREGVACIDIYGRA

SYTDPVKGRFTISQDNSKNTLYLQMNSLKAEDTAVYYCAARDFGYCTASWVHEGFSRYW

GQGTLVTVSS

> QP323
SEQ ID No: 103
EVQLLESGGGLVQPGGSLRLSCAASGFTYGTYAMSWVRQAPGKGLEWVSCIDIYGRT

SYTDPVKGRFTISRDNSKNTLYLQMNSLRAEDTAVYYCAARDFGYCTASWVHEGFSRYWG

QGTLVTVSS

> QP324
SEQ ID No: 104
EVQLLESGGGLVQPGGSLRLSCAASGFTYGTYAMSWVRQAPGKGLEWVACIDIYGRT

SYTDPVKGRFTISQDNSKNTLYLQMNSLRAEDTAVYYCAARDFGYCTASWVHEGFSRYWG

QGTLVTVSS

> QP325
SEQ ID No: 105
EVQLLESGGGLVQPGGSLRLSCAASGFTYGTYAMSWFRQAPGKGLEGVACIDIYGRT

SYTDPVKGRFTISQDNSKNTLYLQMNSLRAEDTAVYYCAARDFGYCTASWVHEGFSRYWG

QGTLVTVSS

> QP1180
SEQ ID No: 106
EVQLVESGGGLVQPGGSLRLSCAASGFTFSDSWIHWVRQAPGKGLEWVAWISPYGGS

TYYADSVKGRFTISADTSKNTAYLQMNSLRAEDTAVYYCARRHWPGGFDYWGQGTLVTV

SSASTKGPSVFPLAPSSKSTSGGTAALGCLVKDYFPEPVTVSWNSGALTSGVHTFPAVLQSS

GLYSLSSVVTVPSSSLGTQTYICNVNHKPSNTKVDKKVEPKSCDKTHTCPPCPAPELLGGPS

VFLFPPKPKDTLMISRTPEVTCVVVDVSHEDPEVKFNWYVDGVEVHNAKTKPREEQYASTY

RVVSVLTVLHQDWLNGKEYKCKVSNKALPAPIEKTISKAKGQPREPQVYTLPPSREEMTKN

QVSLTCLVKGFYPSDIAVEWESNGQPENNYKTTPPVLDSDGSFFLYSKLTVDKSRWQQGNV

-continued

FSCSVMHEALHNHYTQKSLSLSPGK

> QP1181                                                    SEQ ID No: 107

DIQMTQSPSSLSASVGDRVTITCRASQDVSTAVAWYQQKPGKAPKLLIYSASFLYSGV

PSRFSGSGSGTDFTLTISSLQPEDFATYYCQQYLYHPATFGQGTKVEIKRTVAAPSVFIFPPSD

EQLKSGTASVVCLLNNFYPREAKVQWKVDNALQSGNSQESVTEQDSKDSTYSLSSTLTLSK

ADYEKHKVYACEVTHQGLSSPVTKSFNRGEC

> QP1461                                                    SEQ ID No: 108

DIVMTQSPDSLAVSLGERATINCKSSQSLLNSGNQKNYLAWYQQKPGQPPKLLIYGAS

TRESGVPDRFTGSGSGTDFTLTISSLQAEDVAVYYCQNDHSYPFTGQGTKLEIKRTVAAPS

VFIFPPSDEQLKSGTASVVCLLNNFYPREAKVQWKVDNALQSGNSQESVTEQDSKDSTYSL

SSTLTLSKADYEKHKVYACEVTHQGLSSPVTKSFNRGEC

> QP371                                                     SEQ ID No: 109

QVQLVQSGAEVKKPGASVKVSCKASGYTFTSYWIHWVRQAPGQGLEWMGYINPYN

DGTKYNEKFKGRVTMTRDTSTSTVYMELSSLRSEDTAVYYCARLGFTTRNAMDYWGQGT

LVTVSSASTKGPSVFPLAPSSKSTSGGTAALGCLVKDYFPEPVTVSWNSGALTSGVHTFPAV

LQSSGLYSLSSVVTVPSSSLGTQTYICNVNHKPSNTKVDKKVEPKSCDKTHTCPPCPAPELL

GGPSVFLFPPKPKDTLMISRTPEVTCVVVDVSHEDPEVKFNWYVDGVEVHNAKTKPREEQY

NSTYRVVSVLTVLHQDWLNGKEYKCKVSNKALPAPIEKTISKAKGQPREPQVYTLPPSRDE

LTKNQVSLTCLVKGFYPSDIAVEWESNGQPENNYKTTPPVLDSDGSFFLYSKLTVDKSRWQ

QGNVFSCSVMHEALHNHYTQKSLSLSPGGGGGSGGGGSGGGGSGGGGSEVQLLESGGGLV

QPGGSLRLSCAASGFTYGTYAMSWFRQAPGKGREGVACIDIYGRASYTDPVKGRFTISQDN

SKNTLYLQMNSLKAEDTAVYYCAARDFGYCTASWVHEGFSRYWGQGTLVTVSS

>SEQ ID No. 110 QP1146-CDR1, QP1148-CDR1,
   QP1149-CDR1, QP1151-CDR1. QP1155-CDR1,
   QP1157-CDR1
>SEQ ID No. 111 QP1154-CDR2
>SEQ ID No. 112 QP1125-CDR3

---

The invention claimed is:

1. An anti-PD-L1 antibody which comprises at least one VHH fragment, wherein the VHH fragment comprises the amino sequences of CDR1, CDR2 and CDR3, which are respectively selected from a set of sequence combinations in which the following clone numbers are located:

| Clone number | CDR1 | SEQ ID No: | CDR2 | SEQ ID No: |
|---|---|---|---|---|
| QP1162 | TYAMS | 44 | CIDIYGRASYTDPVKG | 82 |
| QP1163 | TYAMS | 44 | CIDIYGRTSYTDPVKG | 61 |
| QP1165 | AYAMS | 60 | CIDIYGRTSYTDPVKG | 61 |
| QP1166 | TYAMS | 44 | CIDIYGRTSYTDPVKG | 61 |
| QP1122 | TNVMG | 46 | AILAGGRNTYYADSVKG | 63 |
| QP1139 | TNAMG | 55 | AILGGGRNTYYADSVKG | 71 |
| QP1140 | TKYMG | 56 | AILAGGRNTYYADSVKG | 63 |
| QP1142 | TNIMG | 57 | AILAGGRNTYYADSVKG | 63 |
| QP1143 | TKYMG | 56 | AILAGGRDTYYADSVKG | 72 |
| QP1144 | TKYMG | 56 | AILAGGRNTNYADSVKG | 73 |
| QP1145 | TKYMA | 58 | AILAGGRNTSYADSVKG | 74 |
| QP1146 | TNYMG | 110 | AILVGGRNTYYADSVKG | 75 |
| QP1147 | TKYMG | 56 | AILAGGRNTYYADSVKG | 63 |
| QP1148 | TNYMG | 110 | AILAGGRNTAYADSVKG | 76 |
| QP1149 | TNYMG | 110 | AILAGGRNTYYADSVKG | 63 |
| QP1150 | TKYMG | 56 | AILAGGRNTHYADSVKG | 77 |
| QP1151 | TNYMG | 110 | AILTGGRNTYYADSVKG | 78 |
| QP1152 | TKYMG | 56 | AILAGGRNTYYADSVKG | 63 |
| QP1153 | TKYMG | 56 | AILAGGRNTDYADSVKG | 79 |
| QP1154 | TNYMA | 59 | AIRAGGRNTDYADSVKG | 111 |
| QP1155 | TNYMG | 110 | AILAGGRNTDYADSVKG | 79 |
| QP1156 | TKYMG | 56 | AILAGGRNTYYADSVKG | 63 |
| QP1157 | TNYMG | 110 | AILVGGRNTYYADPVKG | 80 |
| QP1158 | TKYMG | 56 | AILAGGRNTYYADSVKG | 63 |
| QP1159 | TKYMG | 56 | AILAGGRNTSYADSVKG | 74 |
| QP1160 | TKYMG | 56 | AILAGGRNTYYADSVKG | 63 |
| QP1161 | TNYMA | 59 | AIRVGGRNTDYADSVKG | 81 |
| QP1123 | HYCMG | 47 | SIDTFGIPKYADSVKG | 64 |
| QP1124 | TCAMG | 48 | SISKYGITTYANSVKG | 65 |
| QP1125 | TCAMA | 49 | SISTLGTTNYASSVKG | 66 |
| QP1126 | TKY | 50 | AILAGGRNTYYAD | 63 |

-continued

| Clone number | | | | SEQ ID No: |
|---|---|---|---|---|
| | MS | | SVKG | |
| QP1127 | TYSMA | 51 | AINSDGHTTYVDSVKG | 67 |
| QP1128 | AYYMA | 52 | AINRDGDTKYADSVKG | 68 |
| QP1129 | RYSVG | 53 | GQTPRGTTTYADSVKD | 69 |
| QP1130 | TSTMM | 54 | GIHNDGGPIAYADSVKG | 70 |
| QP1121 | GTCMA | 45 | GLWTGDGVTYYADSVKG | 62 |

| Clone number | CDR3 | SEQ ID No: |
|---|---|---|
| QP1162 | ARDFGYCTASWVHEGFSRY | 83 |
| QP1163 | ARDFGYCTASWVHAGFSRY | 99 |
| QP1165 | ARDFGYCTASWVHEGFSRY | 83 |
| QP1166 | ARDFGYCTASWVHEGFSRY | 83 |
| QP1122 | ADTRAAFWNIGPLNSDQYNI | 85 |
| QP1139 | ADTRAAFWNIGPLNSDQYNI | 85 |
| QP1140 | ADTRAAFWNIGPLNSDQYNI | 85 |
| QP1142 | ADTRAAFWNIGPLNSDQYNI | 85 |
| QP1143 | ADTRAAFWYIGPLNSDQYNI | 93 |
| QP1144 | ADTRAAFWYIGPLNSDQYNI | 93 |
| QP1145 | ADTRAAFWYIGPLNSHQYNI | 94 |
| QP1146 | ADTRAAFWNIGPLNSDQYNI | 85 |
| QP1147 | ADTRAAFWYIGPLNSDQYNI | 93 |
| QP1148 | ADTRAAFWNIGPLNSDQYNI | 85 |
| QP1149 | ADTRAAFWNIGPLNSDQYNI | 85 |
| QP1150 | ADTRAAFWNIGPLNSDQYNI | 85 |
| QP1151 | ADTRAAFWNIGPLNSDQYNI | 85 |
| QP1152 | ADTRAAFWYIGPLNSDQYNL | 95 |
| QP1153 | ADTRAAFWSIGPLNSDQYNI | 96 |
| QP1154 | ADTRAAFWYIGPLNSDQYNI | 93 |
| QP1155 | ADTRAAFWYIGPLNSDQYNI | 93 |
| QP1156 | ADTRAAFWYIGPLNSDQYNS | 97 |
| QP1157 | ADTRAAFWNIGPLNSDQYNI | 85 |
| QP1158 | ADTRAALWYIGPLNSDQYNT | 88 |
| QP1159 | ADTRAAFWYIGPLNSDQYNI | 93 |
| QP1160 | ADARAAFWYIGPLNSDQYNI | 98 |
| QP1161 | ADTRAAFWYIGPLNSDQYNI | 93 |
| QP1123 | GRSYTNCRDGPPSASHYSH | 86 |
| QP1124 | KTFSCRNRGGAYLADA | 87 |
| QP1125 | KTFSCRNRGGSYLPDT | 112 |
| QP1126 | ADTRAALWYIGPLNSDQYNT | 88 |
| QP1127 | ATSQLGFWAQKLWEAIRDGTW | 89 |
| QP1128 | ASDWSRLYKIYWLDDNYYVR | 90 |
| QP1129 | AGQALLWASLRQTSYQF | 91 |
| QP1130 | GWYFSGDYVP | 92 |
| QP1121 | SNGMCGQYWALEDEYKY | 84. |

2. The anti-PD-L1 antibody according to claim 1, which comprises the amino acid sequence as shown in any one of SEQ ID No. 1 to SEQ ID No. 41, or the amino acid sequence having at least 80% sequence identity with the sequence shown in any one of SEQ ID No. 1 to SEQ ID No. 41.

3. A method for blocking PD-L1 and PD-1 binding in a subject having a PD-L1 expressing tumor, comprising administrating the anti-PD-L1 antibody according to claim 1 to the subject.

4. The method according to claim 3, wherein the amount of the anti-PD-L1 antibody is from 20 ug/ml to 0.000128 ug/ml.

5. A method for treatment of cancer or tumor in a subject having a PD-L1 expressing tumor, comprising administrating the anti-PD-L1 antibody according to claim 1 to the subject.

6. A method for inhibiting tumor growth in a subject comprising having a PD-L1 expressing tumor, comprising administrating the anti-PD-L1 antibody according to claim 1 to the subject.

7. The method according to claim 5, wherein the cancer or tumor is as follows or is selected from the following tissues or sites: colorectal, breast, ovary, pancreas, stomach, esophagus, prostate, kidney, cervix, bone marrow cancer, lymphoma, leukemia, thyroid, endometrium, uterus, bladder, neuroendocrine, head and neck, liver, nasopharynx, testis, small cell lung cancer, non-small cell lung cancer, melanoma, basal cell skin cancer, squamous cell skin cancer, dermatofibrosarcoma protuberant, Merkel cell carcinoma, glioblastoma, glioma, sarcoma, mesothelioma, or myelodysplastic syndrome.

8. The anti-PD-L1 antibody according to claim 1, wherein the anti-PD-L1 antibody is a humanized antibody which comprises the amino acid sequence as shown in any one of SEQ ID No. 100 to SEQ ID No. 105, or the amino acid sequence having at least 80% sequence identity with the sequence shown in any one of SEQ ID No. 100 to SEQ ID No. 105.

9. The anti-PD-L1 antibody according to claim 1, wherein the anti-PD-L1 antibody contains a Fc segment.

10. The anti-PD-L1 antibody according to claim 9, wherein the sequence of the Fc segment is as shown in SEQ ID No. 42.

11. A nucleic acid molecule, which encodes the anti-PD-L1 antibody according to claim 1.

12. A vector, which comprises the nucleic acid molecule according to claim 11.

* * * * *

SEQUENCE LISTING

<160> NUMBER OF SEQ ID NOS: 112

<210> SEQ ID NO 1
<211> LENGTH: 126
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1120

<400> SEQUENCE: 1

Gln Val Gln Leu Val Glu Ser Gly Gly Gly Ser Val Gln Ser Gly Gly
 1               5                  10                  15

Ser Leu Arg Leu Ser Cys Ala Ala Ser Gly Phe Thr Tyr Gly Thr Tyr
                20                  25                  30

Ala Met Ser Trp Phe Arg Gln Ala Pro Gly Lys Glu Arg Glu Gly Val
            35                  40                  45

Ala Cys Ile Asp Ile Tyr Gly Arg Thr Ser Tyr Thr Asp Pro Val Lys

```
            50                  55                  60
Gly Arg Phe Thr Ile Ser Gln Asp Asn Ala Lys Asn Thr Leu Tyr Leu
 65                  70                  75                  80

Gln Met Asn Ser Leu Lys Pro Glu Asp Thr Ala Met Tyr Tyr Cys Ala
                 85                  90                  95

Ala Arg Asp Phe Gly Tyr Cys Thr Ala Ser Trp Val His Glu Gly Phe
                100                 105                 110

Ser Arg Tyr Trp Gly Gln Gly Thr Gln Val Thr Val Ser Ser
            115                 120                 125

<210> SEQ ID NO 2
<211> LENGTH: 126
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1121

<400> SEQUENCE: 2

Gln Val Gln Leu Val Glu Ser Gly Gly Gly Ser Val His Ala Gly Gly
  1               5                  10                  15

Ser Leu Arg Leu Ser Cys Val Arg Val Ser Met Tyr Thr Tyr Thr Gly
                 20                  25                  30

Thr Cys Met Ala Trp Phe Arg Gln Ala Pro Gly Lys Glu Arg Glu Gly
                 35                  40                  45

Val Ala Gly Leu Trp Thr Gly Asp Gly Val Thr Tyr Tyr Ala Asp Ser
 50                  55                  60

Val Lys Gly Arg Phe Thr Ile Ser Gln Asp Asp Ala Lys Asn Thr Leu
 65                  70                  75                  80

Tyr Leu Gln Met Asp Ser Leu Lys Pro Glu Asp Thr Ala Met Tyr Tyr
                 85                  90                  95

Cys Ala Ser Asn Gly Met Cys Gly Gln Tyr Trp Ala Leu Glu Asp Glu
                100                 105                 110

Tyr Lys Tyr Trp Gly Gln Gly Thr Gln Val Thr Val Ser Ser
            115                 120                 125

<210> SEQ ID NO 3
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1122

<400> SEQUENCE: 3

Gln Val Gln Leu Val Glu Ser Gly Gly Gly Ser Val Gln Ala Gly Gly
  1               5                  10                  15

Ser Leu Thr Leu Ser Cys Ala Val Ser Gly Asn Thr Tyr Ser Thr Asn
                 20                  25                  30

Val Met Gly Trp Phe Arg Gln Ala Pro Gly Lys Glu Arg Glu Gly Val
                 35                  40                  45

Ala Ala Ile Leu Ala Gly Gly Arg Asn Thr Tyr Tyr Ala Asp Ser Val
 50                  55                  60

Lys Gly Arg Phe Thr Ile Ser Gln Asp Asn Ala Lys Asn Thr Val Tyr
 65                  70                  75                  80
```

-continued

Leu Gln Met Asn Ser Leu Lys Pro Glu Asp Thr Ala Met Tyr Tyr Cys
                85                  90                  95

Ala Ala Asp Thr Arg Ala Ala Phe Trp Asn Ile Gly Pro Leu Asn Ser
            100                 105                 110

Asp Gln Tyr Asn Ile Trp Gly Gln Gly Thr Gln Val Thr Val Ser Ser
            115                 120                 125

<210> SEQ ID NO 4
<211> LENGTH: 126
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1123

<400> SEQUENCE: 4

Gln Val Gln Leu Val Glu Ser Gly Gly Gly Val Gln Ser Gly Gly
1               5                   10                  15

Ser Leu Arg Leu Ser Cys Ala Ala Ser Gly Tyr Thr Val Arg His Tyr
            20                  25                  30

Cys Met Gly Trp Phe Arg Gln Thr Pro Gly Lys Glu Arg Glu Gly Val
        35                  40                  45

Ala Ser Ile Asp Thr Phe Gly Ile Pro Lys Tyr Ala Asp Ser Val Lys
    50                  55                  60

Gly Arg Phe Thr Ile Ser Gln Asp Asn Ala Lys Asn Thr Leu Asn Leu
65                  70                  75                  80

Gln Met Asp Ser Leu Lys Pro Glu Asp Thr Ala Met Tyr Phe Cys Ala
                85                  90                  95

Gly Arg Ser Tyr Thr Asn Cys Arg Asp Gly Pro Pro Ser Ala Ser His
            100                 105                 110

Tyr Ser His Trp Gly Gln Gly Thr Gln Val Thr Val Ser Ser
            115                 120                 125

<210> SEQ ID NO 5
<211> LENGTH: 122
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1124

<400> SEQUENCE: 5

Gln Val Gln Leu Val Glu Ser Gly Gly Gly Leu Val Gln Pro Gly Gly
1               5                   10                  15

Ser Leu Arg Leu Ser Cys Thr Ala Pro Gly Phe Thr Ser Asn Thr Cys
            20                  25                  30

Ala Met Gly Trp Tyr Arg Gln Ala Ala Gly Met Gln Arg Glu Trp Val
        35                  40                  45

Ser Ser Ile Ser Lys Tyr Gly Ile Thr Thr Tyr Ala Asn Ser Val Lys
    50                  55                  60

Gly Arg Phe Thr Ile Ser Lys Asp Lys Ala Glu Asp Thr Val Tyr Leu
65                  70                  75                  80

Gln Met Asn Asn Leu Lys Pro Glu Asp Thr Ala Met Tyr Val Cys Lys
                85                  90                  95

Thr Phe Ser Cys Arg Asn Arg Gly Gly Ala Tyr Leu Ala Asp Ala Trp
            100                 105                 110

Gly Gln Gly Thr Gln Val Thr Val Ser Ser
        115                 120

<210> SEQ ID NO 6
<211> LENGTH: 122
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1125

<400> SEQUENCE: 6

Gln Val Gln Leu Val Glu Ser Gly Gly Gly Leu Val Gln Pro Gly Gly
1               5                   10                  15

Ser Leu Arg Leu Ser Cys Thr Ala Pro Gly Phe Thr Asp Lys Thr Cys
            20                  25                  30

Ala Met Ala Trp Tyr Arg Gln Val Ala Gly Ile Glu Arg Glu Trp Val
        35                  40                  45

Ser Ser Ile Ser Thr Leu Gly Thr Thr Asn Tyr Ala Ser Ser Val Lys
    50                  55                  60

Gly Arg Phe Thr Ile Ser Lys Asp Asn Ala Lys Asp Thr Val Tyr Leu
65                  70                  75                  80

Gln Met Asn Asn Leu Lys Pro Glu Asp Thr Ala Met Tyr Val Cys Lys
                85                  90                  95

Thr Phe Ser Cys Arg Asn Arg Gly Gly Ser Tyr Leu Pro Asp Thr Trp
            100                 105                 110

Gly Gln Gly Thr Gln Val Thr Val Ser Ser
        115                 120

<210> SEQ ID NO 7
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1126

<400> SEQUENCE: 7

Gln Val Gln Leu Val Glu Ser Gly Gly Ser Val Gln Ala Gly Gly
1               5                   10                  15

Ser Leu Thr Leu Ser Cys Ala Val Ser Gly Asn Thr Tyr Ser Thr Lys
            20                  25                  30

Tyr Met Ser Trp Phe Arg Gln Ala Pro Gly Lys Glu Arg Glu Gly Val
        35                  40                  45

Ala Ala Ile Leu Ala Gly Gly Arg Asn Thr Tyr Tyr Ala Asp Ser Val
    50                  55                  60

Lys Gly Arg Phe Thr Ile Ser Gln Asp Asn Ala Lys Asn Thr Val Tyr
65                  70                  75                  80

Leu Arg Met Asn Ser Leu Lys Pro Glu Asp Thr Ala Met Tyr Tyr Cys
                85                  90                  95

Ala Ala Asp Thr Arg Ala Ala Leu Trp Tyr Ile Gly Pro Leu Asn Ser
            100                 105                 110

Asp Gln Tyr Asn Thr Trp Gly Gln Gly Thr Gln Val Thr Val Ser Ser
        115                 120                 125

```
<210> SEQ ID NO 8
<211> LENGTH: 140
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1127

<400> SEQUENCE: 8

Gln Val Gln Leu Val Glu Ser Gly Gly Gly Ser Val Gln Ser Gly Gly
1               5                   10                  15

Ser Leu Thr Leu Ser Cys Ala Ile Ser Gly Tyr Ala Tyr Ala Thr Tyr
            20                  25                  30

Ser Met Ala Trp Phe Arg Gln Ala His Gly Lys Glu Arg Glu Gly Val
        35                  40                  45

Ala Ala Ile Asn Ser Asp Gly His Thr Thr Tyr Val Asp Ser Val Lys
    50                  55                  60

Gly Arg Phe Thr Ile Ser Arg Asp Asn Thr Asn Lys Asn Ser Tyr Thr
65                  70                  75                  80

Leu Thr Leu Thr Met Asn Asn Leu Asn Pro Glu Asp Thr Ala Met Tyr
                85                  90                  95

Tyr Cys Ala Ala Thr Ser Gln Leu Gly Phe Trp Ala Gln Lys Leu Trp
            100                 105                 110

Glu Ala Ile Arg Asp Gly Thr Trp Ser Pro Ser Thr Thr Asp Phe Gly
        115                 120                 125

Phe Trp Gly Arg Gly Thr Gln Val Thr Val Ser Ser
    130                 135                 140

<210> SEQ ID NO 9
<211> LENGTH: 127
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1128

<400> SEQUENCE: 9

Gln Val Gln Leu Val Glu Ser Gly Gly Gly Ser Val Gln Ser Gly Gly
1               5                   10                  15

Ser Leu Arg Leu Ser Cys Ala Ala Ser Gly Tyr Thr Ala Ser Ala Tyr
            20                  25                  30

Tyr Met Ala Trp Phe Arg Gln Asn Ser Arg Lys Gln Arg Glu Gly Val
        35                  40                  45

Ala Ala Ile Asn Arg Asp Gly Asp Thr Lys Tyr Ala Asp Ser Val Lys
    50                  55                  60

Gly Arg Phe Thr Ile Ser Arg Asp Asp Ala Lys Asn Thr Leu Tyr Leu
65                  70                  75                  80

Gln Met Asn Ser Leu Lys Pro Glu Asp Thr Ala Val Tyr Tyr Cys Ala
                85                  90                  95

Ala Ser Asp Trp Ser Arg Leu Tyr Lys Ile Tyr Trp Leu Asp Asp Asn
            100                 105                 110

Tyr Tyr Val Arg Trp Gly Gln Gly Thr Gln Val Thr Val Ser Ser
        115                 120                 125

<210> SEQ ID NO 10
<211> LENGTH: 124
```

```
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1129

<400> SEQUENCE: 10

Gln Val Gln Leu Val Glu Ser Gly Gly Gly Ser Val Gln Ser Gly Gly
1               5                   10                  15

Ser Leu Arg Leu Ser Cys Ala Ala Ser Gly Tyr Ser Ser Arg Tyr
            20                  25                  30

Ser Val Gly Trp Phe Arg Gln Ala Pro Gly Lys Glu Arg Glu Gly Val
        35                  40                  45

Ala Gly Gln Thr Pro Arg Gly Thr Thr Thr Tyr Ala Asp Ser Val Lys
    50                  55                  60

Asp Arg Phe Thr Ile Ser Arg Asp Asn Ala Lys Asn Thr Val Tyr Leu
65                  70                  75                  80

Gln Met Asn Ser Leu Lys Pro Glu Asp Thr Ala Met Tyr Tyr Cys Ala
                85                  90                  95

Ala Gly Gln Ala Leu Leu Trp Ala Ser Leu Arg Gln Thr Ser Tyr Gln
            100                 105                 110

Phe Trp Gly Gln Gly Thr Gln Val Thr Val Ser Ser
        115                 120

<210> SEQ ID NO 11
<211> LENGTH: 119
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1130

<400> SEQUENCE: 11

Gln Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Thr Ser
            20                  25                  30

Thr Met Met Trp Val Arg Arg Ala Pro Gly Lys Gly Leu Glu Trp Val
        35                  40                  45

Ser Gly Ile His Asn Asp Gly Gly Pro Ile Ala Tyr Ala Asp Ser Val
    50                  55                  60

Lys Gly Arg Phe Thr Ile Ser Arg Asp Asn Ala Lys Asn Thr Leu Tyr
65                  70                  75                  80

Leu Gln Met Thr Ser Leu Lys Ser Glu Asp Thr Ala Leu Tyr Tyr Cys
                85                  90                  95

Ala Arg Gly Trp Tyr Phe Ser Gly Asp Tyr Val Pro Met Thr Gln Gly
            100                 105                 110

Thr Gln Val Thr Val Ser Ser
        115

<210> SEQ ID NO 12
<211> LENGTH: 128
<212> TYPE: PRT
<213> ORGANISM: artificial sequence
<220> FEATURE:
<223> OTHER INFORMATION: synthetic
<220> FEATURE:
```

<221> NAME/KEY: misc_feature
<223> OTHER INFORMATION: QP1139

<400> SEQUENCE: 12

Gln Val Gln Leu Val Glu Ser Gly Gly Gly Ser Val Gln Ala Gly Gly
1               5                   10                  15

Ser Leu Thr Leu Ser Cys Ala Val Ser Gly Asn Thr Tyr Gly Thr Asn
            20                  25                  30

Ala Met Gly Trp Phe Arg Gln Ala Pro Gly Lys Glu Arg Glu Gly Val
        35                  40                  45

Ala Ala Ile Leu Gly Gly Gly Arg Asn Thr Tyr Tyr Ala Asp Ser Val
    50                  55                  60

Lys Gly Arg Phe Thr Ile Ser Gln Asp Asn Ala Lys Asn Thr Val Tyr
65                  70                  75                  80

Leu Gln Met Asn Ser Leu Lys Pro Glu Asp Thr Ala Met Tyr Tyr Cys
                85                  90                  95

Ala Ala Asp Thr Arg Ala Ala Phe Trp Asn Ile Gly Pro Leu Asn Ser
            100                 105                 110

Asp Gln Tyr Asn Ile Trp Gly Gln Gly Thr Gln Val Thr Val Ser Ser
        115                 120                 125

<210> SEQ ID NO 13
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1140

<400> SEQUENCE: 13

Gln Val Gln Leu Val Glu Ser Gly Gly Gly Ser Val Gln Ala Gly Gly
1               5                   10                  15

Ser Leu Thr Leu Ser Cys Val Val Ser Gly Asn Thr Tyr Ser Thr Lys
            20                  25                  30

Tyr Met Gly Trp Phe Arg Gln Ala Pro Gly Lys Glu Arg Glu Gly Val
        35                  40                  45

Ala Ala Ile Leu Ala Gly Gly Arg Asn Thr Tyr Tyr Ala Asp Ser Val
    50                  55                  60

Lys Gly Arg Phe Thr Ile Ser Gln Asp Asn Ala Lys Asn Thr Val Tyr
65                  70                  75                  80

Leu Gln Met Asn Ser Leu Lys Pro Glu Asp Thr Ala Met Tyr Tyr Cys
                85                  90                  95

Ala Ala Asp Thr Arg Ala Ala Phe Trp Asn Ile Gly Pro Leu Asn Ser
            100                 105                 110

Asp Gln Tyr Asn Ile Trp Gly Gln Gly Thr Gln Val Thr Val Ser Ser
        115                 120                 125

<210> SEQ ID NO 14
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1141

<400> SEQUENCE: 14

Gln Val Gln Leu Val Glu Ser Gly Gly Gly Ser Val Gln Ala Gly Gly
1               5                   10                  15

Ser Leu Thr Leu Ser Cys Ala Val Ser Gly Asn Thr Tyr Ser Thr Asn
            20                  25                  30

Ala Met Gly Trp Phe Arg Gln Ala Pro Gly Lys Glu Arg Glu Gly Val
        35                  40                  45

Ala Ala Ile Leu Gly Gly Arg Asn Thr Tyr Tyr Ala Asp Ser Val
    50                  55                  60

Lys Gly Arg Phe Thr Ile Ser Gln Asp Asn Ala Lys Asn Thr Val Tyr
65                  70                  75                  80

Leu Gln Met Asn Ser Leu Lys Pro Glu Asp Thr Ala Met Tyr Tyr Cys
                85                  90                  95

Ala Ala Asp Thr Arg Ala Ala Phe Trp Asn Ile Gly Pro Leu Asn Ser
            100                 105                 110

Asp Gln Tyr Asn Ile Trp Gly Gln Gly Thr Gln Val Thr Val Ser Ser
            115                 120                 125

<210> SEQ ID NO 15
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1142

<400> SEQUENCE: 15

Gln Val Gln Leu Val Glu Ser Gly Gly Gly Ser Val Gln Ala Gly Gly
1               5                   10                  15

Ser Leu Thr Leu Ser Cys Ala Val Ser Gly Asn Thr Tyr Ser Thr Asn
            20                  25                  30

Ile Met Gly Trp Phe Arg Gln Ala Pro Gly Lys Glu Arg Glu Gly Val
        35                  40                  45

Ala Ala Ile Leu Ala Gly Gly Arg Asn Thr Tyr Tyr Ala Asp Ser Val
    50                  55                  60

Lys Gly Arg Phe Thr Ile Ser Gln Asp Asn Ala Lys Asn Thr Val Tyr
65                  70                  75                  80

Leu Gln Met Asn Ser Leu Lys Pro Glu Asp Thr Ala Met Tyr Tyr Cys
                85                  90                  95

Ala Ala Asp Thr Arg Ala Ala Phe Trp Asn Ile Gly Pro Leu Asn Ser
            100                 105                 110

Asp Gln Tyr Asn Ile Trp Gly Gln Gly Thr Gln Val Thr Val Ser Ser
            115                 120                 125

<210> SEQ ID NO 16
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1143

<400> SEQUENCE: 16

Gln Val Gln Leu Val Glu Ser Gly Gly Gly Ser Val Gln Ala Gly Gly
1               5                   10                  15

Ser Leu Thr Leu Ser Cys Ala Val Ser Gly Asn Thr Tyr Ser Thr Lys
            20                  25                  30

Tyr Met Gly Trp Phe Arg Gln Ala Pro Gly Lys Glu Arg Glu Gly Val
            35                  40                  45

Ala Ala Ile Leu Ala Gly Gly Arg Asp Thr Tyr Tyr Ala Asp Ser Val
        50                  55                  60

Lys Gly Arg Phe Thr Ile Ser Gln Asp Asn Ala Lys Asn Thr Val Tyr
65                  70                  75                  80

Leu Gln Met Asn Ser Leu Lys Pro Glu Asp Thr Ala Met Tyr Tyr Cys
                85                  90                  95

Ala Ala Asp Thr Arg Ala Ala Phe Trp Tyr Ile Gly Pro Leu Asn Ser
            100                 105                 110

Asp Gln Tyr Asn Ile Trp Gly Gln Gly Thr Gln Val Thr Val Ser Ser
            115                 120                 125

<210> SEQ ID NO 17
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1144

<400> SEQUENCE: 17

Gln Val Gln Leu Val Glu Ser Gly Gly Gly Ser Val Gln Ala Gly Gly
1               5                   10                  15

Ser Leu Thr Leu Ser Cys Ala Val Ser Gly Asn Thr Tyr Ser Thr Lys
            20                  25                  30

Tyr Met Gly Tyr Phe Arg Gln Ala Pro Gly Lys Glu Arg Glu Gly Val
            35                  40                  45

Ala Ala Ile Leu Ala Gly Gly Arg Asn Thr Asn Tyr Ala Asp Ser Val
        50                  55                  60

Lys Gly Arg Phe Thr Ile Ser Gln Asp Asn Ala Lys Asn Thr Val Tyr
65                  70                  75                  80

Leu Gln Met Asn Ser Leu Lys Pro Glu Asp Thr Ala Met Tyr Tyr Cys
                85                  90                  95

Ala Ala Asp Thr Arg Ala Ala Phe Trp Tyr Ile Gly Pro Leu Asn Ser
            100                 105                 110

Asp Gln Tyr Asn Ile Trp Gly Gln Gly Thr Gln Val Thr Val Ser Ser
            115                 120                 125

<210> SEQ ID NO 18
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1145

<400> SEQUENCE: 18

Gln Val Gln Leu Val Glu Ser Gly Gly Gly Ser Val Gln Ala Gly Gly
1               5                   10                  15

Ser Leu Thr Leu Ser Cys Ala Val Ser Gly Asn Thr Tyr Ser Thr Lys
            20                  25                  30

Tyr Met Ala Trp Phe Arg Gln Ala Pro Gly Lys Glu Arg Glu Gly Val
            35                  40                  45

Ala Ala Ile Leu Ala Gly Gly Arg Asn Thr Ser Tyr Ala Asp Ser Val

```
                    50                  55                  60

Lys Gly Arg Phe Thr Ile Ser Gln Asp Asn Ala Lys Asn Thr Val Tyr
 65                  70                  75                  80

Leu Gln Thr Asn Ser Leu Lys Pro Glu Asp Thr Ala Met Tyr Tyr Cys
                     85                  90                  95

Ala Ala Asp Thr Arg Ala Ala Phe Trp Tyr Ile Gly Pro Leu Asn Ser
                100                 105                 110

His Gln Tyr Asn Ile Trp Gly Gln Gly Thr Gln Val Thr Val Ser Ser
            115                 120                 125

<210> SEQ ID NO 19
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1146

<400> SEQUENCE: 19

Gln Val Gln Leu Val Glu Ser Gly Gly Gly Ser Val Gln Ala Gly Gly
  1               5                  10                  15

Ser Leu Thr Leu Ser Cys Ala Val Ser Gly Asn Thr Tyr Ser Thr Asn
                 20                  25                  30

Tyr Met Gly Trp Phe Arg Gln Ala Pro Gly Lys Glu Arg Glu Gly Val
             35                  40                  45

Ala Ala Ile Leu Val Gly Gly Arg Asn Thr Tyr Tyr Ala Asp Ser Val
         50                  55                  60

Lys Gly Arg Phe Thr Ile Ser Gln Asp Asn Ala Lys Asn Leu Val Tyr
 65                  70                  75                  80

Leu Gln Met Asn Ser Leu Lys Pro Glu Asp Thr Ala Met Tyr Tyr Cys
                     85                  90                  95

Ala Ala Asp Thr Arg Ala Ala Phe Trp Asn Ile Gly Pro Leu Asn Ser
                100                 105                 110

Asp Gln Tyr Asn Ile Trp Gly Gln Gly Thr Gln Val Thr Val Ser Ser
            115                 120                 125

<210> SEQ ID NO 20
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1147

<400> SEQUENCE: 20

Gln Val Gln Leu Val Glu Ser Gly Gly Gly Ser Val Gln Ala Gly Gly
  1               5                  10                  15

Ser Leu Thr Leu Ser Cys Ala Val Ser Gly Asn Thr Tyr Ser Thr Lys
                 20                  25                  30

Tyr Met Gly Trp Phe Arg Gln Ala Pro Gly Lys Glu Arg Glu Gly Val
             35                  40                  45

Ala Ala Ile Leu Ala Gly Gly Arg Asn Thr Tyr Tyr Ala Asp Ser Val
         50                  55                  60

Lys Gly Arg Phe Thr Ile Ser Gln Asp Asn Ala Lys Asn Thr Val Tyr
 65                  70                  75                  80
```

```
Leu Gln Met Asn Ser Leu Lys Pro Glu Asp Thr Ala Met Tyr Tyr Cys
                 85                  90                  95

Ala Ala Asp Thr Arg Ala Ala Phe Trp Tyr Ile Gly Pro Leu Asn Ser
            100                 105                 110

Asp Gln Tyr Asn Ile Trp Gly Gln Gly Thr Gln Val Thr Val Ser Ser
            115                 120                 125
```

<210> SEQ ID NO 21
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1148

<400> SEQUENCE: 21

```
Gln Val Gln Leu Val Glu Ser Gly Gly Gly Ser Val Gln Ala Gly Gly
1               5                   10                  15

Ser Leu Thr Leu Ser Cys Ala Val Ser Gly Asn Thr Tyr Ser Thr Asn
                20                  25                  30

Tyr Met Gly Trp Phe Arg Gln Ala Pro Gly Lys Glu Arg Glu Gly Val
            35                  40                  45

Ala Ala Ile Leu Ala Gly Gly Arg Asn Thr Ala Tyr Ala Asp Ser Val
        50                  55                  60

Lys Gly Arg Phe Thr Ile Ser Gln Asp Asn Ala Lys Asn Thr Val Tyr
65                  70                  75                  80

Leu Gln Met Asn Ser Leu Lys Pro Glu Asp Thr Ala Met Tyr Tyr Cys
                85                  90                  95

Ala Ala Asp Thr Arg Ala Ala Phe Trp Asn Ile Gly Pro Leu Asn Ser
            100                 105                 110

Asp Gln Tyr Asn Ile Trp Gly Gln Gly Thr Gln Val Thr Val Ser Ser
            115                 120                 125
```

<210> SEQ ID NO 22
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1149

<400> SEQUENCE: 22

```
Gln Val Gln Leu Val Glu Ser Gly Gly Gly Ser Val Gln Ala Gly Gly
1               5                   10                  15

Ser Leu Thr Leu Ser Cys Ala Val Ser Gly Asn Thr Tyr Ser Thr Asn
                20                  25                  30

Tyr Met Gly Trp Phe Arg Gln Ala Pro Gly Lys Glu Arg Glu Gly Val
            35                  40                  45

Ala Ala Ile Leu Ala Gly Gly Arg Asn Thr Tyr Tyr Ala Asp Ser Val
        50                  55                  60

Lys Gly Arg Phe Thr Ile Ser Gln Asp Asn Ala Lys Asp Thr Val Tyr
65                  70                  75                  80

Leu Gln Met Asn Ser Leu Lys Pro Glu Asp Thr Ala Met Tyr Tyr Cys
                85                  90                  95

Ala Ala Asp Thr Arg Ala Ala Phe Trp Asn Ile Gly Pro Leu Asn Ser
            100                 105                 110
```

Asp Gln Tyr Asn Ile Trp Gly Gln Gly Thr Gln Val Thr Val Ser Ser
            115                 120                 125

<210> SEQ ID NO 23
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1150

<400> SEQUENCE: 23

Gln Val Gln Leu Val Glu Ser Gly Gly Gly Ser Val Gln Ala Gly Gly
1               5                   10                  15

Ser Leu Thr Leu Ser Cys Ala Val Ser Gly Asn Thr Tyr Ser Thr Lys
            20                  25                  30

Tyr Met Gly Trp Phe Arg Gln Ala Pro Gly Lys Glu Arg Glu Gly Val
        35                  40                  45

Ala Ala Ile Leu Ala Gly Gly Arg Asn Thr His Tyr Ala Asp Ser Val
    50                  55                  60

Lys Gly Arg Phe Ala Ile Ser Gln Asp Asn Ala Lys Asn Thr Val Tyr
65                  70                  75                  80

Leu Gln Met Asn Ser Leu Lys Pro Glu Asp Thr Ala Met Tyr Tyr Cys
                85                  90                  95

Ala Ala Asp Thr Arg Ala Ala Phe Trp Asn Ile Gly Pro Leu Asn Ser
            100                 105                 110

Asp Gln Tyr Asn Ile Trp Gly Gln Gly Thr Gln Val Thr Val Ser Ser
            115                 120                 125

<210> SEQ ID NO 24
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1151

<400> SEQUENCE: 24

Gln Val Gln Leu Val Glu Ser Gly Gly Gly Ser Val Gln Ala Gly Gly
1               5                   10                  15

Ser Leu Thr Leu Ser Cys Ala Val Ser Gly Asn Thr Tyr Ser Thr Asn
            20                  25                  30

Tyr Met Gly Trp Phe Arg Gln Ala Pro Gly Lys Glu Arg Glu Gly Val
        35                  40                  45

Ala Ala Ile Leu Thr Gly Gly Arg Asn Thr Tyr Tyr Ala Asp Ser Val
    50                  55                  60

Lys Gly Arg Phe Thr Ile Ser Gln Asp Asn Ala Lys Asn Thr Val Tyr
65                  70                  75                  80

Leu Gln Met Asn Ser Leu Lys Pro Glu Asp Thr Ala Met Tyr Tyr Cys
                85                  90                  95

Ala Ala Asp Thr Arg Ala Ala Phe Trp Asn Ile Gly Pro Leu Asn Ser
            100                 105                 110

Asp Gln Tyr Asn Ile Trp Gly Gln Gly Thr Gln Val Thr Val Ser Ser
            115                 120                 125

```
<210> SEQ ID NO 25
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1152

<400> SEQUENCE: 25

Gln Val Gln Leu Val Glu Ser Gly Gly Gly Ser Val Gln Ala Gly Gly
1               5                   10                  15

Ser Leu Thr Leu Ser Cys Ala Ile Ser Gly Asn Thr Tyr Ser Thr Lys
            20                  25                  30

Tyr Met Gly Trp Phe Arg Gln Ala Pro Gly Lys Glu Arg Glu Gly Val
        35                  40                  45

Ala Ala Ile Leu Ala Gly Gly Arg Asn Thr Tyr Tyr Ala Asp Ser Val
    50                  55                  60

Lys Gly Arg Phe Thr Ile Ser Gln Asp Asn Ala Lys Asn Thr Val Tyr
65                  70                  75                  80

Leu Gln Met His Ser Leu Lys Pro Glu Asp Thr Ala Met Tyr Tyr Cys
                85                  90                  95

Ala Ala Asp Thr Arg Ala Ala Phe Trp Tyr Ile Gly Pro Leu Asn Ser
            100                 105                 110

Asp Gln Tyr Asn Leu Trp Gly Gln Gly Thr Gln Val Thr Val Ser Ser
        115                 120                 125

<210> SEQ ID NO 26
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1153

<400> SEQUENCE: 26

Gln Val Gln Leu Val Glu Ser Gly Gly Gly Ser Val Gln Ala Gly Gly
1               5                   10                  15

Ser Leu Thr Leu Ser Cys Ala Val Ser Gly Asn Thr Tyr Ser Thr Lys
            20                  25                  30

Tyr Met Gly Trp Phe Arg Gln Ala Pro Gly Lys Glu Arg Glu Gly Val
        35                  40                  45

Ala Ala Ile Leu Ala Gly Gly Arg Asn Thr Asp Tyr Ala Asp Ser Val
    50                  55                  60

Lys Gly Arg Phe Thr Ile Ser Gln Asp Asn Ala Lys Asn Thr Val Tyr
65                  70                  75                  80

Leu Gln Met Asn Ser Leu Lys Pro Glu Asp Thr Ala Met Tyr Tyr Cys
                85                  90                  95

Ala Ala Asp Thr Arg Ala Ala Phe Trp Ser Ile Gly Pro Leu Asn Ser
            100                 105                 110

Asp Gln Tyr Asn Ile Trp Gly Gln Gly Thr Gln Val Thr Val Ser Ser
        115                 120                 125

<210> SEQ ID NO 27
<211> LENGTH: 128
<212> TYPE: PRT
<213> ORGANISM: artificial sequence
<220> FEATURE:
```

<223> OTHER INFORMATION: synthetic
<220> FEATURE:
<221> NAME/KEY: misc_feature
<223> OTHER INFORMATION: QP1154

<400> SEQUENCE: 27

Gln Val Gln Leu Val Glu Ser Gly Gly Gly Ser Val Gln Ala Gly Gly
1               5                   10                  15

Ser Leu Thr Leu Ser Cys Ala Val Ser Gly Asn Thr Tyr Ser Thr Asn
            20                  25                  30

Tyr Met Ala Trp Phe Arg Gln Ala Pro Gly Lys Glu Arg Glu Gly Val
        35                  40                  45

Ala Ala Ile Arg Ala Gly Gly Arg Asn Thr Asp Tyr Ala Asp Ser Val
    50                  55                  60

Lys Gly Arg Phe Thr Ile Ser Gln Asp Asn Ala Lys Asn Thr Val Tyr
65                  70                  75                  80

Leu Gln Met Asn Ser Leu Lys Pro Glu Asp Thr Ala Met Tyr Tyr Cys
                85                  90                  95

Ala Ala Asp Thr Arg Ala Ala Phe Trp Tyr Ile Gly Pro Leu Asn Ser
            100                 105                 110

Asp Gln Tyr Asn Ile Trp Gly Gln Gly Thr Gln Val Thr Val Ser Ser
        115                 120                 125

<210> SEQ ID NO 28
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1155

<400> SEQUENCE: 28

Gln Val Gln Leu Val Glu Ser Gly Gly Gly Ser Val Gln Ala Gly Gly
1               5                   10                  15

Ser Leu Thr Leu Ser Cys Glu Val Ser Gly Ser Thr Tyr Ser Thr Asn
            20                  25                  30

Tyr Met Gly Trp Phe Arg Gln Ala Pro Gly Lys Glu Arg Glu Gly Val
        35                  40                  45

Ala Ala Ile Leu Ala Gly Gly Arg Asn Thr Asp Tyr Ala Asp Ser Val
    50                  55                  60

Lys Gly Arg Phe Thr Ile Ser Gln Asp Asn Ala Lys Asn Thr Val Tyr
65                  70                  75                  80

Leu Gln Met Asn Ser Leu Lys Pro Glu Asp Thr Ala Met Tyr Tyr Cys
                85                  90                  95

Ala Ala Asp Thr Arg Ala Ala Phe Trp Tyr Ile Gly Pro Leu Asn Ser
            100                 105                 110

Asp Gln Tyr Asn Ile Trp Gly Gln Gly Thr Gln Val Thr Val Ser Ser
        115                 120                 125

<210> SEQ ID NO 29
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1156

-continued

<400> SEQUENCE: 29

Gln Val Gln Leu Val Glu Ser Gly Gly Gly Ser Val Gln Ala Gly Gly
1               5                   10                  15

Ser Leu Thr Leu Ser Cys Ala Val Ser Gly Asn Thr Tyr Ser Thr Lys
            20                  25                  30

Tyr Met Gly Trp Phe Arg Gln Ala Pro Gly Lys Glu Arg Glu Gly Val
        35                  40                  45

Ala Ala Ile Leu Ala Gly Gly Arg Asn Thr Tyr Tyr Ala Asp Ser Val
    50                  55                  60

Lys Gly Arg Phe Thr Ile Ser Gln Asp Ser Ala Lys Asn Thr Val Tyr
65                  70                  75                  80

Leu Gln Met Asn Ser Leu Lys Pro Glu Asp Thr Ala Met Tyr Tyr Cys
                85                  90                  95

Ala Ala Asp Thr Arg Ala Ala Phe Trp Tyr Ile Gly Pro Leu Asn Ser
            100                 105                 110

Asp Gln Tyr Asn Ser Trp Gly Gln Gly Thr Gln Val Thr Val Ser Ser
        115                 120                 125

<210> SEQ ID NO 30
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1157

<400> SEQUENCE: 30

Gln Val Gln Leu Val Glu Ser Gly Gly Gly Ser Val Gln Ala Gly Gly
1               5                   10                  15

Ser Leu Thr Leu Ser Cys Ala Val Ser Gly Asn Thr Tyr Ser Thr Asn
            20                  25                  30

Tyr Met Gly Trp Phe Arg Gln Ala Pro Gly Lys Glu Arg Glu Gly Val
        35                  40                  45

Ala Ala Ile Leu Val Gly Gly Arg Asn Thr Tyr Tyr Ala Asp Pro Val
    50                  55                  60

Lys Gly Arg Phe Thr Ile Ser Gln Asp Asn Ala Lys Asn Leu Val Tyr
65                  70                  75                  80

Leu Gln Met Asn Ser Leu Lys Pro Glu Asp Thr Ala Met Tyr Tyr Cys
                85                  90                  95

Ala Ala Asp Thr Arg Ala Ala Phe Trp Asn Ile Gly Pro Leu Asn Ser
            100                 105                 110

Asp Gln Tyr Asn Ile Trp Gly Gln Gly Thr Gln Val Thr Val Ser Ser
        115                 120                 125

<210> SEQ ID NO 31
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1158

<400> SEQUENCE: 31

Gln Val Gln Leu Val Glu Ser Gly Gly Gly Ser Val Gln Ala Gly Gly
1               5                   10                  15

Ser Leu Thr Leu Ser Cys Ala Val Ser Gly Asn Thr Tyr Ser Thr Lys
            20                  25                  30

Tyr Met Gly Trp Phe Arg Gln Ala Pro Gly Lys Glu Arg Glu Gly Val
            35                  40                  45

Ala Ala Ile Leu Ala Gly Gly Arg Asn Thr Tyr Tyr Ala Asp Ser Val
        50                  55                  60

Lys Gly Arg Phe Thr Ile Ser Gln Asp Asn Ala Lys Asn Thr Val Tyr
65                  70                  75                  80

Leu Arg Met Asn Ser Leu Lys Pro Glu Asp Thr Ala Met Tyr Tyr Cys
                85                  90                  95

Ala Ala Asp Thr Arg Ala Ala Leu Trp Tyr Ile Gly Pro Leu Asn Ser
            100                 105                 110

Asp Gln Tyr Asn Thr Trp Gly Gln Gly Thr Gln Val Thr Val Ser Ser
            115                 120                 125

<210> SEQ ID NO 32
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1159

<400> SEQUENCE: 32

Gln Val Gln Leu Val Glu Ser Gly Gly Gly Ser Val Gln Ala Gly Gly
1               5                   10                  15

Ser Leu Thr Leu Ser Cys Ala Val Ser Gly Asn Thr Tyr Ser Thr Lys
            20                  25                  30

Tyr Met Gly Trp Phe Arg Gln Ala Pro Gly Lys Glu Arg Glu Gly Val
            35                  40                  45

Ala Ala Ile Leu Ala Gly Gly Arg Asn Thr Ser Tyr Ala Asp Ser Val
        50                  55                  60

Lys Gly Arg Phe Thr Ile Ser Gln Asp Asn Ala Lys Asn Thr Val Tyr
65                  70                  75                  80

Leu Gln Met Asn Ser Leu Lys Pro Glu Asp Thr Ala Met Tyr Tyr Cys
                85                  90                  95

Ala Ala Asp Thr Arg Ala Ala Phe Trp Tyr Ile Gly Pro Leu Asn Ser
            100                 105                 110

Asp Gln Tyr Asn Ile Trp Gly Gln Gly Thr Gln Val Thr Val Ser Ser
            115                 120                 125

<210> SEQ ID NO 33
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1160

<400> SEQUENCE: 33

Gln Val Gln Leu Val Glu Ser Gly Gly Gly Ser Val Gln Ala Gly Gly
1               5                   10                  15

Ser Leu Thr Leu Ser Cys Ala Ile Ser Gly Asn Thr Tyr Ser Thr Lys
            20                  25                  30

Tyr Met Gly Trp Phe Arg Gln Ala Pro Gly Lys Glu Arg Glu Gly Val
            35                  40                  45

Ala Ala Ile Leu Ala Gly Gly Arg Asn Thr Tyr Tyr Ala Asp Ser Val
            50                  55                  60

Lys Gly Arg Phe Thr Ile Ser Gln Asp Asn Ala Lys Asn Thr Val Tyr
 65                  70                  75                  80

Leu Gln Met Asn Ser Leu Lys Pro Glu Asp Thr Ala Met Tyr Tyr Cys
                 85                  90                  95

Ala Ala Asp Ala Arg Ala Ala Phe Trp Tyr Ile Gly Pro Leu Asn Ser
            100                 105                 110

Asp Gln Tyr Asn Ile Trp Gly Gln Gly Thr Gln Val Thr Val Ser Ser
            115                 120                 125

<210> SEQ ID NO 34
<211> LENGTH: 128
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1161

<400> SEQUENCE: 34

Gln Val Gln Leu Val Glu Ser Gly Gly Gly Ser Val Gln Ala Gly Gly
 1               5                  10                  15

Ser Leu Thr Leu Ser Cys Ala Val Ser Gly Asn Thr Tyr Ser Thr Asn
                20                  25                  30

Tyr Met Ala Trp Phe Arg Gln Ala Pro Gly Lys Glu Arg Glu Gly Val
            35                  40                  45

Ala Ala Ile Arg Val Gly Gly Arg Asn Thr Asp Tyr Ala Asp Ser Val
            50                  55                  60

Lys Gly Arg Phe Thr Ile Ser Gln Asp Asn Ala Lys Asn Thr Val Tyr
 65                  70                  75                  80

Leu Gln Met Asn Ser Leu Lys Pro Glu Asp Thr Ala Met Tyr Tyr Cys
                 85                  90                  95

Ala Ala Asp Thr Arg Ala Ala Phe Trp Tyr Ile Gly Pro Leu Asn Ser
            100                 105                 110

Asp Gln Tyr Asn Ile Trp Gly Gln Gly Thr Gln Val Thr Val Ser Ser
            115                 120                 125

<210> SEQ ID NO 35
<211> LENGTH: 126
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1162

<400> SEQUENCE: 35

Gln Val Gln Leu Val Glu Ser Gly Gly Gly Ser Val Gln Ser Gly Gly
 1               5                  10                  15

Ser Leu Arg Leu Ser Cys Ala Ala Ser Gly Phe Thr Tyr Gly Thr Tyr
                20                  25                  30

Ala Met Ser Trp Phe Arg Gln Ala Pro Gly Lys Glu Arg Glu Gly Val
            35                  40                  45

Ala Cys Ile Asp Ile Tyr Gly Arg Ala Ser Tyr Thr Asp Pro Val Lys
            50                  55                  60

Gly Arg Phe Thr Ile Ser Gln Asp Asn Ala Lys Asn Thr Leu Tyr Leu

```
                        65                  70                  75                  80
Gln Met Asn Ser Leu Lys Pro Glu Asp Thr Ala Met Tyr Tyr Cys Ala
                85                  90                  95

Ala Arg Asp Phe Gly Tyr Cys Thr Ala Ser Trp Val His Glu Gly Phe
                100                 105                 110

Ser Arg Tyr Trp Gly Gln Gly Thr Gln Val Thr Val Ser Ser
                115                 120                 125
```

<210> SEQ ID NO 36
<211> LENGTH: 126
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1163

<400> SEQUENCE: 36

```
Gln Val Gln Leu Val Glu Ser Gly Gly Gly Val Gln Ser Gly Gly
1               5                   10                  15

Ser Leu Arg Leu Ser Cys Ala Ala Ser Gly Phe Thr Tyr Gly Thr Tyr
                20                  25                  30

Ala Met Ser Trp Phe Arg Gln Ala Pro Gly Lys Glu Arg Glu Gly Val
                35                  40                  45

Ala Cys Ile Asp Ile Tyr Gly Arg Thr Ser Tyr Thr Asp Pro Val Lys
            50                  55                  60

Gly Arg Phe Thr Ile Ser Gln Asp Asn Ala Lys Asn Thr Leu Tyr Leu
65                  70                  75                  80

Gln Met Asn Ser Leu Lys Pro Glu Asp Thr Ala Met Tyr Tyr Cys Ala
                85                  90                  95

Ala Arg Asp Phe Gly Tyr Cys Thr Ala Ser Trp Val His Ala Gly Phe
                100                 105                 110

Ser Arg Tyr Trp Gly Gln Gly Thr Gln Val Thr Val Ser Ser
                115                 120                 125
```

<210> SEQ ID NO 37
<211> LENGTH: 126
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1164

<400> SEQUENCE: 37

```
Gln Val Gln Leu Val Glu Ser Gly Gly Gly Ser Val Gln Ser Gly Gly
1               5                   10                  15

Ser Leu Arg Leu Ser Cys Ala Ala Ser Gly Phe Thr Tyr Gly Thr Tyr
                20                  25                  30

Ala Met Ser Trp Phe Arg Gln Thr Pro Gly Lys Glu Arg Glu Gly Val
                35                  40                  45

Ala Cys Ile Asp Ile Tyr Gly Arg Thr Ser Tyr Thr Asp Pro Val Lys
            50                  55                  60

Gly Arg Phe Thr Ile Ser Gln Asp Asn Ala Lys Asn Thr Leu Tyr Leu
65                  70                  75                  80

Gln Met Asn Ser Leu Lys Pro Glu Asp Thr Ala Met Tyr Tyr Cys Ala
                85                  90                  95
```

```
Ala Arg Asp Phe Gly Tyr Cys Thr Ala Ser Trp Val His Glu Gly Phe
            100                 105                 110

Ser Arg Tyr Trp Gly Gln Gly Thr Gln Val Thr Val Ser Ser
            115                 120                 125

<210> SEQ ID NO 38
<211> LENGTH: 126
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1165

<400> SEQUENCE: 38

Gln Val Gln Leu Val Glu Ser Gly Gly Gly Ser Val Gln Ser Gly Gly
1               5                   10                  15

Ser Leu Arg Leu Ser Cys Ala Ala Ser Gly Phe Thr Tyr Gly Ala Tyr
            20                  25                  30

Ala Met Ser Trp Phe Arg Gln Ala Pro Gly Lys Glu Arg Glu Gly Val
        35                  40                  45

Ala Cys Ile Asp Ile Tyr Gly Arg Thr Ser Tyr Thr Asp Pro Val Lys
    50                  55                  60

Gly Arg Phe Thr Ile Ser Gln Asp Asn Ala Lys Asn Thr Leu Tyr Leu
65                  70                  75                  80

Gln Met Asn Ser Leu Lys Pro Glu Asp Thr Ala Met Tyr Tyr Cys Ala
                85                  90                  95

Ala Arg Asp Phe Gly Tyr Cys Thr Ala Ser Trp Val His Glu Gly Phe
            100                 105                 110

Ser Arg Tyr Trp Gly Gln Gly Thr Gln Val Thr Val Ser Ser
            115                 120                 125

<210> SEQ ID NO 39
<211> LENGTH: 126
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1166

<400> SEQUENCE: 39

Gln Val Gln Leu Val Glu Ser Gly Gly Asp Ser Val Gln Pro Gly Gly
1               5                   10                  15

Ser Leu Arg Leu Ser Cys Ala Ala Ser Gly Phe Thr Tyr Gly Thr Tyr
            20                  25                  30

Ala Met Ser Trp Phe Arg Gln Ala Pro Gly Lys Glu Arg Glu Gly Val
        35                  40                  45

Ala Cys Ile Asp Ile Tyr Gly Arg Thr Ser Tyr Thr Asp Pro Val Lys
    50                  55                  60

Gly Arg Phe Thr Ile Ser Gln Asp Asn Ala Lys Asn Thr Leu Tyr Leu
65                  70                  75                  80

Gln Met Asn Ser Leu Lys Pro Glu Asp Thr Ala Met Tyr Tyr Cys Ala
                85                  90                  95

Ala Arg Asp Phe Gly Tyr Cys Thr Ala Ser Trp Val His Glu Gly Phe
            100                 105                 110

Ser Arg Tyr Trp Gly Gln Gly Thr Gln Val Thr Val Ser Ser
            115                 120                 125
```

<210> SEQ ID NO 40
<211> LENGTH: 126
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1168

<400> SEQUENCE: 40

Gln Val Gln Leu Val Glu Ser Gly Gly Gly Ser Val Gln Ser Gly Gly
1               5                   10                  15

Ser Leu Arg Leu Ser Cys Ala Ala Ser Gly Phe Thr Tyr Glu Thr Tyr
            20                  25                  30

Ala Met Ser Trp Phe Arg Gln Ala Pro Gly Lys Glu Arg Glu Gly Val
        35                  40                  45

Ala Cys Ile Asp Ile Tyr Gly Arg Thr Ser Tyr Thr Asp Pro Val Lys
    50                  55                  60

Gly Arg Phe Thr Ile Ser Gln Asp Asn Ala Lys Asn Thr Leu Tyr Leu
65                  70                  75                  80

Gln Met Asn Ser Leu Lys Pro Glu Asp Thr Ala Met Tyr Tyr Cys Ala
                85                  90                  95

Ala Arg Asp Phe Gly Tyr Cys Thr Ala Ser Trp Val His Glu Gly Phe
            100                 105                 110

Ser Arg Tyr Trp Gly Gln Gly Thr Gln Val Thr Val Ser Ser
        115                 120                 125

<210> SEQ ID NO 41
<211> LENGTH: 126
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1169

<400> SEQUENCE: 41

Gln Val Gln Leu Val Glu Ser Gly Gly Gly Ser Val Gln Ser Gly Gly
1               5                   10                  15

Ser Leu Arg Leu Ser Cys Ala Ala Ser Gly Phe Thr Tyr Gly Thr Tyr
            20                  25                  30

Ala Met Ser Trp Phe Arg Gln Ala Pro Gly Lys Glu Arg Glu Gly Val
        35                  40                  45

Ala Cys Ile Asp Ile Tyr Gly Arg Thr Ser Tyr Thr Asp Pro Val Lys
    50                  55                  60

Gly Arg Phe Thr Ile Ser Gln Asp Asn Ala Lys Asn Thr Leu Tyr Leu
65                  70                  75                  80

Gln Met Asn Ser Leu Lys Pro Gly Asp Thr Ala Met Tyr Tyr Cys Ala
                85                  90                  95

Ala Arg Asp Phe Gly Tyr Cys Thr Ala Ser Trp Val His Glu Gly Phe
            100                 105                 110

Ser Arg Tyr Trp Gly Gln Gly Thr Gln Val Thr Val Ser Ser
        115                 120                 125

<210> SEQ ID NO 42
<211> LENGTH: 232
<212> TYPE: PRT

<213> ORGANISM: Homo sapiens
<220> FEATURE:
<221> NAME/KEY: misc_feature
<223> OTHER INFORMATION: Human IgG1

<400> SEQUENCE: 42

```
Glu Pro Lys Ser Ser Asp Lys Thr His Thr Cys Pro Pro Cys Pro Ala
1               5                   10                  15

Pro Glu Leu Leu Gly Gly Pro Ser Val Phe Leu Phe Pro Pro Lys Pro
            20                  25                  30

Lys Asp Thr Leu Met Ile Ser Arg Thr Pro Glu Val Thr Cys Val Val
        35                  40                  45

Val Asp Val Ser His Glu Asp Pro Glu Val Lys Phe Asn Trp Tyr Val
    50                  55                  60

Asp Gly Val Glu Val His Asn Ala Lys Thr Lys Pro Arg Glu Glu Gln
65                  70                  75                  80

Tyr Asn Ser Thr Tyr Arg Val Val Ser Val Leu Thr Val Leu His Gln
                85                  90                  95

Asp Trp Leu Asn Gly Lys Glu Tyr Lys Cys Lys Val Ser Asn Lys Ala
            100                 105                 110

Leu Pro Ala Pro Ile Glu Lys Thr Ile Ser Lys Ala Lys Gly Gln Pro
        115                 120                 125

Arg Glu Pro Gln Val Tyr Thr Leu Pro Pro Ser Arg Asp Glu Leu Thr
130                 135                 140

Lys Asn Gln Val Ser Leu Thr Cys Leu Val Lys Gly Phe Tyr Pro Ser
145                 150                 155                 160

Asp Ile Ala Val Glu Trp Glu Ser Asn Gly Gln Pro Glu Asn Asn Tyr
                165                 170                 175

Lys Thr Thr Pro Pro Val Leu Asp Ser Asp Gly Ser Phe Phe Leu Tyr
            180                 185                 190

Ser Lys Leu Thr Val Asp Lys Ser Arg Trp Gln Gln Gly Asn Val Phe
        195                 200                 205

Ser Cys Ser Val Met His Glu Ala Leu His Asn His Tyr Thr Gln Lys
210                 215                 220

Ser Leu Ser Leu Ser Pro Gly Lys
225                 230
```

<210> SEQ ID NO 43
<211> LENGTH: 254
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: PD-L1-his

<400> SEQUENCE: 43

```
Met Arg Ile Phe Ala Val Phe Ile Phe Met Thr Tyr Trp His Leu Leu
1               5                   10                  15

Asn Ala Phe Thr Val Thr Val Pro Lys Asp Leu Tyr Val Val Glu Tyr
            20                  25                  30

Gly Ser Asn Met Thr Ile Glu Cys Lys Phe Pro Val Glu Lys Gln Leu
        35                  40                  45

Asp Leu Ala Ala Leu Ile Val Tyr Trp Glu Met Glu Asp Lys Asn Ile
    50                  55                  60

Ile Gln Phe Val His Gly Glu Glu Asp Leu Lys Val Gln His Ser Ser
65                  70                  75                  80
```

```
Tyr Arg Gln Arg Ala Arg Leu Leu Lys Asp Gln Leu Ser Leu Gly Asn
                85                  90                  95

Ala Ala Leu Gln Ile Thr Asp Val Lys Leu Gln Asp Ala Gly Val Tyr
            100                 105                 110

Arg Cys Met Ile Ser Tyr Gly Gly Ala Asp Tyr Lys Arg Ile Thr Val
        115                 120                 125

Lys Val Asn Ala Pro Tyr Asn Lys Ile Asn Gln Arg Ile Leu Val Val
    130                 135                 140

Asp Pro Val Thr Ser Glu His Glu Leu Thr Cys Gln Ala Glu Gly Tyr
145                 150                 155                 160

Pro Lys Ala Glu Val Ile Trp Thr Ser Ser Asp His Gln Val Leu Ser
                165                 170                 175

Gly Lys Thr Thr Thr Thr Asn Ser Lys Arg Glu Glu Lys Leu Phe Asn
                180                 185                 190

Val Thr Ser Thr Leu Arg Ile Asn Thr Thr Thr Asn Glu Ile Phe Tyr
                195                 200                 205

Cys Thr Phe Arg Arg Leu Asp Pro Glu Glu Asn His Thr Ala Glu Leu
        210                 215                 220

Val Ile Pro Glu Leu Pro Leu Ala His Pro Pro Asn Glu Arg Glu Gln
225                 230                 235                 240

Lys Leu Ile Ser Glu Glu Asp Leu His His His His His His
                245                 250
```

<210> SEQ ID NO 44
<211> LENGTH: 5
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1120-CDR1

<400> SEQUENCE: 44

Thr Tyr Ala Met Ser
1               5

<210> SEQ ID NO 45
<211> LENGTH: 5
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1121-CDR1

<400> SEQUENCE: 45

Gly Thr Cys Met Ala
1               5

<210> SEQ ID NO 46
<211> LENGTH: 5
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1122-CDR1

<400> SEQUENCE: 46

```
Thr Asn Val Met Gly
1               5

<210> SEQ ID NO 47
<211> LENGTH: 5
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1123-CDR1

<400> SEQUENCE: 47

His Tyr Cys Met Gly
1               5

<210> SEQ ID NO 48
<211> LENGTH: 5
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1124-CDR1

<400> SEQUENCE: 48

Thr Cys Ala Met Gly
1               5

<210> SEQ ID NO 49
<211> LENGTH: 5
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1125-CDR1

<400> SEQUENCE: 49

Thr Cys Ala Met Ala
1               5

<210> SEQ ID NO 50
<211> LENGTH: 5
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1126-CDR1

<400> SEQUENCE: 50

Thr Lys Tyr Met Ser
1               5

<210> SEQ ID NO 51
<211> LENGTH: 5
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1127-CDR1

<400> SEQUENCE: 51
```

```
Thr Tyr Ser Met Ala
1               5

<210> SEQ ID NO 52
<211> LENGTH: 5
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1128-CDR1

<400> SEQUENCE: 52

Ala Tyr Tyr Met Ala
1               5

<210> SEQ ID NO 53
<211> LENGTH: 5
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1129-CDR1

<400> SEQUENCE: 53

Arg Tyr Ser Val Gly
1               5

<210> SEQ ID NO 54
<211> LENGTH: 5
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1130-CDR1

<400> SEQUENCE: 54

Thr Ser Thr Met Met
1               5

<210> SEQ ID NO 55
<211> LENGTH: 5
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1139-CDR1

<400> SEQUENCE: 55

Thr Asn Ala Met Gly
1               5

<210> SEQ ID NO 56
<211> LENGTH: 5
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1140-CDR1
```

```
<400> SEQUENCE: 56

Thr Lys Tyr Met Gly
1               5

<210> SEQ ID NO 57
<211> LENGTH: 5
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1142-CDR1

<400> SEQUENCE: 57

Thr Asn Ile Met Gly
1               5

<210> SEQ ID NO 58
<211> LENGTH: 5
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1145-CDR1

<400> SEQUENCE: 58

Thr Lys Tyr Met Ala
1               5

<210> SEQ ID NO 59
<211> LENGTH: 5
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1154-CDR1

<400> SEQUENCE: 59

Thr Asn Tyr Met Ala
1               5

<210> SEQ ID NO 60
<211> LENGTH: 5
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1165-CDR1

<400> SEQUENCE: 60

Ala Tyr Ala Met Ser
1               5

<210> SEQ ID NO 61
<211> LENGTH: 16
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1120-CDR2
```

<400> SEQUENCE: 61

Cys Ile Asp Ile Tyr Gly Arg Thr Ser Tyr Thr Asp Pro Val Lys Gly
1               5                   10                  15

<210> SEQ ID NO 62
<211> LENGTH: 17
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1121-CDR2

<400> SEQUENCE: 62

Gly Leu Trp Thr Gly Asp Gly Val Thr Tyr Tyr Ala Asp Ser Val Lys
1               5                   10                  15
Gly

<210> SEQ ID NO 63
<211> LENGTH: 17
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1122-CDR2

<400> SEQUENCE: 63

Ala Ile Leu Ala Gly Gly Arg Asn Thr Tyr Tyr Ala Asp Ser Val Lys
1               5                   10                  15
Gly

<210> SEQ ID NO 64
<211> LENGTH: 16
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1123-CDR2

<400> SEQUENCE: 64

Ser Ile Asp Thr Phe Gly Ile Pro Lys Tyr Ala Asp Ser Val Lys Gly
1               5                   10                  15

<210> SEQ ID NO 65
<211> LENGTH: 16
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1124-CDR2

<400> SEQUENCE: 65

Ser Ile Ser Lys Tyr Gly Ile Thr Thr Tyr Ala Asn Ser Val Lys Gly
1               5                   10                  15

<210> SEQ ID NO 66
<211> LENGTH: 16
<212> TYPE: PRT
<213> ORGANISM: artificial sequence

```
<220> FEATURE:
<223> OTHER INFORMATION: synthetic
<220> FEATURE:
<221> NAME/KEY: misc_feature
<223> OTHER INFORMATION: QP1125-CDR2

<400> SEQUENCE: 66

Ser Ile Ser Thr Leu Gly Thr Thr Asn Tyr Ala Ser Ser Val Lys Gly
1               5                   10                  15

<210> SEQ ID NO 67
<211> LENGTH: 16
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1127-CDR2

<400> SEQUENCE: 67

Ala Ile Asn Ser Asp Gly His Thr Thr Tyr Val Asp Ser Val Lys Gly
1               5                   10                  15

<210> SEQ ID NO 68
<211> LENGTH: 16
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1128-CDR2

<400> SEQUENCE: 68

Ala Ile Asn Arg Asp Gly Asp Thr Lys Tyr Ala Asp Ser Val Lys Gly
1               5                   10                  15

<210> SEQ ID NO 69
<211> LENGTH: 16
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1129-CDR2

<400> SEQUENCE: 69

Gly Gln Thr Pro Arg Gly Thr Thr Thr Tyr Ala Asp Ser Val Lys Asp
1               5                   10                  15

<210> SEQ ID NO 70
<211> LENGTH: 17
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1130-CDR2

<400> SEQUENCE: 70

Gly Ile His Asn Asp Gly Gly Pro Ile Ala Tyr Ala Asp Ser Val Lys
1               5                   10                  15

Gly

<210> SEQ ID NO 71
```

```
<211> LENGTH: 17
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1139-CDR2

<400> SEQUENCE: 71

Ala Ile Leu Gly Gly Gly Arg Asn Thr Tyr Tyr Ala Asp Ser Val Lys
1               5                   10                  15
Gly

<210> SEQ ID NO 72
<211> LENGTH: 17
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1143-CDR2

<400> SEQUENCE: 72

Ala Ile Leu Ala Gly Gly Arg Asp Thr Tyr Tyr Ala Asp Ser Val Lys
1               5                   10                  15
Gly

<210> SEQ ID NO 73
<211> LENGTH: 17
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1144-CDR2

<400> SEQUENCE: 73

Ala Ile Leu Ala Gly Gly Arg Asn Thr Asn Tyr Ala Asp Ser Val Lys
1               5                   10                  15
Gly

<210> SEQ ID NO 74
<211> LENGTH: 17
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1145-CDR2

<400> SEQUENCE: 74

Ala Ile Leu Ala Gly Gly Arg Asn Thr Ser Tyr Ala Asp Ser Val Lys
1               5                   10                  15
Gly

<210> SEQ ID NO 75
<211> LENGTH: 17
<212> TYPE: PRT
<213> ORGANISM: artificial sequence
<220> FEATURE:
<223> OTHER INFORMATION: synthetic
<220> FEATURE:
<221> NAME/KEY: misc_feature
```

```
<223> OTHER INFORMATION: QP1146-CDR2

<400> SEQUENCE: 75

Ala Ile Leu Val Gly Gly Arg Asn Thr Tyr Tyr Ala Asp Ser Val Lys
1               5                   10                  15
Gly

<210> SEQ ID NO 76
<211> LENGTH: 17
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1148-CDR2

<400> SEQUENCE: 76

Ala Ile Leu Ala Gly Gly Arg Asn Thr Ala Tyr Ala Asp Ser Val Lys
1               5                   10                  15
Gly

<210> SEQ ID NO 77
<211> LENGTH: 17
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1150-CDR2

<400> SEQUENCE: 77

Ala Ile Leu Ala Gly Gly Arg Asn Thr His Tyr Ala Asp Ser Val Lys
1               5                   10                  15
Gly

<210> SEQ ID NO 78
<211> LENGTH: 17
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1151-CDR2

<400> SEQUENCE: 78

Ala Ile Leu Thr Gly Gly Arg Asn Thr Tyr Tyr Ala Asp Ser Val Lys
1               5                   10                  15
Gly

<210> SEQ ID NO 79
<211> LENGTH: 17
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1153-CDR2

<400> SEQUENCE: 79

Ala Ile Leu Ala Gly Gly Arg Asn Thr Asp Tyr Ala Asp Ser Val Lys
1               5                   10                  15
```

Gly

```
<210> SEQ ID NO 80
<211> LENGTH: 17
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1157-CDR2

<400> SEQUENCE: 80
```

Ala Ile Leu Val Gly Gly Arg Asn Thr Tyr Tyr Ala Asp Pro Val Lys
1               5                   10                  15

Gly

```
<210> SEQ ID NO 81
<211> LENGTH: 17
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1161-CDR2

<400> SEQUENCE: 81
```

Ala Ile Arg Val Gly Gly Arg Asn Thr Asp Tyr Ala Asp Ser Val Lys
1               5                   10                  15

Gly

```
<210> SEQ ID NO 82
<211> LENGTH: 16
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1162-CDR2

<400> SEQUENCE: 82
```

Cys Ile Asp Ile Tyr Gly Arg Ala Ser Tyr Thr Asp Pro Val Lys Gly
1               5                   10                  15

```
<210> SEQ ID NO 83
<211> LENGTH: 19
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1120-CDR3

<400> SEQUENCE: 83
```

Ala Arg Asp Phe Gly Tyr Cys Thr Ala Ser Trp Val His Glu Gly Phe
1               5                   10                  15

Ser Arg Tyr

```
<210> SEQ ID NO 84
<211> LENGTH: 17
<212> TYPE: PRT
<213> ORGANISM: artificial sequence
<220> FEATURE:
<223> OTHER INFORMATION: synthetic
```

```
<220> FEATURE:
<221> NAME/KEY: misc_feature
<223> OTHER INFORMATION: QP1121-CDR3

<400> SEQUENCE: 84

Ser Asn Gly Met Cys Gly Gln Tyr Trp Ala Leu Glu Asp Glu Tyr Lys
1               5                   10                  15

Tyr

<210> SEQ ID NO 85
<211> LENGTH: 20
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1122-CDR3

<400> SEQUENCE: 85

Ala Asp Thr Arg Ala Ala Phe Trp Asn Ile Gly Pro Leu Asn Ser Asp
1               5                   10                  15

Gln Tyr Asn Ile
            20

<210> SEQ ID NO 86
<211> LENGTH: 19
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1123-CDR3

<400> SEQUENCE: 86

Gly Arg Ser Tyr Thr Asn Cys Arg Asp Gly Pro Pro Ser Ala Ser His
1               5                   10                  15

Tyr Ser His

<210> SEQ ID NO 87
<211> LENGTH: 16
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1124-CDR3

<400> SEQUENCE: 87

Lys Thr Phe Ser Cys Arg Asn Arg Gly Gly Ala Tyr Leu Ala Asp Ala
1               5                   10                  15

<210> SEQ ID NO 88
<211> LENGTH: 20
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1126-CDR3

<400> SEQUENCE: 88

Ala Asp Thr Arg Ala Ala Leu Trp Tyr Ile Gly Pro Leu Asn Ser Asp
1               5                   10                  15
```

Gln Tyr Asn Thr
            20

<210> SEQ ID NO 89
<211> LENGTH: 30
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1127-CDR3

<400> SEQUENCE: 89

Ala Thr Ser Gln Leu Gly Phe Trp Ala Gln Lys Leu Trp Glu Ala Ile
1               5                   10                  15

Arg Asp Gly Thr Trp Ser Pro Ser Thr Thr Asp Phe Gly Phe
            20                  25                  30

<210> SEQ ID NO 90
<211> LENGTH: 20
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1128-CDR3

<400> SEQUENCE: 90

Ala Ser Asp Trp Ser Arg Leu Tyr Lys Ile Tyr Trp Leu Asp Asp Asn
1               5                   10                  15

Tyr Tyr Val Arg
            20

<210> SEQ ID NO 91
<211> LENGTH: 17
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1129-CDR3

<400> SEQUENCE: 91

Ala Gly Gln Ala Leu Leu Trp Ala Ser Leu Arg Gln Thr Ser Tyr Gln
1               5                   10                  15

Phe

<210> SEQ ID NO 92
<211> LENGTH: 10
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1130-CDR3

<400> SEQUENCE: 92

Gly Trp Tyr Phe Ser Gly Asp Tyr Val Pro
1               5                   10

<210> SEQ ID NO 93
<211> LENGTH: 20

```
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1143-CDR3

<400> SEQUENCE: 93

Ala Asp Thr Arg Ala Ala Phe Trp Tyr Ile Gly Pro Leu Asn Ser Asp
1               5                   10                  15

Gln Tyr Asn Ile
            20

<210> SEQ ID NO 94
<211> LENGTH: 20
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1145-CDR3

<400> SEQUENCE: 94

Ala Asp Thr Arg Ala Ala Phe Trp Tyr Ile Gly Pro Leu Asn Ser His
1               5                   10                  15

Gln Tyr Asn Ile
            20

<210> SEQ ID NO 95
<211> LENGTH: 20
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1152-CDR3

<400> SEQUENCE: 95

Ala Asp Thr Arg Ala Ala Phe Trp Tyr Ile Gly Pro Leu Asn Ser Asp
1               5                   10                  15

Gln Tyr Asn Leu
            20

<210> SEQ ID NO 96
<211> LENGTH: 20
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1153-CDR3

<400> SEQUENCE: 96

Ala Asp Thr Arg Ala Ala Phe Trp Ser Ile Gly Pro Leu Asn Ser Asp
1               5                   10                  15

Gln Tyr Asn Ile
            20

<210> SEQ ID NO 97
<211> LENGTH: 20
<212> TYPE: PRT
<213> ORGANISM: artificial sequence
<220> FEATURE:
```

<223> OTHER INFORMATION: synthetic
<220> FEATURE:
<221> NAME/KEY: misc_feature
<223> OTHER INFORMATION: QP1156-CDR3

<400> SEQUENCE: 97

Ala Asp Thr Arg Ala Ala Phe Trp Tyr Ile Gly Pro Leu Asn Ser Asp
1               5                   10                  15

Gln Tyr Asn Ser
            20

<210> SEQ ID NO 98
<211> LENGTH: 20
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1160-CDR3

<400> SEQUENCE: 98

Ala Asp Ala Arg Ala Ala Phe Trp Tyr Ile Gly Pro Leu Asn Ser Asp
1               5                   10                  15

Gln Tyr Asn Ile
            20

<210> SEQ ID NO 99
<211> LENGTH: 19
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1163-CDR3

<400> SEQUENCE: 99

Ala Arg Asp Phe Gly Tyr Cys Thr Ala Ser Trp Val His Ala Gly Phe
1               5                   10                  15

Ser Arg Tyr

<210> SEQ ID NO 100
<211> LENGTH: 126
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP320

<400> SEQUENCE: 100

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Tyr Gly Thr Tyr
                20                  25                  30

Ala Met Ser Trp Val Arg Gln Ala Pro Gly Lys Gly Leu Glu Trp Val
            35                  40                  45

Ser Cys Ile Asp Ile Tyr Gly Arg Ala Ser Tyr Thr Asp Pro Val Lys
        50                  55                  60

Gly Arg Phe Thr Ile Ser Arg Asp Asn Ser Lys Asn Thr Leu Tyr Leu
65                  70                  75                  80

Gln Met Asn Ser Leu Arg Ala Glu Asp Thr Ala Val Tyr Tyr Cys Ala 85                  90                  95

Ala Arg Asp Phe Gly Tyr Cys Thr Ala Ser Trp Val His Glu Gly Phe
                100                 105                 110

Ser Arg Tyr Trp Gly Gln Gly Thr Leu Val Thr Val Ser Ser
            115                 120                 125

<210> SEQ ID NO 101
<211> LENGTH: 126
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP321

<400> SEQUENCE: 101

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Tyr Gly Thr Tyr
            20                  25                  30

Ala Met Ser Trp Val Arg Gln Ala Pro Gly Lys Gly Leu Glu Trp Val
        35                  40                  45

Ala Cys Ile Asp Ile Tyr Gly Arg Ala Ser Tyr Thr Asp Pro Val Lys
    50                  55                  60

Gly Arg Phe Thr Ile Ser Arg Asp Asn Ser Lys Asn Thr Leu Tyr Leu
65                  70                  75                  80

Gln Met Asn Ser Leu Lys Ala Glu Asp Thr Ala Val Tyr Tyr Cys Ala
                85                  90                  95

Ala Arg Asp Phe Gly Tyr Cys Thr Ala Ser Trp Val His Glu Gly Phe
                100                 105                 110

Ser Arg Tyr Trp Gly Gln Gly Thr Leu Val Thr Val Ser Ser
            115                 120                 125

<210> SEQ ID NO 102
<211> LENGTH: 126
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP322

<400> SEQUENCE: 102

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Tyr Gly Thr Tyr
            20                  25                  30

Ala Met Ser Trp Phe Arg Gln Ala Pro Gly Lys Gly Arg Glu Gly Val
        35                  40                  45

Ala Cys Ile Asp Ile Tyr Gly Arg Ala Ser Tyr Thr Asp Pro Val Lys
    50                  55                  60

Gly Arg Phe Thr Ile Ser Gln Asp Asn Ser Lys Asn Thr Leu Tyr Leu
65                  70                  75                  80

Gln Met Asn Ser Leu Lys Ala Glu Asp Thr Ala Val Tyr Tyr Cys Ala
                85                  90                  95

Ala Arg Asp Phe Gly Tyr Cys Thr Ala Ser Trp Val His Glu Gly Phe
                100                 105                 110

Ser Arg Tyr Trp Gly Gln Gly Thr Leu Val Thr Val Ser Ser
        115                 120                 125

<210> SEQ ID NO 103
<211> LENGTH: 126
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP323

<400> SEQUENCE: 103

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Tyr Gly Thr Tyr
            20                  25                  30

Ala Met Ser Trp Val Arg Gln Ala Pro Gly Lys Gly Leu Glu Trp Val
        35                  40                  45

Ser Cys Ile Asp Ile Tyr Gly Arg Thr Ser Tyr Thr Asp Pro Val Lys
    50                  55                  60

Gly Arg Phe Thr Ile Ser Arg Asp Asn Ser Lys Asn Thr Leu Tyr Leu
65                  70                  75                  80

Gln Met Asn Ser Leu Arg Ala Glu Asp Thr Ala Val Tyr Tyr Cys Ala
                85                  90                  95

Ala Arg Asp Phe Gly Tyr Cys Thr Ala Ser Trp Val His Glu Gly Phe
            100                 105                 110

Ser Arg Tyr Trp Gly Gln Gly Thr Leu Val Thr Val Ser Ser
        115                 120                 125

<210> SEQ ID NO 104
<211> LENGTH: 126
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP324

<400> SEQUENCE: 104

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Tyr Gly Thr Tyr
            20                  25                  30

Ala Met Ser Trp Val Arg Gln Ala Pro Gly Lys Gly Leu Glu Trp Val
        35                  40                  45

Ala Cys Ile Asp Ile Tyr Gly Arg Thr Ser Tyr Thr Asp Pro Val Lys
    50                  55                  60

Gly Arg Phe Thr Ile Ser Gln Asp Asn Ser Lys Asn Thr Leu Tyr Leu
65                  70                  75                  80

Gln Met Asn Ser Leu Arg Ala Glu Asp Thr Ala Val Tyr Tyr Cys Ala
                85                  90                  95

Ala Arg Asp Phe Gly Tyr Cys Thr Ala Ser Trp Val His Glu Gly Phe
            100                 105                 110

Ser Arg Tyr Trp Gly Gln Gly Thr Leu Val Thr Val Ser Ser
        115                 120                 125

<210> SEQ ID NO 105

```
<211> LENGTH: 126
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP325

<400> SEQUENCE: 105
```

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Tyr Gly Thr Tyr
            20                  25                  30

Ala Met Ser Trp Phe Arg Gln Ala Pro Gly Lys Gly Leu Glu Gly Val
        35                  40                  45

Ala Cys Ile Asp Ile Tyr Gly Arg Thr Ser Tyr Thr Asp Pro Val Lys
    50                  55                  60

Gly Arg Phe Thr Ile Ser Gln Asp Asn Ser Lys Asn Thr Leu Tyr Leu
65                  70                  75                  80

Gln Met Asn Ser Leu Arg Ala Glu Asp Thr Ala Val Tyr Tyr Cys Ala
                85                  90                  95

Ala Arg Asp Phe Gly Tyr Cys Thr Ala Ser Trp Val His Glu Gly Phe
            100                 105                 110

Ser Arg Tyr Trp Gly Gln Gly Thr Leu Val Thr Val Ser Ser
        115                 120                 125

```
<210> SEQ ID NO 106
<211> LENGTH: 448
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1180

<400> SEQUENCE: 106
```

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Asp Ser
            20                  25                  30

Trp Ile His Trp Val Arg Gln Ala Pro Gly Lys Gly Leu Glu Trp Val
        35                  40                  45

Ala Trp Ile Ser Pro Tyr Gly Gly Ser Thr Tyr Tyr Ala Asp Ser Val
    50                  55                  60

Lys Gly Arg Phe Thr Ile Ser Ala Asp Thr Ser Lys Asn Thr Ala Tyr
65                  70                  75                  80

Leu Gln Met Asn Ser Leu Arg Ala Glu Asp Thr Ala Val Tyr Tyr Cys
                85                  90                  95

Ala Arg Arg His Trp Pro Gly Gly Phe Asp Tyr Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln

```
                    165                 170                 175
Ser Ser Gly Leu Tyr Ser Leu Ser Ser Val Thr Val Pro Ser Ser
                180                 185                 190

Ser Leu Gly Thr Gln Thr Tyr Ile Cys Asn Val Asn His Lys Pro Ser
            195                 200                 205

Asn Thr Lys Val Asp Lys Lys Val Glu Pro Lys Ser Cys Asp Lys Thr
        210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
        275                 280                 285

Lys Thr Lys Pro Arg Glu Glu Gln Tyr Ala Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Arg Glu Glu Met Thr Lys Asn Gln Val Ser Leu Thr Cys
        355                 360                 365

Leu Val Lys Gly Phe Tyr Pro Ser Asp Ile Ala Val Glu Trp Glu Ser
370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
            420                 425                 430

Leu His Asn His Tyr Thr Gln Lys Ser Leu Ser Leu Ser Pro Gly Lys
        435                 440                 445

<210> SEQ ID NO 107
<211> LENGTH: 214
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1181

<400> SEQUENCE: 107

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Val Ser Thr Ala
            20                  25                  30

Val Ala Trp Tyr Gln Gln Lys Pro Gly Lys Ala Pro Lys Leu Leu Ile
        35                  40                  45

Tyr Ser Ala Ser Phe Leu Tyr Ser Gly Val Pro Ser Arg Phe Ser Gly
    50                  55                  60

Ser Gly Ser Gly Thr Asp Phe Thr Leu Thr Ile Ser Ser Leu Gln Pro
```

```
                65                  70                  75                  80
        Glu Asp Phe Ala Thr Tyr Tyr Cys Gln Gln Tyr Leu Tyr His Pro Ala
                            85                  90                  95

Thr Phe Gly Gln Gly Thr Lys Val Glu Ile Lys Arg Thr Val Ala Ala
                        100                 105                 110

Pro Ser Val Phe Ile Phe Pro Pro Ser Asp Glu Gln Leu Lys Ser Gly
                    115                 120                 125

Thr Ala Ser Val Val Cys Leu Leu Asn Asn Phe Tyr Pro Arg Glu Ala
                130                 135                 140

Lys Val Gln Trp Lys Val Asp Asn Ala Leu Gln Ser Gly Asn Ser Gln
        145                 150                 155                 160

Glu Ser Val Thr Glu Gln Asp Ser Lys Asp Ser Thr Tyr Ser Leu Ser
                            165                 170                 175

Ser Thr Leu Thr Leu Ser Lys Ala Asp Tyr Glu Lys His Lys Val Tyr
                        180                 185                 190

Ala Cys Glu Val Thr His Gln Gly Leu Ser Ser Pro Val Thr Lys Ser
                    195                 200                 205

Phe Asn Arg Gly Glu Cys
            210

<210> SEQ ID NO 108
<211> LENGTH: 220
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1461

<400> SEQUENCE: 108

Asp Ile Val Met Thr Gln Ser Pro Asp Ser Leu Ala Val Ser Leu Gly
        1               5                   10                  15

Glu Arg Ala Thr Ile Asn Cys Lys Ser Ser Gln Ser Leu Leu Asn Ser
                    20                  25                  30

Gly Asn Gln Lys Asn Tyr Leu Ala Trp Tyr Gln Gln Lys Pro Gly Gln
                35                  40                  45

Pro Pro Lys Leu Leu Ile Tyr Gly Ala Ser Thr Arg Glu Ser Gly Val
            50                  55                  60

Pro Asp Arg Phe Thr Gly Ser Gly Ser Gly Thr Asp Phe Thr Leu Thr
        65                  70                  75                  80

Ile Ser Ser Leu Gln Ala Glu Asp Val Ala Val Tyr Tyr Cys Gln Asn
                        85                  90                  95

Asp His Ser Tyr Pro Phe Thr Phe Gly Gln Gly Thr Lys Leu Glu Ile
                    100                 105                 110

Lys Arg Thr Val Ala Ala Pro Ser Val Phe Ile Phe Pro Pro Ser Asp
                115                 120                 125

Glu Gln Leu Lys Ser Gly Thr Ala Ser Val Val Cys Leu Leu Asn Asn
            130                 135                 140

Phe Tyr Pro Arg Glu Ala Lys Val Gln Trp Lys Val Asp Asn Ala Leu
        145                 150                 155                 160

Gln Ser Gly Asn Ser Gln Glu Ser Val Thr Glu Gln Asp Ser Lys Asp
                        165                 170                 175

Ser Thr Tyr Ser Leu Ser Ser Thr Leu Thr Leu Ser Lys Ala Asp Tyr
                    180                 185                 190

Glu Lys His Lys Val Tyr Ala Cys Glu Val Thr His Gln Gly Leu Ser
```

```
                       195                 200                 205
Ser Pro Val Thr Lys Ser Phe Asn Arg Gly Glu Cys
    210                 215                 220

<210> SEQ ID NO 109
<211> LENGTH: 595
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP371

<400> SEQUENCE: 109

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
            20                  25                  30

Ile Met His Trp Val Arg Gln Ala Pro Gly Gln Gly Leu Glu Trp Met
        35                  40                  45

Gly Tyr Ile Asn Pro Tyr Asn Asp Gly Thr Lys Tyr Asn Glu Lys Phe
    50                  55                  60

Lys Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Leu Gly Phe Thr Thr Arg Asn Ala Met Asp Tyr Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
        275                 280                 285

Asn Ala Lys Thr Lys Pro Arg Glu Glu Gln Tyr Asn Ser Thr Tyr Arg
    290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
```

```
                    325                 330                 335
Lys Thr Ile Ser Lys Ala Lys Gly Gln Pro Arg Glu Pro Gln Val Tyr
            340                 345                 350

Thr Leu Pro Pro Ser Arg Asp Glu Leu Thr Lys Asn Gln Val Ser Leu
            355                 360                 365

Thr Cys Leu Val Lys Gly Phe Tyr Pro Ser Asp Ile Ala Val Glu Trp
370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
            405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
            435                 440                 445

Gly Gly Gly Gly Gly Ser Gly Gly Gly Ser Gly Gly Gly Gly Ser
450                 455                 460

Gly Gly Gly Gly Ser Glu Val Gln Leu Leu Glu Ser Gly Gly Gly Leu
465                 470                 475                 480

Val Gln Pro Gly Gly Ser Leu Arg Leu Ser Cys Ala Ala Ser Gly Phe
            485                 490                 495

Thr Tyr Gly Thr Tyr Ala Met Ser Trp Phe Arg Gln Ala Pro Gly Lys
            500                 505                 510

Gly Arg Glu Gly Val Ala Cys Ile Asp Ile Tyr Gly Arg Ala Ser Tyr
            515                 520                 525

Thr Asp Pro Val Lys Gly Arg Phe Thr Ile Ser Gln Asp Asn Ser Lys
            530                 535                 540

Asn Thr Leu Tyr Leu Gln Met Asn Ser Leu Lys Ala Glu Asp Thr Ala
545                 550                 555                 560

Val Tyr Tyr Cys Ala Ala Arg Asp Phe Gly Tyr Cys Thr Ala Ser Trp
            565                 570                 575

Val His Glu Gly Phe Ser Arg Tyr Trp Gly Gln Gly Thr Leu Val Thr
            580                 585                 590

Val Ser Ser
    595

<210> SEQ ID NO 110
<211> LENGTH: 5
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1146-CDR1

<400> SEQUENCE: 110

Thr Asn Tyr Met Gly
1               5

<210> SEQ ID NO 111
<211> LENGTH: 17
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1154-CDR2
```

```
<400> SEQUENCE: 111

Ala Ile Arg Ala Gly Gly Arg Asn Thr Asp Tyr Ala Asp Ser Val Lys
1               5                   10                  15

Gly

<210> SEQ ID NO 112
<211> LENGTH: 16
<212> TYPE: PRT
<213> ORGANISM: artificial sequence
<220> FEATURE:
<223> OTHER INFORMATION: synthetic
<220> FEATURE:
<221> NAME/KEY: misc_feature
<223> OTHER INFORMATION: QP1125-CDR3

<400> SEQUENCE: 112

Lys Thr Phe Ser Cys Arg Asn Arg Gly Gly Ser Tyr Leu Pro Asp Thr
1               5                   10                  15
```